(12) United States Patent
Kornbluh et al.

(10) Patent No.: US 9,266,233 B2
(45) Date of Patent: Feb. 23, 2016

(54) EXOSUIT SYSTEM

(71) Applicant: SRI International, Menlo Park, CA (US)

(72) Inventors: Roy David Kornbluh, Palo Alto, CA (US); Alexander Steele Kernbaum, Sunnyvale, CA (US); Thomas Low, Belmont, CA (US); Katherine Goss Witherspoon, San Francisco, CA (US); Brian Keith McCoy, Sunnyvale, CA (US); Adam Arnold Edward Ziemba, Menlo Park, CA (US); Paul Michael Birkmeyer, Redwood City, CA (US); Richard M. Mahoney, Los Altos, CA (US)

(73) Assignee: SRI International, Menlo Park, CA (US)

( * ) Notice: Subject to any disclaimer, the term of this patent is extended or adjusted under 35 U.S.C. 154(b) by 195 days.

(21) Appl. No.: 14/207,233

(22) Filed: Mar. 12, 2014

(65) Prior Publication Data

US 2014/0277739 A1    Sep. 18, 2014

Related U.S. Application Data

(60) Provisional application No. 61/790,406, filed on Mar. 15, 2013, provisional application No. 61/789,872, filed on Mar. 15, 2013, provisional application No. 61/917,820, filed on Dec. 18, 2013, provisional application No. 61/917,829, filed on Dec. 18, 2013.

(51) Int. Cl.
*B25J 9/00* (2006.01)
*B25J 9/16* (2006.01)

(52) U.S. Cl.
CPC .............. *B25J 9/0006* (2013.01); *B25J 9/1615* (2013.01); *B25J 9/1633* (2013.01);

(Continued)

(58) Field of Classification Search
CPC ........ B25J 9/0006; B25J 9/1615; B25J 9/1633
See application file for complete search history.

(56) References Cited

U.S. PATENT DOCUMENTS

| 6,689,074 B2 * | 2/2004 | Seto ........................ A61F 2/54 |
| | | 601/33 |
| 7,598,651 B2 | 10/2009 | Kornbluh et al. |

(Continued)

FOREIGN PATENT DOCUMENTS

WO     2014/109799 A1    7/2014

OTHER PUBLICATIONS

PCT International Search Report and Written Opinion, PCT International Application No. PCT/US2014/024876, dated Sep. 18, 2014.

(Continued)

*Primary Examiner* — Nicholas Kiswanto
(74) *Attorney, Agent, or Firm* — McDonnell Boehnen Hulbert & Berghoff LLP

(57) ABSTRACT

A flexible exosuit includes rigid and flexible elements configured to couple forces to a body of a wearer. Further, the flexible exosuit includes flexible linear actuators and clutched compliance elements to apply and/or modulate forces and/or compliances between segments of the body of the wearer. The flexible exosuit further includes electronic controllers, power sources and sensors. The flexible exosuit can be configured to apply forces to the body of the wearer to enable a variety of applications. In some examples, the flexible exosuit can be configured to augment the physical strength or endurance of the wearer. In some examples, the flexible exosuit can be configured to train the wearer to perform certain physical tasks. In some examples, the flexible exosuit can be configured to record physical activities of the wearer.

16 Claims, 21 Drawing Sheets

(52) U.S. Cl.
CPC ............... *G05B 2219/36429* (2013.01); *G05B 2219/39345* (2013.01); *G05B 2219/40305* (2013.01); *Y10S 901/02* (2013.01); *Y10T 29/49826* (2015.01)

(56) References Cited

U.S. PATENT DOCUMENTS

| | | | |
|---|---|---|---|
| 7,918,808 B2* | 4/2011 | Simmons | A61F 4/00 345/156 |
| 8,057,410 B2* | 11/2011 | Angold | A61H 3/00 601/35 |
| 2011/0040216 A1 | 2/2011 | Herr et al. | |
| 2011/0264230 A1 | 10/2011 | Herr et al. | |
| 2013/0289452 A1* | 10/2013 | Smith | B25J 9/0006 601/33 |
| 2015/0173993 A1* | 6/2015 | Walsh | A61H 3/00 414/4 |

OTHER PUBLICATIONS

Hayashi Toshiaki et al., "Smart Power Suit With Variable Stiffness Mechanism", Proceedings of the 2004 IEEE International Workshop on Robot and Human Interactive Communication, Okayama, Japan, Sep. 20-22, 2004, pp. 637-642.

Endo, K. et al., "Human Walking Model Predicts Joint Mechanics, Electromyography and Mechanical Economy", The 2009 IEEE/RSJ International Conference on Intelligent Robots and Systems, St. Louis, USA, Oct. 11-15, 2009, pp. 4663-4668.

Endo, K et al., "A Model of Muscle-Tendon Function in Human Walking", 2009 IEEE International Conference on Robotics and Automation, Kobe, Japan, May 12-17, 2009, pp. 1909-1915.

* cited by examiner

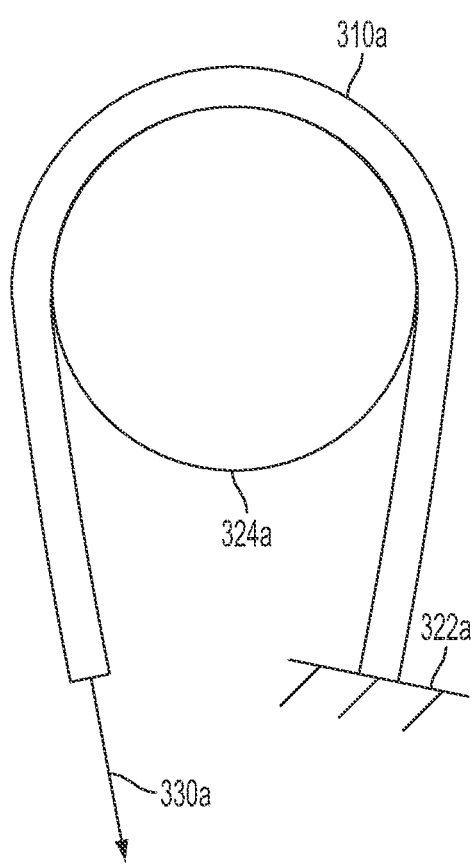
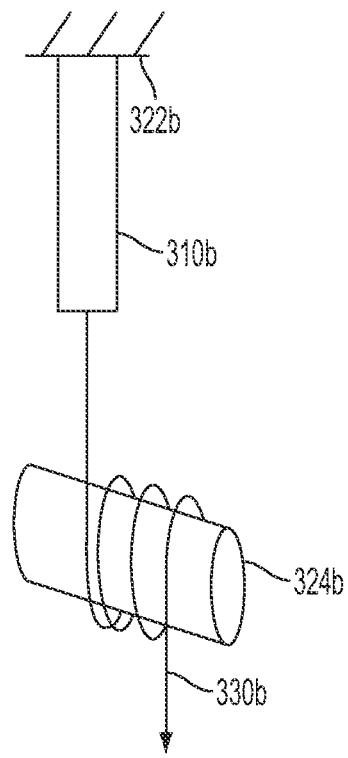
FIG. 3A
FIG. 3B

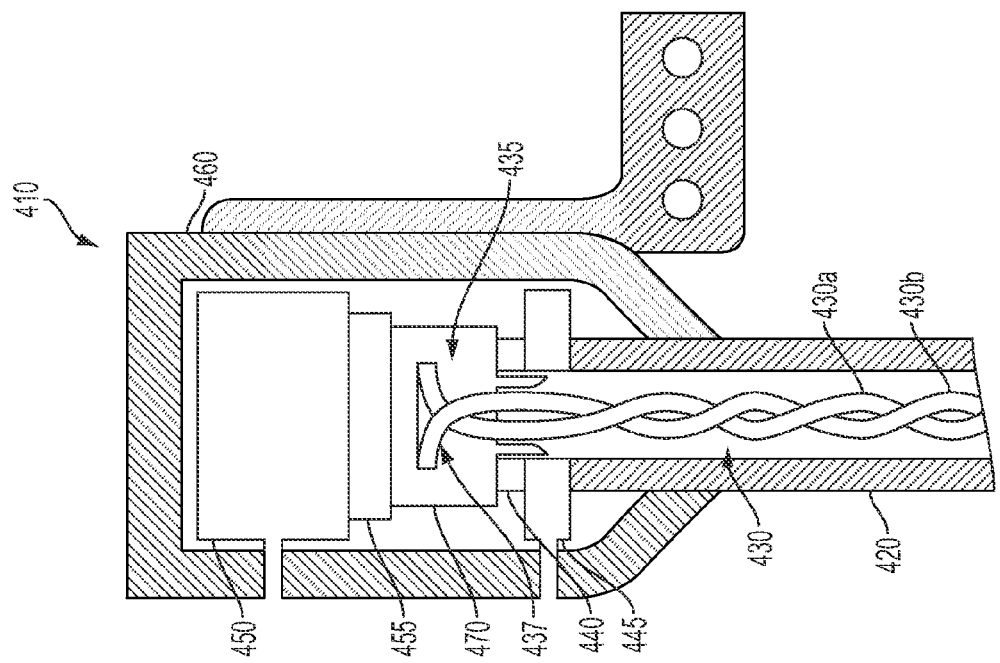
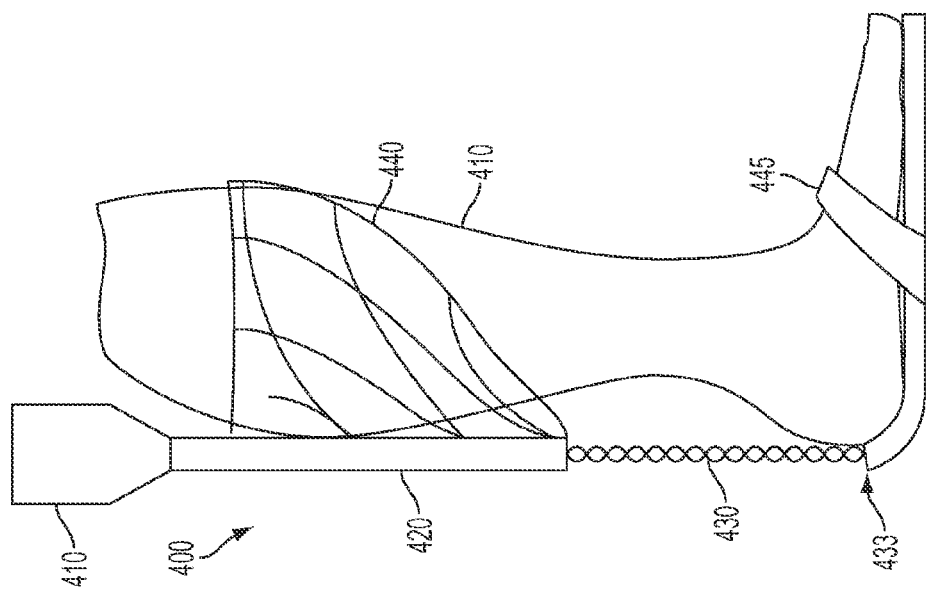
FIG. 4B
FIG. 4A

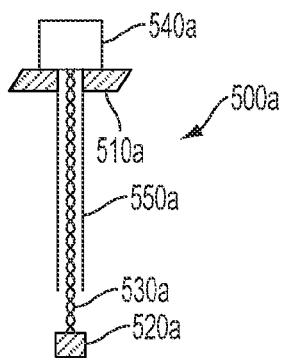
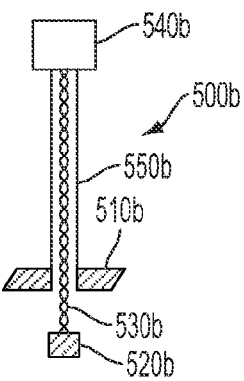
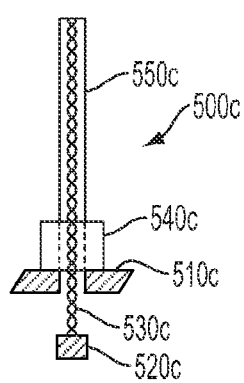
FIG. 5A  FIG. 5B  FIG. 5C
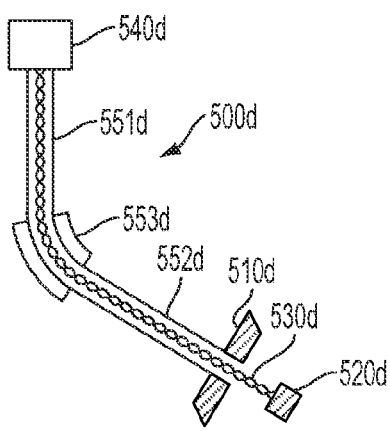
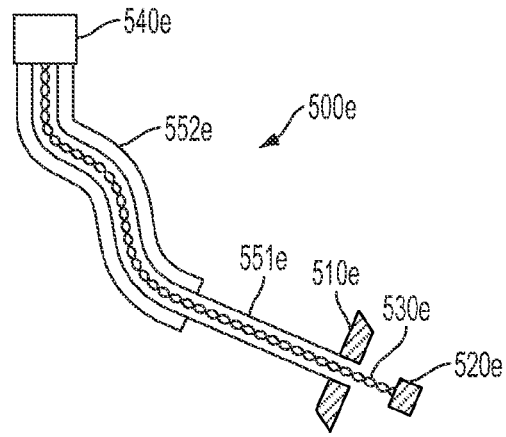
FIG. 5D  FIG. 5E
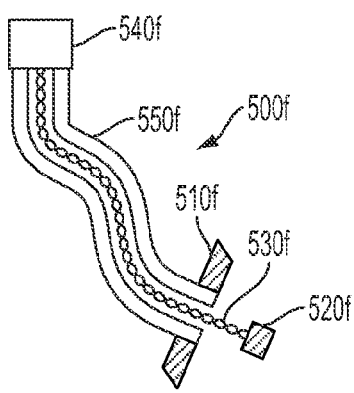
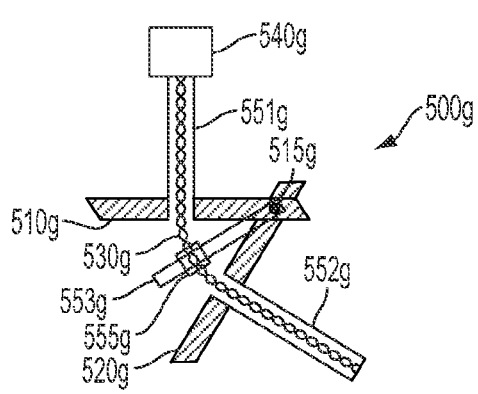
FIG. 5F  FIG. 5G

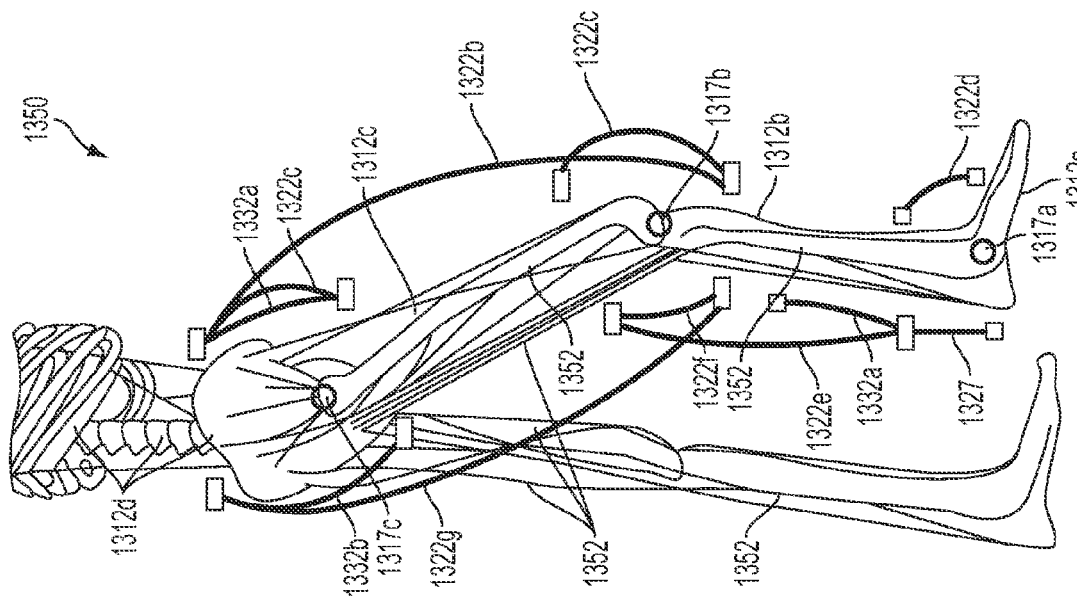
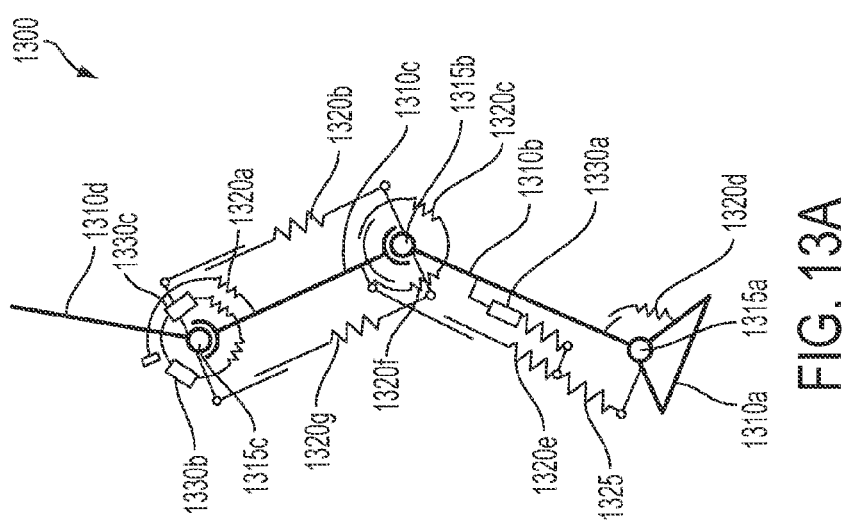
FIG. 13B
FIG. 13A

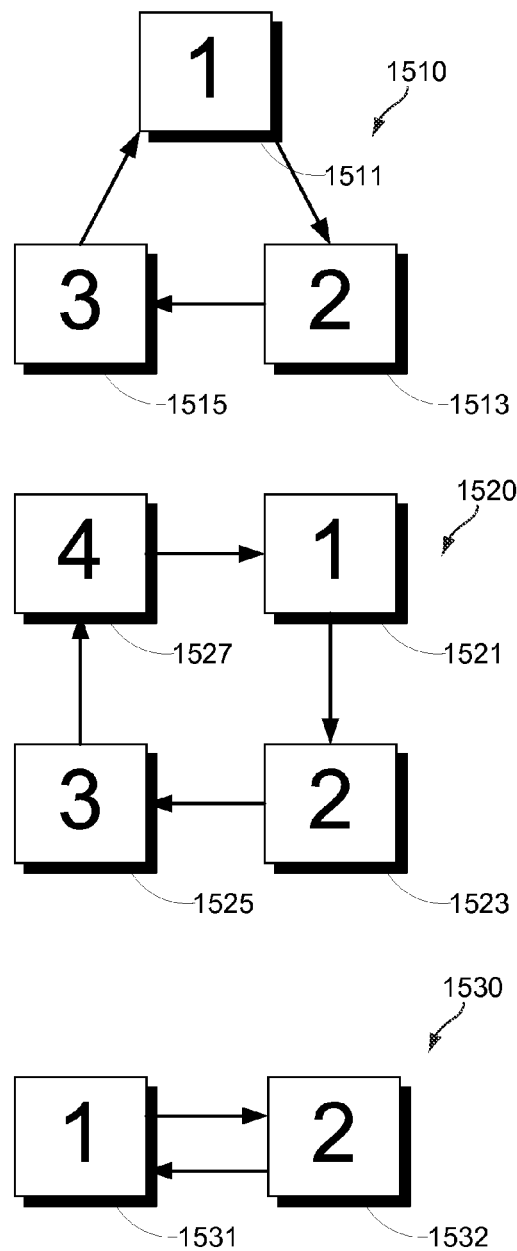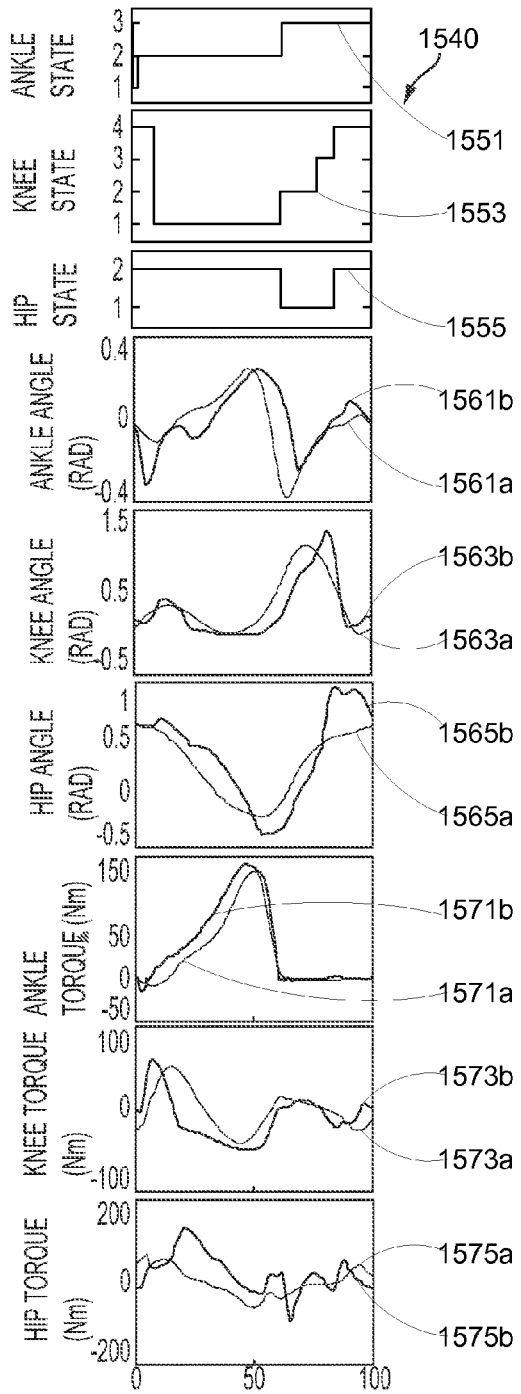
FIG. 15A
FIG. 15B

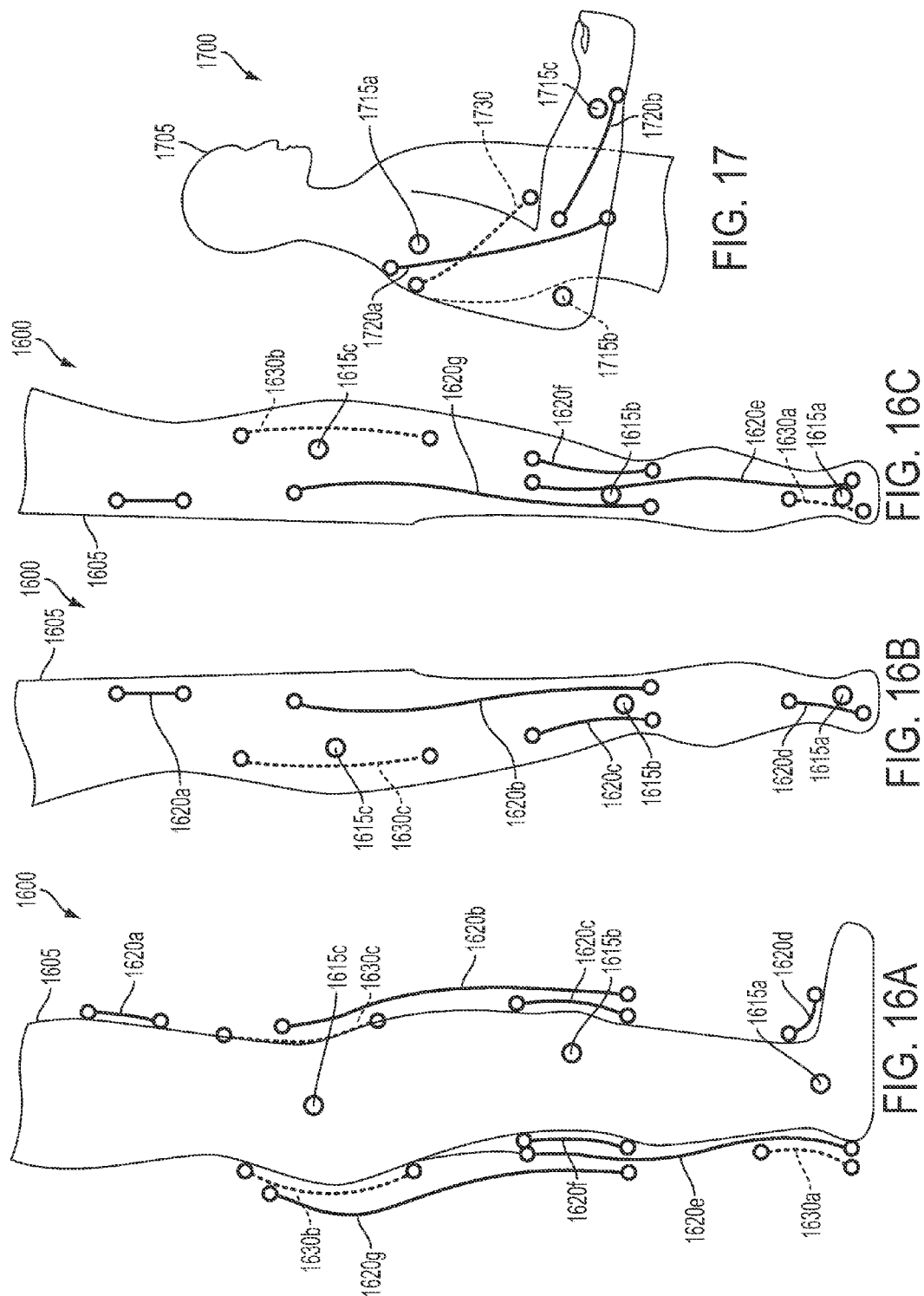

EXOSUIT SYSTEM

CROSS-REFERENCE TO RELATED APPLICATIONS

This application claims the benefit of and incorporates by reference the content of U.S. Provisional Application No. 61/790,406, filed Mar. 15, 2013, U.S. Provisional Application No. 61/789,872, filed Mar. 15, 2013, U.S. Provisional Application No. 61/917,820, filed Dec. 18, 2013, and U.S. Provisional Application No. 61/917,829, filed Dec. 18, 2013.

GOVERNMENT ACKNOWLEDGEMENT

This invention was made in part with Government support under contract W911QX-12-C-0049 awarded by the United States Army. The Government has certain rights in this invention.

BACKGROUND

Unless otherwise indicated herein, the materials described in this section are not prior art to the claims in this application and are not admitted to be prior art by inclusion in this section.

Many physical activities require a participant in the activity to perform to the limit of their physical ability, testing the participant's endurance, strength, coordination, shock tolerance, or other physical variables. Warfighters can be expected to carry heavy loads across long distances, taxing their endurance and risking injury due to falls, unstable terrain, or other unanticipated physical shocks. The elderly or the physically disabled can experience difficulty in performing activities of daily living, due to reduced endurance, strength, injury-resistance, balance, or other issues. Movers or other persons engaged in physical labor can be at increased risk of injury due to repeatedly lifting heavy loads over long durations and difficulty coordinating physical efforts (e.g., lifting a large object) between multiple people. Athletes can be exposed to joint, tendon, or other forces sufficient to cause significant temporary or permanent injury. Individuals recovering from surgery or a disabling injury may be unable to perform the minimum tasks necessary to begin rehabilitation, and thus may be barred from recovery. Other examples exist of populations and activities that respectively may require more physical ability than is available to members of the population or to participants in the activities.

Assistive devices may be able to alleviate some of these issues. A variety of assistive devices, including various exoskeleton-based devices, have been developed to increase a user's strength, fatigue resistance, coordination, or other factors. These exoskeletons or other devices can be powered or unpowered, and may be controlled by feedback from the user's movements, be operated in a feed-forward manner, or be completely passive (e.g., hernia belts, lifting harnesses). Assistive devices can include electrical or mechanical actuators, sensors, and controllers. Various assistive devices have been applied to some of the above populations and activities with varying degrees of success.

SUMMARY

Some embodiments of the present disclosure provide a programmable body augmentation system that includes (i) a flexible suit configured to be worn over at least a portion of a human body; (ii) one or more flexible linear actuators coupled to the flexible suit, wherein the one or more flexible linear actuators are operable to apply forces between segments of the human body such that the forces applied by the one or more flexible linear actuators augment forces applied by musculature in the human body; (iii) one or more clutched-compliance elements coupled to the flexible suit, wherein the one or more clutched-compliance elements are operable to provide controllable levels of compliance between segments of the human body; and (iv) a controller disposed in the flexible suit, wherein the controller is configured to execute computer-readable programs to operate the one or more flexible linear actuators to apply forces between segments of the human body and to operate the clutched-compliance elements to provide controlled levels of compliance between segments of the human body in a plurality of different ways to provide a plurality of different modes of operation.

Some embodiments of the present disclosure provide a method that includes: (i) coupling a programmable body augmentation system to a human body, wherein the programmable body augmentation system includes: (a) one or more flexible linear actuators, wherein the one or more flexible linear actuators are operable to apply forces between segments of the human body such that the forces applied by the one or more flexible linear actuators augment forces applied by musculature in the human body; (b) one or more clutched-compliance elements, wherein the one or more clutched-compliance elements are operable to provide controllable levels of compliance between segments of the human body; and (c) a controller, wherein the controller is configured to execute computer-readable programs to operate the one or more flexible linear actuators to apply forces between segments of the human body and to operate the clutched-compliance elements to provide controlled levels of compliance between segments of the human body in a plurality of different ways to provide a plurality of different modes of operation; (ii) selecting one of the modes of operation; (iii) performing one or more actions of the human body related to the selected mode of operation while the controller operates the one or more flexible linear actuators to apply forces to the human body and operate the one or more clutched-compliance elements to provide levels of compliance between segments of the human body related to the one or more actions.

Some embodiments of the present disclosure provide a method that includes: (i) providing a programmable body augmentation system, wherein the programmable body augmentation system comprises: (a) a flexible suit configured to be worn over at least a portion of a human body; (b) a plurality of body-augmentation elements coupled to the flexible suit in a particular physical arrangement, the body-augmentation elements including one or more flexible linear actuators and one or more clutched-compliance elements, wherein the one or more clutched-compliance elements are operable to provide controllable levels of compliance between segments of the human body, and wherein the one or more clutched-compliance elements are operable to provide controllable levels of compliance between segments of the human body; and (c) a controller disposed in the flexible suit, wherein the controller can be programmed to control the forces applied by the one or more flexible linear actuators and the compliance provided by the clutched-compliance elements; (ii) enabling a first mode of operation of the programmable body augmentation system, wherein the first mode of operation involves the one or more flexible linear actuators applying forces and the one or more clutched-compliance elements providing compliances related to a first type of action of the human body, and wherein enabling the first mode of operation of the programmable body augmentation system comprises programming the controller based on the first mode of operation without changing the particular physical arrangement of body-augmentation elements; and (iii) enabling a second mode of operation of the programmable body augmentation system, wherein the second mode of operation involves the one or more flexible linear actuators applying forces and the one or more clutched-compliance elements providing compliances related to a second type of action of the human body, wherein the second type of action is different than the first type of movement, and wherein enabling the second mode of operation of the programmable body augmentation system comprises programming the controller based on the second mode of operation without changing the particular physical arrangement of body-augmentation elements.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3A is a schematic view of an exotendon wrapped partially around a capstan.

FIG. 3B is a schematic view of a cable coupled to an exotendon and wrapped around a capstan.

FIG. 4A illustrates a twisted string actuator.

FIG. 4B is a close-up, cutaway view of elements of the twisted string actuator illustrated in FIG. 4A.

FIG. 5A illustrates a twisted string actuator.

FIG. 5B illustrates a twisted string actuator.

FIG. 5C illustrates a twisted string actuator.

FIG. 5D illustrates a twisted string actuator.

FIG. 5E illustrates a twisted string actuator.

FIG. 5F illustrates a twisted string actuator.

FIG. 5G illustrates a twisted string actuator.

FIG. 13A is a schematic illustrating a model of a leg.

FIG. 13B is a schematic illustrating a model of a leg.

FIG. 15A illustrates controllers that could be used to operate elements of the model of a leg illustrated in FIG. 13A.

FIG. 15B illustrates recorded natural patterns of operation of a human leg and patterns of operation of elements of the model of a leg illustrated in FIG. 13A and state transitions of the controllers illustrated in FIG. 15A.

FIG. 16A shows a side view of a schematic of a flexible exosuit worn on a leg of a wearer.

FIG. 16B shows a front view of elements of the flexible exosuit illustrated in FIG. 16A.

FIG. 16C shows a back view of elements of the flexible exosuit illustrated in FIG. 16A.

FIG. 17 shows a schematic of a flexible exosuit worn on an arm of a wearer.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Some embodiments of the present disclosure provide a flexible exosuit (alternatively referred to as an exosuit, a WarriorWeb, a strength suit, and/or a programmable body augmentation system) configured to be worn by a wearer and to apply forces to the wearer, among other functions, to enable various physical activities of the wearer. In some examples, this could include providing forces between segments of the body of the wearer to augment forces applied by the musculature of the wearer's body. Some embodiments of the present disclosure provide various elements that could be incorporated into such an exosuit to enable functions of the exosuit. Some embodiments of the present disclosure provide applications and modes of operation of such an exosuit.

Figure 1B:
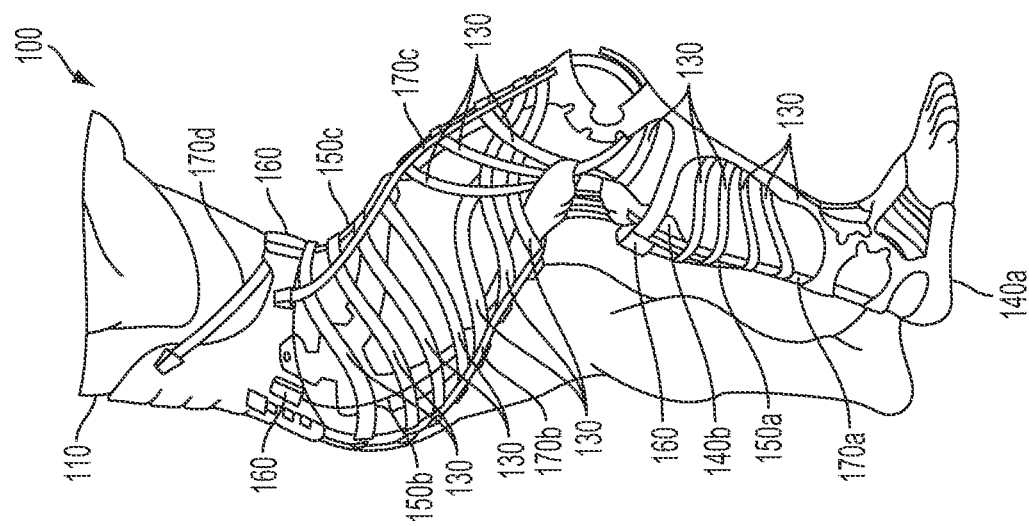
FIG. 1B illustrates in detail a section of the flexible exosuit of FIG. 1A.
Figure 1A:
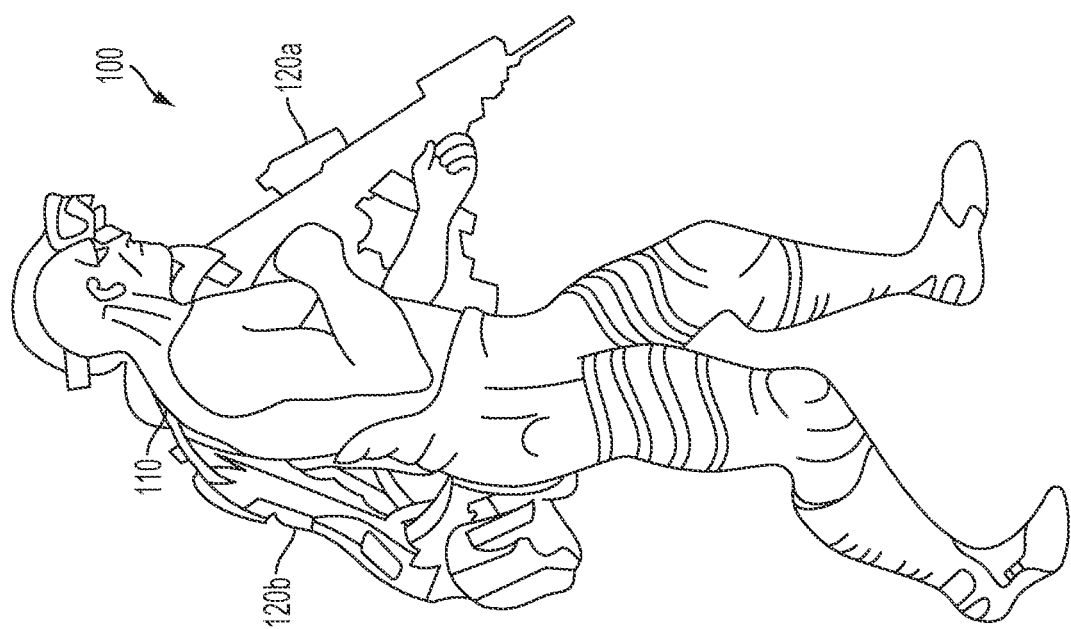
FIG. 1A illustrates a flexible exosuit.

FIGS. 1A and 1B illustrate a flexible exosuit 100 being worn by a wearer 110. FIG. 1A additionally illustrates loads 120a and 120b being respectively carried in the arms of and worn on the back of the wearer 110. Flexible exosuit 100 is configured to apply forces to the wearer 110, elements of the flexible exosuit 100, and/or one or both of the loads 120a, 120b to facilitate one or more activities of the wearer 110. For example, flexible exosuit 100 could be operated to assist the wearer 110 in walking by adding energy to the motion of the wearer's 110 legs and/or by selectively extracting energy from the wearer's 110 legs during one phase of locomotion and injecting a portion of the extracted energy to assist the motion of the wearer's 110 legs during another phase of activity. In another example, the flexible exosuit 100 could additionally or alternatively enable the wearer 110 to carry loads 120a, 120b heavier than the wearer 110 would be capable of carrying on his own and/or carrying loads 120a/120b farther than the wearer 110 would be capable on his own. Other activities of the wearer 110 could be facilitated by the flexible exosuit 100. Additionally or alternatively, the flexible exosuit 100 could be configured and/or operated to perform other functions.

The flexible exosuit 100 includes a multitude of elements to enable the functions described herein. The flexible exosuit includes flexible force-transmitting elements (FFTEs) 130 configured to transmit forces between elements of the flexible exosuit 100 and between elements of the flexible exosuit 100 and tissues of the wearer 110. The flexible exosuit 100 additionally includes rigid force-transmitting elements (RFTEs) 140a, 140b, 140c configured to transmit forces between elements of the flexible exosuit 100 and between elements of the flexible exosuit 100 and tissues of the wearer 110. In some examples, the RFTEs can be composed of flexible elements and can be configured to be functionally rigid when attached to other elements and/or the body of a wearer. Such RFTEs could be considered conditionally rigid, in that their rigid transmission of compressive or other forces is conditional upon their being attached to the other elements and/or the body of a wearer. Conditionally rigid RFTEs could be configured to transmit forces (given the constraints above) similar to forces transmitted by a corresponding non-conditionally rigid force-transmitting elements while being lighter, thinner, or otherwise superior according to some application than the corresponding non-conditionally rigid force-transmitting elements. Mechanical forces are transduced by actuators of the flexible exosuit 100, including twisted string actuators 150a, 150b, 150c driven by electrical motors 160 and exotendons 170a, 170b, 170c, 170d. Actuators (including 150a-c, 170a-d) can generate, absorb, store, or otherwise modulate forces between force-transmitting elements 130, 140a-c in order to generate, store, or otherwise modulate forces on or within the wearer 110 (e.g., joint torques about one or more joints of the wearer 110) to facilitate or enable functions of the flexible exosuit 100 as described herein. The flexible exosuit 100 can include additional elements, including batteries, controllers, sensors, user interfaces, communications devices, or other components according to an application.

Twisted string actuators (e.g., 150a, 150b, 150c) are flexible structures capable of generating forces along their length. A twisted string actuator includes at least two flexible 'strands' (e.g., wires, cables, ropes, fibers) twisted about each other (in cases where there are two strings, the two strings can be referred to as a "twisted pair"). In some examples, a first end of a twisted string is attached to a first actuated element, and a second end of the twisted string, opposite the first end, is attached to a second actuated element such that the location of the second end does not translate relative to the second actuated element and such that the second end can be rotated by a rotational actuator, e.g., an electric motor 160. The twisted string actuator transduces a rotation or torque applied to the second end of the twisted string into a displacement or force, respectively, between the first and second actuated elements. Properties of a twisted string (e.g., compliance, twist pitch, diameter, length) and the driving rotational actuator (e.g., acceleration, speed, torque, rotational inertia) can be chosen to produce a twisted string actuator having one or more properties according to an application, for example, a high rate of change of displacement, a high transmission ratio between the rotational actuator and the forces applied between the first and second actuated elements, a certain compliance, or other properties. Further, a twisted string can be flexible and can be implemented in a curved configuration. For example, the twisted string could be housed in a stiff tube (similar to a Bowden cable, where the twisted string and the stiff tube are analogous to the inner cable and the outer housing, respectively) wrapped around a joint of the wearer 110, with each end of the twisted string attached as described above to a respective actuated element on either side of the joint. Such a twisted string actuator could be operated to apply forces between the first and second actuated elements across the joint; further, the flexibility of the twisted string and the stiff tube can allow the twisted string actuator to remain proximate to a surface of the wearer 110 as the joint moves or as other aspects of the flexible exosuit 100 or wearer 110 change configuration. Note that a twisted string actuator can have more than two flexible strings, be connected to actuated elements in different ways, be driven by other or multiple rotational actuators, or be configured differently to these examples in other ways.

Exotendons (e.g., 170a, 170b, 170c, 170d) are structures capable of transmitting forces along their length and capable of having one or more mechanical properties (e.g., a compliance) controlled by an electrical or other signal. Exotendons can be flexible or rigid. Exotendons can be thin, flexible, and conformal to a curved or flat surface. For example, an exotendon could include an electrostatic clutch (or some other type of mechanical clutch) connected in series with a component having a specified compliance (e.g., a spring). The clutch itself could have a first compliance when inactive (possibly a very high compliance, corresponding to an effectively nearly complete mechanical decoupling between the ends of the clutch) and a second compliance when active (possibly a very low compliance, corresponding to the compliance of individual components of the clutch due to an effectively non-compliant mechanical coupling between the ends of the clutch). Thus, exotendons could be considered a type of clutched-compliance element. The clutch and specified-compliance component could be discrete, or could be interdigitated, intercalated, or otherwise assembled proximately to form an exotendon. Further, an exotendon could contain multiple specified-compliance elements, independently or commonly-controlled clutches, or other elements. In some examples, the overall compliance of an exotendon could be controlled to a variety of discrete or continuous levels by controlling multiple clutches. In some examples, an exotendon could be operated to store a mechanical energy, e.g. by engaging a clutch to prevent relaxation of a stretched specified-compliance element, and to later release the stored mechanical energy. Other configurations and methods of operating an exotendon are described herein.

The flexible exosuit 100 could include additional wholly or partially flexible linear actuators (i.e., actuators capable of being operated to produce a linear force and/or displacement and that are wholly or partially flexible) and/or other varieties of wholly or partially flexible actuators. In some examples, the flexible exosuit 100 could include actuators that include electroactive polymer artificial muscle (EPAM). EPAM actuators change size or shape in response to an applied electrical field. Conversely, a size or shape change in an EPAM actuator caused by an external force can cause an electric field to develop in or on the EPAM actuator. An EPAM actuator can include two or more electrodes configured to interact (by way of an electric field) with an electroactive polymer material. The electroactive polymer material could include dielectric, ferroelectric, electrostrictive, or other electrically-active molecules, crystals, or materials embedded in a polymer such that application of an electric field causes the electrically-active materials to orient, expand, contract, or otherwise respond to the electric field to cause the electroactive material to change a size or shape. For example, the electroactive polymer material could be composed of an elastic dielectric configured to experience electrostatic compression. The electroactive material and electrodes can be configured in a variety of ways to enable a desired relationship between mechanical deformation of the EPAM and an electric field between the electrodes. In some examples, the material and electrodes could be configured such that the EPAM actuator transduced an electric field into a size change in one direction, such that the EPAM actuator could be operated as a flexible linear actuator. EPAM actuators could additionally or alternatively be used to generate electrical energy from mechanical energy. In some examples, the flexible exosuit 100 could include actuators that drive and/or apply a tension to a cable or cables. For example, the flexible exosuit could include a linear pull solenoid attached to a cable. The linear pull solenoid could be attached to a first actuated element and the end of the cable opposite the end of the cable attached to the solenoid could be attached to a second actuated element. Application of an electrical current to the solenoid could result in a force applied between and/or a displacement of the first and second actuated elements. Other wholly or partially flexible actuators of the flexible exosuit are anticipated.

The flexible exosuit 100 could include composite actuators; that is, wholly or partially flexible assemblies mechanically connected between a first actuated element and a second actuated element and including at least one actuator. For example, the flexible exosuit 100 could include a smart tendon exomuscle (STEM) actuator that includes a linear actuator and at least one clutched compliance element (that is, an element that includes a mechanical clutch mechanically coupled in series with a component having a specified compliance). The linear actuator could be a twisted string actuator. The clutched compliance element could be configured similarly to an exotendon as described herein. A STEM could include a single twisted string actuator connected to the first actuated element and mechanically coupled in series with an exotendon connected to the second actuated element. A STEM could include an exotendon connected between the first and second actuated elements and connected in parallel with a single twisted string actuator connected to the first actuated element and mechanically coupled in series with an exotendon connected to the second actuated element. A STEM could include a single twisted string actuator connected to the first actuated element and mechanically coupled in series with an exotendon also connected to the first actuated element. A STEM could be configured to have a topology and/or properties inspired by biological actuators, e.g., muscles and tendons, and could further be operated to mimic the operation of biological actuators. Other configurations of a STEM are anticipated. A STEM could be operated to extract, store, inject, or otherwise transduce mechanical forces and energies to and from a wearer 110 of the flexible exosuit 100 and/or between elements of the flexible exosuit 100.

Forces could be transmitted between elements of the flexible exosuit 100 and tissues of the wearer 110 through flexible elements in contact with the skin of the wearer 110 and/or in contact with a form-fitting fabric or garment that is contact with the skin of the wearer 110. For example, actuators of the flexible exosuit 100 could transmit forces into flexible force-transmitting elements (FFTEs) 130 that could, in turn transmit forces into the skin of the wearer 110. The forces transmitted into the skin of the wearer may be compressive forces, shear forces, or other types and combinations of forces as described further below. Multiple FFTEs 130 could be flexibly or rigidly connected to each other and to actuators to enable forces to be transferred to into the skin of the wearer according to a constraint or application. For example, multiple FFTEs 130 could be woven together and connected to an actuator in such a way that the transmission of shear force from the actuator and/or normal force between the multiple FFTEs 130 and the skin was evenly spread across an area the wearer's skin. This constraint could be used to specify the configuration of the multiple FFTEs 130 according to a model of the anatomy of the wearer 110 or of some stereotypical and/or statistically-derived wearer. Individual FFTEs 130 of the multiple woven FFTEs 130 could wind helically around part of the anatomy of the wearer 110 (e.g., a shank of a leg) such that the pitch of the helix decreased with distance from the point of attachment to the actuator. Multiple FFTEs 130 could additionally be configured to allow for attachment of multiple actuators and/or to allow transmission of forces from multiple directions. More than one set of multiple FFTEs 130 connected to respective more than one actuators could transmit forces into the same area of skin of the wearer 110, for example, by being configured to slide over each other otherwise not significantly transmit forces between each other while transmitted forces into the skin.

Forces could be transmitted between elements of the flexible exosuit 100 and the wearer 110 through additional methods. FFTEs 130 and/or rigid force-transmitting elements (RFTEs) 140a, 140b, 140c could be configured to transmit forces into and/or adhere to skin in regions of minimal skin strain, that is, regions of skin that experience relatively little strain during specified activities of the wearer 110 (e.g., walking, running, jumping, lifting). Additionally or alternatively, FFTEs 130 could be configured to transmit forces into and/or adhere to skin along lines of non-extension of the skin, that is, lines of the skin that experience strain perpendicular to the lines but substantially no strain parallel to the lines during specified activities of the wearer 110. FFTEs 130 and/or RFTEs 140a, 140b, 140c could be configured to transmit substantially no shear forces into skin, according to an application, by having beads, cylinders, or other freely-rotating elements coupled to the FFTEs 130 and/or RFTEs 140a, 140b, 140c such that a normal force is transmitted through one or more beads, cylinders, or other freely-rotating elements and a shear force result in rotation of the one or more beads, cylinders, or other freely-rotating elements and displacement of the FFTE 130 and/or RFTE 140a, 140b, 140c. Other methods of transmitting force between elements of the flexible exosuit 100 and the wearer, including straps, boots, armor segments, and electroadhesive pads are anticipated.

The flexible exosuit 100 could include rigid elements, including RFTEs 140a, 140b, and 140c. RFTE 140a is a rigid element configured to couple forces to the foot of the wearer 110 by operating as or in conjunction with a boot. Some or all of the forces generated and/or transmitted by twisted string actuator 150a and exotendon 170a are transmitted into RTFE 140a. RTFE 140a could additionally include other element; for example, RTFE 140a could include one or more EPAM actuators that could be operated to, for example, absorb and/or transmit energy to the foot of the wearer 110 to increase the efficiency or some other factor of an activity (e.g., locomotion) of the wearer. RFTE 140b is a rigid element configured to couple some or all of the forces generated and/or transmitted by twisted string actuator 150a and exotendon 170a to other elements (e.g., FFTEs 130) of the flexible exosuit 100 and/or skin of the wearer proximate to RFTE 140b. RFTE 140c is a rigid element configured to couple forces from other elements of the flexible exosuit 100 to the torso of the wearer 110. Some or all of the forces generated and/or transmitted by twisted string actuators 150b, 150c and exotendons 170b, 170c, 170d are transmitted into RTFE 140c. RTFE 140c can additionally transmit forces to/from FFTEs 130. RTFE 140c is additionally configured to mount the load 120b to allow forces from the load (e.g., force due to gravity) to be transmitted directly into the flexible exosuit 100, such that some or all of the forces necessary to transport the load 120b are borne by the flexible exosuit 100 instead of elements of the wearer's 110 back. Other RTFEs than those illustrated in FIG. 1B could be included in the flexible exosuit 100 and could be configured to transfer forces to the wearer 110 and/or between other elements of the flexible exosuit 100 according to an application.

The flexible exosuit 100 could additionally include an undersuit configured to maintain the location of elements of the flexible exosuit 100 relative to elements of the body of the wearer 110. The undersuit could be composed of a variety of flexible fabrics, textiles, or other materials and could enable a variety of functions of the flexible exosuit 100. For example, the undersuit could include Kevlar to protect the wearer 100 from projectiles, Gore-Tex to manage moisture emitted by the skin of the wearer 110, or other materials. The undersuit, RTFEs (e.g., 140a, 140b, 140c), FFTEs (e.g., 130), and/or other non-electronically-operable elements of the flexible exosuit 100 could be referred to as a flexible suit. The coupling of electronically-operable elements (e.g., exotendons 170a, 170b, 170c, 170d, twisted string actuators 150a, 150b, 150c, or other actuators or other elements disposed on or within the flexible exosuit 100) to the flexible suit could enable the operation of the electronically-operable elements to apply forces, torques and/or compliances to the body of the wearer 110.

The flexible exosuit 100 includes additional elements. The flexible exosuit 100 includes one or more controllers configured to operate the flexible exosuit 100. The controller(s) could be configured to receive data from a plurality of sensors in the flexible exosuit 100, generate commands to operate actuators (e.g., 150a-c, 170a-d) of the flexible exosuit 100, and to perform other functions. The controller(s) could be configured to operate communications elements in the flexible exosuit 100, for example, Bluetooth radios, WiFi radios, LTE or other cellular radios, near-field RF communications devices, modems, or other communications devices. The controller(s) could be configured to operate such communications devices to receive commands, send telemetry, enable communications between the wearer 110 and some other person or system, or enable some other function. The controller(s) could be configured to operate one or more user interfaces (UIs) in the flexible exosuit 100 and/or in systems in communication with the flexible exosuit 100. For example, the controller(s) could operate a touch screen disposed on or in a sleeve worn by the wearer 110 to present information about the operation of the flexible exosuit 100 to the wearer and/or to receive commands from the wearer 110, e.g., commands to alter the functioning of the flexible exosuit 100. UIs in the flexible exosuit 100 could include displays, touchscreens, touchpads, buttons, sliders, knobs, indicator lights, speakers, headphones, microphone, or other elements.

The controller(s) could additionally or alternatively be configured to send and/or receive commands from the wearer 110 using sensors and/or actuators of the flexible exosuit 110. In some examples, the controller(s) could be configured to use sensors disposed in the flexible exosuit 100 to detect command gestures performed by the wearer 110 and to alter the functioning of the flexible exosuit 100 based on those command gestures. In some examples, the controller(s) could use actuators or other elements of the flexible exosuit 100 to provide feedback to the wearer 110, to indicate a state of the flexible exosuit 100 to the wearer, and/or to provide some other information to the wearer 110. For example, the controller(s) could produce a pulse or sequence of pulses using twisted string actuator 150c to indicate that the wearer 110 should adopt a more crouched posture. In another example, the flexible exosuit 100 could include one or more vibrating, heating, or electrostimulating elements, and the controller(s) could operate the vibrating, heating, or electrostimulating elements to indicate a state of the flexible exosuit 100 to the wearer, and/or to provide some other information to the wearer 110. Other methods of using elements of the flexible exosuit 100 to indicate information to the wearer 110 are anticipated.

The flexible exosuit 100 includes a plurality of sensors configured to detect information about the operation and status of the flexible exosuit 100, the wearer 110, and/or an environment of the wearer. These sensors include but are not limited to force sensors (e.g., load cells), strain or displacement sensors (e.g., capacitive sensors, laser or ultrasonic rangefinders, linear encoders, rotary encoders on rotary elements of rotary-to-linear transducers or transmissions), angle sensors (e.g., magnets and magnetometers, filtered accelerometers, magnetometers, and/or gyroscopes), location, velocity, and/or acceleration sensors (e.g., GPS receivers, filtered or unfiltered accelerometers, magnetometers, and/or gyroscopes), temperature sensors, EMG sensors, ECG sensors, pulse sensors, blood pressure sensors, galvanic skin response sensors, humidity sensors, chemical sensors (e.g., $CO_2$, CO, $O_2$ sensors), ionizing radiation sensors, cameras, SONAR, LIDAR, proximity sensors, or other sensors. The sensors can be discrete or the sensors can be part of an actuator or other element of the flexible exosuit 100. For example, an exotendon could be configured to be used to detect one or more properties of the exotendon or the environment of the exotendon (e.g., to detect a strain and/or force experienced by the exotendon by measuring an impedance or voltage between and/or current through a pair of electrodes of the exotendon).

The sensors can be operated to generate data that can be used to operate the flexible exosuit 100. Data generated by the sensors could be used by a controller included in the flexible exosuit 100 to operate actuators (e.g., e.g., 150a-c, 170a-d) to perform some function. For example, the sensors could generate data indicating that the wearer 110 was engaging in locomotion and that the wearer 110 was at a first specified phase of a stereotypical locomotor cycle, and the controller could use that data to operate the exotendons 170a-d to extract negative work from the wearer 110. At a later point in time, the sensors could generate data indicating that the wearer 110 was engaging in locomotion and that the wearer 110 was at a second specified phase of the stereotypical locomotor cycle, and the controller could use that data to operate the exotendons 170a-d to assist the locomotion of the wearer 110 by transferring energy to the leg of the wearer 110 and/or to operate the twisted string actuators 150a, 150b, 150c to transfer energy to the leg of the wearer 110.

Flexible exosuits could additionally include elements corresponding to an arm or other additional or alternate anatomy of a wearer other than the leg (as illustrated by the flexible exosuit 100 of FIGS. 1A and 1B). Such flexible exosuits could be configured to increase the upper-body strength of a wearer and/or to assist in the carrying of loads in the arms of a wearer. A flexible exosuit having elements corresponding to an arm of a wearer could be configured to transfer mechanical energy to/from the arms of a wearer from/to the legs of the wearer, for example, to enable locomotion across a farther distance than the user could achieve without the transfer of mechanical energy from the arms to the legs of the wearer. A flexible exosuit could be configured to be symmetric across the midline of wearer (i.e., elements disposed relative to the left leg of a wearer are duplicated and mirrored and disposed relative to the right leg of the wearer) or could be asymmetric according to an application. For example, a flexible exosuit could be configured to apply forces to an injured leg of a wearer but not to the opposite leg of the wearer. Other configurations of a flexible exosuit are anticipated.

A flexible exosuit could be configured to apply forces and/or torques at a single joint or right/left pair of joints of a wearer. Such a flexible exosuit could include elements covering/disposed proximate to parts of the wearer distant from the single joint or could only include elements covering/disposed proximate to the single joint. Elements of the flexible exosuit configured to apply forces/torques to the single joint could be disposed proximate to the single joint or could be disposed elsewhere and mechanically coupled to the single joint, e.g., through a belt, cable, gears, twisted-string transmission, and/or some other method. In some examples, a flexible exosuit could be configured to apply forces across the ankles of a wearer. For example, the flexible exosuit could include a smart tendon exomuscle disposed on the back of the wearer's leg and configured to apply and/or transmit forces between two actuated elements mechanically coupled to the wearer's calf and foot, respectively. Elements of the STEM (e.g., a motor configured to drive a twisted string transmission) could be disposed near the ankle (e.g., on the back of the calf) or at other locations (e.g., attached to a belt worn by the wearer, and mechanically coupled to the ankle by a twisted string or cable transmission). Such a flexible exosuit could include additional elements, e.g., batteries, controllers, sensors, disposed according to an application. For example, sensors of the flexible exosuit could be disposed across the leg and torso to enable gait detection, a battery powering the flexible exosuit could be located on a belt worn by the wearer, etc.

A flexible exosuit (e.g., 100) could be operated to enable a variety of functions or modes of operation according to a variety of applications. In some applications, a flexible exosuit could have a mode of operation configured to reduce, monitor, and/or 'dose' fatigue during physical activity of a wearer. For example, the flexible exosuit could be operated to detect and/or prevent the development of fatigue during extended locomotion by the wearer. The flexible exosuit could act to extract, store, and/or inject energy to/from the legs of the wearer to reduce fatigue. Additionally or alternatively, the flexible exosuit could act to extract energy from the wearer during a first period and to inject the stored energy back to the wearer during a second period to 'level' the amount of exertion/fatigue the wearer experiences between the first and second periods. Other configurations and modes of operations of a flexible exosuit to reduce, monitor, and/or 'dose' fatigue during locomotion, climbing, carrying, or other extended physical activities of a wearer.

In some applications, a flexible exosuit could have a mode of operation configured to increase the strength of the wearer. For example, a flexible exosuit including elements to apply forces and/or torques to the arms of the wearer and/or between the arms of the wearer and the torso/legs of the wearer, the flexible exosuit could be operated to enable the wearer to lift objects heavier than and/or to apply forces greater than the wearer would naturally be capable. The flexible exosuit could apply forces and/or torques to the legs of the wearer to allow the wearer to jump higher than the wearer would naturally be capable. In some applications, the flexible exosuit could have a mode of operation configured to prevent injury of the wearer by applying protective forces and/or torques to joints of the wearer and/or applying clutches to compliant elements crossing joints of the wearer to prevent excessive joint and/or muscle motion or velocity. Operation of the flexible exosuit to prevent injury of the wearer could occur continuously and/or could occur when sensors of the flexible exosuit detect a state of the wearer and/or of the environment indicating an increased probability of the wearer being injured. In some applications, a flexible exosuit could have a mode of operation configured to assist a wearer to coordinate his/her actions with another wearer of a flexible exosuit or with some other information source. The flexible exosuit could coordinate the activity of the wearer by applying forces and/or torques to joints of the wearer in time with the source of coordination information and/or applying haptic information to the wearer (e.g., vibrating elements of the exosuit).

A flexible exosuit could have a mode of operation configured to provide information to and/or detect information from a wearer. For example, actuators of the flexible exosuit (e.g., twisted string actuators, exotendons, STEMs, EPAM actuators, vibration sources) could be operated to indicate some information to the wearer. In one example, a sequence of torque pulses could be applied to a joint of the wearer to indicate a battery status of the exosuit, or to indicate that the wearer should check a communications device. In another example, vibrating motors in the flexible exosuit could indicate that the wearer was straying from a commanded pose, where the commanded pose is a pose the wearer could assume to satisfy some objective, e.g., to minimize fatigue while crouching or standing. Motions, forces, or other mechanical outputs of the wearer could be detected by sensors and/or actuators of the flexible exosuit. The detected motions could be used to control functions of the exosuit and/or to control other systems in communication with the flexible exosuit. For example, a certain gesture (e.g., tapping the left foot against the ground twice) could be detected by the flexible exosuit and used to as a command, e.g., to prepare the exosuit to assist the wearer in climbing a wall, or to send an all-clear signal to a remote server. Additionally or alternatively, the motions, forces, and other mechanical information about the wearer could be recorded for later use, e.g., biomechanical research, physical training, motion capture for entertainment, or some other application.

A flexible exosuit could have modes of operation configured to cause a movement of the wearer even in cases where the wearer is unable to move or where the wearer is attempting to move in a manner contrary to the movement executed by the flexible exosuit. In an example, the wearer could be incapacitated, and the flexible exosuit could operate to move the wearer to safety and/or to a source of emergency assistance. In another example, a limb or other portion of the wearer could be wholly or partially paralyzed, and the flexible exosuit could operate to move the paralyzed portion of the wearer, e.g., to allow the wearer to locomote. A flexible exosuit could be operated to enable rehabilitation of a wearer (e.g., when the wearer has experienced a stroke, spinal cord injury, nerve damage, or some other injury or disease process), assisting weakened movements of the wearer and/or counteracting disordered movements of the wearer.

A flexible exosuit could be operated in combination with some other prosthetic system. For example, a wearer could be missing a limb, and the flexible exosuit could operate in combination with a prosthetic worn by the wearer and configured to replace some of the function of the missing limb. The flexible exosuit could be integrated with the prosthetic, and could be configured to mount the prosthetic to the wearer and/or to transmit forces and/or torques between the prosthetic and the wearer. In some example, information detected using sensors and/or actuators of the flexible exosuit (e.g., information about the posture and movement of a leg of the wearer) could be used to operate the prosthetic (e.g., a detected locomotor gait type, phase, speed, or other information from the leg of the wearer could be used to control a leg prosthetic to assume a configuration complementary to the configuration of the wearer's leg). Such a flexible exosuit could additionally be operated to optimize the movements of the wearer to complement the operation of the prosthetic during an activity (e.g., altering a gait pattern of a wearer's leg to complement a pattern of operation of a leg prosthetic).

II. A Reconfigurable, Wearable Platform for Mechatronic Interfacing with the Human Body Flexible exosuits as described herein could act as standard, multi-purpose platforms to enable a variety of mechatronic, biomedical, human interface, training, rehabilitative, communications, and other applications. A flexible exosuit could make sensors, electronically operated actuators, or other elements or functions of the flexible exosuit available to remote systems in communication with the flexible exosuit and/or a variety of applications, daemons, services, or other computer-readable programs being executed by processors of the flexible exosuit. The flexible exosuit could make the actuators, sensors, or other elements or functions available in a standard way (e.g., through an API, communications protocol, or other programmatic interface) such that applications, daemons, services, or other computer-readable programs could be created to be installed on, executed by, and operated to enable applications and/or modes of operation of a variety of flexible exosuits having a variety of different configurations. The API, communications protocol, or other programmatic interface made available by the flexible exosuit could encapsulate, translate, or otherwise abstract the operation of the flexible exosuit to enable the creation of such computer-readable programs that are able to operate to enable functions and/or operational modes of a wide variety of differently-configured flexible exosuits.

Additionally or alternatively, the flexible exosuit could be modular in its hardware configuration (i.e., actuators, sensors, or other elements could be added or subtracted from the flexible exosuit to enable applications, functions, and/or operational modes of the flexible exosuit). This modularity could be reflected in the processors, operating systems, or other controllers configured to operate the elements of the flexible exosuit. That is, the controllers of the flexible exosuit could determine the hardware configuration of the flexible exosuit dynamically (akin to "plug-and-play") and could adjust the operation of the flexible exosuit relative to the determined current hardware configuration of the flexible exosuit. Additionally or alternatively, the controllers of the flexible exosuit could be provided with information describing the hardware configuration of the flexible exosuit. This operation could be performed in a way that was 'invisible' to computer-readable programs (e.g., computer-readable programs describing methods to enable an operating mode of the flexible exosuit) accessing the functionality of the flexible exosuit through a standardized programmatic interface. For example, the computer-readable program could indicate to a controller of the flexible exosuit, through the standardized programmatic interface, that a specified level of torque was to be applied to an ankle of a wearer of the flexible exosuit. The controller of the flexible exosuit could responsively determine a pattern of operation of actuators, based on the determined and/or provided hardware configuration of the flexible exosuit, sufficient to apply the specified level of torque to the ankle of the wearer.

Further, the use of electronically operable actuators (e.g., twisted string actuators, EPAM actuators and/or haptic feedback elements, exotendons, electrostatic clutches, electrolaminates, etc.) could enable the use of standard driving electronics and communications and/or power busses and interconnects to enable function and operating modes of a flexible exosuit according to a variety of specialized applications and/or configurations. For example, individual configurations of flexible exosuits could be specified related to individual wearers, environments, sets of applications, or other considerations. The cost, time, or other resources required to design and enable such an individual flexible exosuit could be reduced by using such standard driving electronics, and communications and/or power busses, electrical and/or mechanical interconnects, controllers, computer-readable control programs, or other standardized aspects enabling the fabrication, programming, and operation of a flexible exosuit. Further, the use of such standard hardware and software could enable common applications, services, drivers, daemons, or other computer-readable programs to be created to enable functions or operating modes of a variety of flexible exosuits having a variety of respective configurations. A flexible exosuit configured in this way (i.e., to act as a standardized platform for a variety of applications) could operate according to a variety of different operating modes to enable a respective variety of applications of a flexible exosuit. For example, different modes of operation could correspond to the wearer walking, running, jumping, lifting, load carrying, climbing, cycling, exercising, training, controlling a virtual avatar, controlling a tele-robotic system, or some other application or activity of the wearer. In some examples, an operating mode (enabled, e.g., by a computer-readable program installed on the flexible exosuit) could not be compatible with the hardware configuration of the flexible exosuit. For example, the operating mode could require actuators to be coupled to the flexible exosuit and to be configured to apply a certain minimum amount of torque to the ankle of a wearer. If a control system of the flexible exosuit determines that the hardware configuration is insufficient to enable the operating mode, the control system could disable the operating mode and/or effect the operating mode at a reduced level. The control system could additionally or alternatively indicate that the hardware of the flexible exosuit was unable to fully enable the operating mode (e.g., by operating haptic elements or other actuators of the flexible exosuit) and/or indicate specifications and configurations of actuators that the wearer could acquire and install on the flexible exosuit to enable the operating mode. Other modes of operation and configurations of a flexible exosuit and elements thereof are anticipated.

III. Exotendons, Electrostatic Clutches, Electrolaminates, Controllable-Compliance Elements, Energy Storage and Recovery Elements, and Other Configurations of Electrostatic Metamaterials A flexible exosuit could include a plurality of flexible elements capable of being loaded under tension. In some applications, it could be useful for a flexible exosuit to include such tensile flexible elements where the elements had a compliance that was able to be electronically modulated (e.g., switched or clutched between two or more states). For example, the compliance of the element could have two or more discrete values, or a continuous range of values, according to an electronic operation of the element. Additionally or alternatively, the tensile flexible element could have a zero- or low-compliance state (i.e., transmitting longitudinal tension while exhibiting substantially no longitudinal strain) and an infinite- or high-compliance state (i.e., substantially incapable of transmitting tension while exhibiting whatever effective strain is required for such) and the tensile flexible element could change states according to electronic operation of the element. Such electronically-controlled-compliance tensile flexible elements could be implemented using electrostatic clutches (i.e., clutches configured to use electrostatic attraction to generate controllable forces between clutching elements), and are termed exotendons in this disclosure. Exotendons as described herein can be composed of flexible or rigid elements according to an application. Further, exotendons can be thin and conformal to curved or flat surfaces.

Figure 2A:
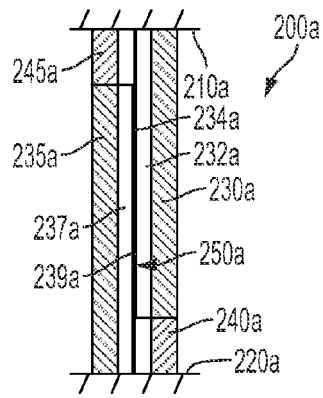
FIG. 2A illustrates elements of an exotendon.

FIG. 2A is a cross-sectional illustration of an example exotendon 200a. The exotendon includes first and second endplates 210a, 220a that are configured to be mechanically coupled to first and second elements of some other mechanism or apparatus (e.g., flexible and/or rigid force-transmitting elements of a flexible exosuit) according to an application. The exotendon 200a includes first and second low-compliance sheets 230a, 235a rigidly coupled to the first and second endplates 210a, 220a, respectively. The first and second low-compliance sheets 230a, 235a are locally substantially parallel to each other, and have a surface of overlap 250a. The first and second low-compliance sheets 230a, 235a additionally include respective conductive electrodes 232a, 237a coated in respective insulator layers 234a, 239a such that there is no direct high-conductance path between the first and second conductive electrodes 232a, 237a. The exotendon 200a additionally includes first and second high-compliance elements 240a, 245a connecting the first low-compliance sheet 230a to the second endplate 220a and the second low-compliance sheet 235a to the first endplate 210a, respectively. Similar configurations of two or more locally flat sheets that are configured to clutch together electrostatically (e.g., by including conductive electrodes disposed on the locally flat sheets) could be termed electrolaminates.

When the electrodes are uncharged, the exotendon 200a will generally act as a compliant element with a compliance corresponding to the compliance of the first low-compliance sheet 230a in series with the first high-compliance element 240a in parallel with the second low-compliance sheet 235a in series with the second high-compliance element 245a.

Application of a high voltage between the first and second conductive electrodes 232a, 237a causes the development of an attractive force between the conductive electrodes 232a, 237a and/or other elements of the exotendon 200a, acting to 'clutch' the first and second low-compliance sheets 230a, 235a together by applying a normal force between first and second low-compliance sheets 230a, 235a across the surface of overlap 250a. The insulator layers 234a, 239a have a specified resistivity allowing a specified low level of current to flow directly between the conductive electrodes 232a, 237a. When operated with high voltage in this way, the exotendon 200a will generally act as a relatively non-compliant element with a compliance corresponding to a first fraction of the compliance of the first low-compliance sheet 230a in series with a second fraction of the compliance of the second low-compliance sheet 235a, where the first and second fractions are related to the degree of overlap of the first and second sheets 230a, 235a.

Elements of the exotendon 200a or other similar clutched-compliance elements could be configured in a variety of ways and include a variety of materials. Further, the ordering and presence of the layers of exotendon 200a (i.e., first low-compliance sheet 230a>first conductive electrode 232a>first insulator layer 234a>second insulator layer 239a>second conductive electrode 237a>second low-compliance sheet 235a) is meant as an illustrative example. Other orderings of conductive layers, low-compliance sheets, and insulator layers are anticipated. In some examples, only one insulator layer may be present. In some examples, a conductive electrode and low-compliance sheet may be incorporated as a single element (i.e., a low-compliance, conductive material). The compositions, dimensions, and relative ordering of layers of an exotendon could be specified to achieve a desired level of clutching force (e.g., due to Coulombic attraction, Johnsen-Rahbek effects, or other physical principles), overall compliance in clutched and/or un-clutched states, or other considerations. An exotendon could additionally or alternatively be configured and operated to clutch and/or control a torsional compliance, a shear compliance, mechanical impedance, or some other mechanical property of the exotendon. In some examples, the high-compliance elements 240a, 245a could be part of protective packaging of the exotendon or could be omitted altogether. In some examples, additional layers, materials, or other elements could be included. For example, the low-compliance sheets 230a, 235a could include and/or be adhered to a fiber-reinforced or other variety of adhesive tape. The conductive electrodes 232a, 237a could include a variety of materials (e.g., aluminum, magnesium, copper, silver, gold, conductive carbon nanotubes) disposed by a variety of methods (e.g., chemical vapor deposition (CVD), physical vapor deposition (PVD), sputtering, adhesive bonding, lithography) onto respective low-compliance sheets 230a, 235a the could include a variety of materials (e.g., Mylar, polyimide, carbon fiber, polymers, crystals, liquid crystals). For example, the first conductive electrode 232a and first low-compliance sheet 230a could together be a sheet of aluminized Mylar. Additionally or alternatively, the conductive electrodes 232a, 237a and respective low-compliance sheets 230a, 235a could be a single material. For example, the second conductive electrode 237a and second low-compliance sheet 235a could together be a sheet of conductive polyimide. In other examples, the second conductive electrode 237a and second low-compliance sheet 235a could together be a sheet of polymer or other material impregnated with a conductive substance, e.g., conductive carbon nanotubes or other conductive particles.

The insulator layers 234, 239a could include a variety of materials according to an application. In some examples, the insulator layers 234, 239a could be polyurethane or some other polymer material. A conductive material, dipole, or other electrically-active element could be added to the polymer material to effect specified properties of the insulator layers 234, 239a (e.g., resistivity, breakdown voltage, dielectric constant, degree of charge migration at the surface of overlap 250a, high level of surface charge density at the surface of overlap 250a when the conductive electrodes 232a, 237a are charged) to effect certain properties of the exotendon 200a (e.g., clutching force, clutching pressure, coefficient of friction or degree of stiction at the surface of overlap 250a). For example, the insulator layers 234, 239a could be layers of polyurethane containing metal oxide particles or salts (e.g., tetrabutylammonium perchlorate).

The composition and operation of the exotendon 200a could be determined by desired operational characteristics of elements of the exotendon 200a and/or the exotendon 200a as a whole. Durability, strength, number of actuation cycles to failure, operating voltage, clutch and un-clutched compliance levels, clutching strength (e.g., the pressure exerted between elements of the exotendon 200a when the exotendon is operated to clutch), insulator layer resistivity, clutch switching time, and other properties could be specified according to an application of the exotendon 200a. For example, when the insulator layer is composed of polyurethane impregnated with a metal oxide, the exotendon 200a could be clutched using a voltage of 400 volts and 5 microamps applied to the conductive electrodes, and this applied voltage could result in a pressure of 7.5 pounds per square inch between the two sides of the clutch of the exotendon 200a. Further, the exotendon 200a could switch between the clutched and un-clutched state in less than 20 milliseconds and could be operated to clutch and to subsequently un-clutch more than 1000000 times before failing.

The exotendon 200a could be operated as a clutched-compliance element, switching between two or more states having two or more respective overall levels of compliance according to an application. In some examples, the exotendon 200a could be part of a flexible exosuit, and could be operated thusly to increase the efficiency of locomotion of a wearer by providing an appropriate additional compliance across a joint of the wearer during specified phases of locomotion. Additionally or alternatively, the exotendon 200a could be operated to reduce the compliance of the exotendon to protect a joint of a wearer, e.g., during a fall, while being operated during other periods to have a higher compliance so as to interfere less with the movement of the joint. In some examples, the high-compliance elements 240a, 245a could have a very high compliance, or could be omitted (thus having an effectively 'infinite' compliance), allowing the exotendon 200a to be operated as a switchable tensile flexible element. For example, such an exotendon 200a included in an arm of a flexible exosuit could be operated to allow unrestricted arm movement (i.e., to transmit substantially no tension) during a first period of time. The exotendon 200a could be operated during a second period of time to be substantially noncompliant (i.e., acting as a rigid element capable of transmitting longitudinal forces) during a second period, to transmit some of a load carried by the arm such that the wearer could expend less energy to carry the load. The ratio between the compliance of the exotendon 200a during the first period and the compliance of the exotendon 200a during the second period could be greater than 100:1. Other applications, configurations, and operations of the exotendon 200a are anticipated.

In some examples, the exotendon 200a could be connected in series with a spring, to allow the spring to be clutched to transmit forces (e.g., to/from a body of a wearer) during a first period of time and to transmit substantially no forces during a second period of time. For example, the exotendon 200a could be connected in series with a spring between the calf and the foot of a wearer, such that the exotendon 200a and spring could be operated to apply an extensor torque to the ankle of the wearer. The exotendon 200a could be clutched following contact of the heel of the user with the ground during locomotion. The clutched spring could then be 'charged' with elastic potential energy as the user flexes their ankle. The 'stored' elastic potential energy could be released to the ankle of the wearer as the wearer extends their ankle before lifting their foot from the ground; this storage and release of mechanical energy from/to the ankle of the wearer could increase the efficiency of the locomotion of the wearer. The exotendon 200 could be un-clutched following the lifting of the wearer's foot from the ground, such that the exotendon 200a and spring did not substantially affect the rotation and/or torque at the wearer's ankle while the wearer's foot was not in contact with the ground. Other configurations and patterns of use of a spring connected in series with an exotendon are anticipated according to an application. Further, the spring connected in the series with the exotendons could be implemented as an element of the exotendon, e.g., the high-compliance elements 240a, 245a of exotendon 200a.

The exotendon 200a could additionally be operated to dissipate energy. A high voltage could be applied between the first and second conductive electrodes 232a, 237a such that an attractive force develops between the conductive electrodes 232a, 237a. The high voltage could be controlled such that the first and second low-compliance sheets 230a, 235a were only partially 'clutched;' that is, an external force applied between the first and second endplates 210a, 220a could be sufficient to cause the first and second low-compliance sheets 230a, 235a to slip, allowing a displacement between the first and second endplates 210a, 220a to increase. In the process, some of the energy applied to the exotendon 200a by the force between the first and second endplates 210a, 220a could be dissipated by frictional heating of the surface of overlap 250a as the first and second low-compliance sheets 230a, 235a slip against each other.

The exotendon 200a illustrated in FIG. 2A is intended as an example of a broader class of controlled-compliance exotendons that could be included in a variety of applications and apparatus. Exotendons could include more than two low-compliance sheets. Exotendons could include multiple exotendons configured in series and/or parallel to enable certain applications. Exotendons could be flexible and/or compliant in non-longitudinal directions, and could be configured to flexibly conform to a curved surface.

The exotendon 200a could be operated, as part of a flexible exosuit worn by a wearer, to deliver haptic information to the wearer. The exotendon 200a, while under some nominal tension applied by segment of the body of the wearer and/or by elements of the flexible exosuit, could be operated to repeatedly clutch and un-clutch (and/or repeatedly clutch and partially un-clutch) by changing a voltage applied to the conductive electrodes 232b, 236b. A repeated change in compliance of and/or force transmitted by the exotendon 200a, mechanically coupled into the skin and/or body segments of the wearer by elements of the flexible exosuit, could cause the wearer to experience a haptic sensation. In some examples, the exotendon 200a could be operated to indicate a physical action and/or to indicate a change in a physical action to be performed by the wearer. In an example, the exotendon 200a could be activated across the knee of a wearer to indicate to the wearer that a step should be initiated using the leg of which the knee is a part. In another example, a wearer could be locomoting using a gait that is likely to result in fatigue and/or injury, and exotendons of a flexible exosuit worn by the wearer could indicate ways the wearer could alter their gait (e.g., by activating exotendons in directions of joint torque opposite 'good' directions of motion, to stimulate the wearer away from 'bad' motions) to reduce the rate of fatigue and/or the probability of injury.

An exotendon could include two low-compliance sheets, as exotendon 200a does, or could include more low-compliance sheets. Some of the more than two low-compliance sheets could have conductive electrodes and/or insulator layers on both sides. The more than two low-compliance sheets could be operated similarly to exotendon 200a. The additional low-compliance sheets could enable higher overall strength, higher strain to slip, or other properties to such an exotendon. The low-compliance sheets could have a specified compliance, and the conductive electrodes on the more than two low-compliance sheets could be operated to only clutch a subset of the more than two low-compliance sheets together. In this way, the overall compliance of the exotendon could be electronically actuated to have a number of values, where the value of the overall compliance of the exotendon is related to which of the more than two low-compliance elements are clutched together. Other configurations of an exotendon are anticipated.

Figure 2B:
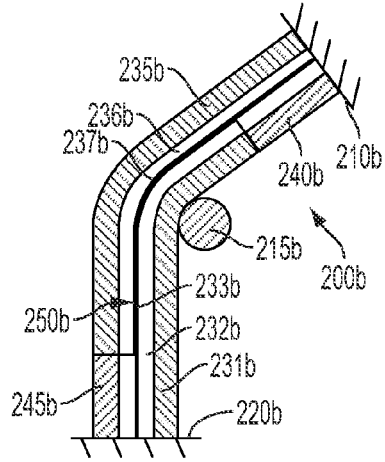
FIG. 2B illustrates elements of an exotendon.

FIG. 2B is a cross-sectional illustration of an example exotendon 200b. The exotendon includes first and second endplates 210b, 220b that are configured to be mechanically coupled to first and second elements of some other mechanism or apparatus (e.g., flexible and/or rigid force-transmitting elements of a flexible exosuit) according to an application. Similar to exotendon 200a, exotendon 200b includes first and second low-compliance sheets 231b, 235b rigidly coupled to the second and first endplates 220b, 210b, respectively. The first and second low-compliance sheets 231b, 235b are locally substantially parallel to each other, and have a surface of overlap 250b. The first and second low-compliance sheets 231b, 235b additionally include respective conductive electrodes 232b, 236b coated in respective insulator layers 233b, 237b such that there is no direct high-conductance path between the first and second conductive electrodes 232b, 236b. The exotendon 200b additionally includes first and second high-compliance elements 240b, 245b connecting the first low-compliance sheet 231b to the first endplate 210b and the second low-compliance sheet 235b to the first endplate 220b, respectively. The exotendon 200b is flexible, and is wrapped around a bar 215b. As a result, the exotendon 200b can be operated to transmit non-parallel, non-collinear forces between external elements that are coupled to the first and second endplates 210b, 220b by wrapping around the bar 215b and by transmitting forces into the bar 215b.

Figure 2C:
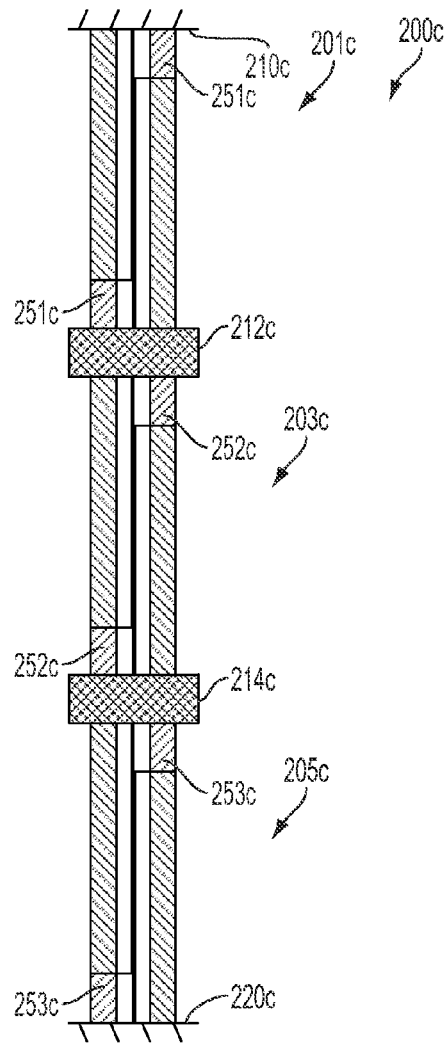
FIG. 2C illustrates elements of an exotendon.

An exotendon could be configured that included multiple independently actuated exotendons (e.g., exotendon 200a) connected in series. FIG. 2C is a cross-sectional illustration of an example exotendon 200c. The exotendon includes first and second endplates 210c, 220c that are configured to be mechanically coupled to first and second elements of some other mechanism or apparatus (e.g., flexible and/or rigid force-transmitting elements of a flexible exosuit) according to an application. Exotendon 200c includes three independently actuatable sub-exotendons 201c, 203c, 205c configured similarly to exotendon 200c and connected by series endplates 212c, 214c. That is, each sub-exotendon 201c, 203c, 205c includes two low-compliance sheets that are configured to be electrostatically clutched together. Further, each low-compliance sheet is connected directly to a first endplate and indirectly to a second, opposite endplate through an element having a specified compliance. The first sub-exotendon 201c includes first specified compliance elements 251c, the second sub-exotendon 203c includes second specified compliance elements 252c, and the third sub-exotendon 205c includes third specified compliance elements 253c. The overall compliance of the exotendon 200c is related to the compliance of the three sub-exotendons 201c, 203c, 205c connected in series.

Each of the sub-exotendons 201c, 203c, 205c can be independently clutched. That is, when clutched, a sub-exotendon has a first overall compliance substantially related to the compliance of the low-compliance sheets of the clutched sub-exotendon. Further, when unclutched, the sub-exotendon has a second overall compliance substantially related to the compliance of the low-compliance sheets of the sub-exotendon in series with the compliance of the specified compliance elements of the sub-exotendon. Thus, depending on the actuation of the three sub-exotendons 201c, 203c, 205c, the overall compliance of the exotendon 200c could be controlled to have one of eight different values.

The exotendon 200c could be operated (i.e., the sub-exotendons 201c, 203c, 205c could be actuated) to effect a specified compliance between first and second elements of some other mechanism or apparatus (e.g., elements of a flexible exosuit). For example, the compliance of the exotendon 200c, when configured to apply forces across a joint of a wearer of a flexible exosuit, could be operated to increase the efficiency of locomotion by the wearer by optimizing the impedance of the joint or operated according to some other application. Note that the illustrated exotendon 200c is only one example of an exotendon including independently actuated sub-exotendons connected in series; in general, an exotendon could include more or fewer than three sub-exotendons. Further, the sub-exotendons could be configured similarly to or differently from the sub-exotendons 201c, 203c, 205c according to an application. Note that, where an exotendon includes N independently actuated sub-exotendons, the sub-exotendons could be actuated such that the overall compliance of the exotendon could be controlled to have one of $2^N$ different levels, depending on the respective compliances of the low-compliance sheets and specified compliance elements of each of the sub-exotendons.

Figure 2D:
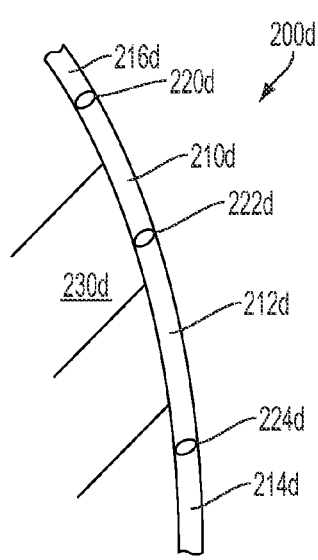
FIG. 2D is a side view of an exotendon.
Figure 2E:
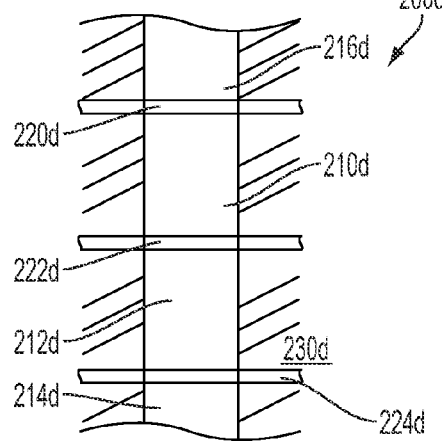
FIG. 2E is a front view of the exotendon of FIG. 2D.

FIGS. 2D and 2E show cross-sectional and front views, respectively, of exotendons 210d, 212d, 214d, 216d connected to force-transmitting elements 220d, 222d, 224d of a flexible exosuit 200d being worn by a wearer 230d. Each of the exotendons 210d, 212d, 214d, 216d is mechanically connected to neighboring force-transmitting elements 220d, 222d, 224d. The exotendons 210d, 212d, 214d, 216d could be configured and/or operated similarly to the exotendons described elsewhere herein (e.g., 200a, 200b, 200c). The exotendons 210d, 212d, 214d, 216d could be connected to the force-transmitting elements 220d, 222d, 224d to prevent the exotendons 210d, 212d, 214d, 216d from rubbing on the skin of the wearer 230d. In some examples, this could be accomplished by configuring the force-transmitting elements 220d, 222d, 224d as standoffs to prevent relative motion between the skin of the wearer 230d and surfaces of the exotendons 210*d*, 212*d*, 214*d*, 216*d*. The exotendons 210*d*, 212*d*, 214*d*, 216*d* could be operated to modulate the way forces are transmitted between the force-transmitting elements 220*d*, 222*d*, 224*d* to enable functions of the flexible exosuit 200*d*. For example, the exotendons 210*d*, 212*d*, 214*d*, 216*d* could be operated to modulate the compliance of the flexible exosuit 200 and/or the wearer 230 to increase the efficiency of locomotion, lifting or carrying an object, or some other activity of the wearer. The exotendons 210*d*, 212*d*, 214*d*, 216*d* could additionally or alternatively be operated to store and release energy, reposition the force-transmitting elements 220*d*, 222*d*, 224*d*, or other functions. Exotendons 210*d*, 212*d*, 214*d*, 216*d* and force-transmitting elements 220*d*, 222*d*, 224*d* configured similarly to those illustrated in FIGS. 2D and 2E on applications other than a flexible exosuit 200*d*; for example, such elements could be part of a robot, an assistive device, a prosthetic, an exosuit configured to be used by an animal, or some other device or system.

Note that exotendons described herein are intended as non-limiting examples of configurations and applications of exotendons. Two or more adjacent, locally parallel electrostatic clutching elements of an exotendon could be rectangular sheets or could have some other shape, and could be curved, wrapped, helical, cylindrical, or some other geometry according to an application. The distribution of conductive material on the locally parallel clutching elements could be uniform (i.e., evenly distributed across the locally parallel clutching elements) or could have some pattern, e.g., parallel linear, cross-hatching, fractals, or some other pattern according to an application. The exotendons could further include clutching elements that are not locally parallel sheets; that is, the exotendons could include other electrostatic clutching materials and configurations of materials. For example, the exotendons could include arrays of low-compliance electrostatic latches disposed on a high-compliance base material such that the exotendons had a first overall compliance related to the compliance of the base material when the latches are not latched and a second compliance related to the compliance of the latches when the latches are latched. For example, exotendons or other electrostatically-operated clutched-compliance elements could be configured as described in U.S. Pat. No. 8,436,508.

An exotendon can be configured to have some specified clutching force; that is, forces applied to the exotendon when the exotendon is being operated to assume a clutched state (e.g., a low-compliance state) will not cause the exotendon to increase in length or otherwise slip when the applied forces have a magnitude less than the clutching force. An exotendon could be operated in combination with other elements to increase the effective magnitude of the clutching force when the exotendon is operated in a clutched state. For example, friction between the exotendon and/or a cable or other element coupled to the exotendon could be used to increase the effective clutching force of the exotendon, e.g., by employing the capstan effect.

FIG. 3A shows a flexible exotendon 310*a* wrapped around a cylindrical capstan 324*a*. A first end of the exotendon 310*a* is connected to a first actuated element 322*a* that is rigidly mechanically coupled to the capstan 324*a*. A second end of the exotendon is connected via a cable 330*a* to a second actuated element (not shown). When the exotendon 310*a* is not being operated to clutch (i.e., a voltage is not applied between two or more conductive elements within the exotendon 310*a* such that the overall compliance of the exotendon 310*a* is high), the length of the exotendon 310*a* is able to be increased by tensile forces applied to the cable 330*a*. When the exotendon 310*a* is being operated to clutch (i.e., the over- all compliance of the exotendon 310*a* is caused to become low by application of voltage between conductive elements of the exotendon 310*a*), forces applied to the cable 330*a* that have a magnitude less than the magnitude of a capstan hold force cannot cause the length of the exotendon 310*a* to increase. Forces applied to the cable 330*a* cause an increase in a normal force between the exotendon 310*a* and the capstan 324*a*. This increased normal force results in an increased shear force between the exotendon 310*a* and the capstan 324*a* that is due to friction and that opposes the forces applied to the cable 330*a*. The capstan hold force is related to the clutching force of the exotendon 310*a*, the coefficient of friction between the exotendon 310*a* and the capstan 324*a*, and the angle across which the exotendon 310*a* contacts the surface of the capstan 324*a*. The capstan hold force can be greater than the clutching force of the exotendon 310*a*, such that the exotendon 310*a* and capstan 324*a*, in combination, could be able to resist forces applied to the cable 330*a* that have greater magnitude than could be resisted by the exotendon 310*a* without the capstan 324*a*.

FIG. 3B shows a flexible exotendon 310*b*. A first end of the exotendon 310*b* is connected to a first actuated element 322*b* that is rigidly mechanically coupled to a cylindrical capstan 324*b*. A second end of the exotendon is connected via a cable 330*b* to a second actuated element (not shown). The cable 330*b* is wrapped around the capstan 324*b* multiple times. When the exotendon 310*b* is not being operated to clutch (i.e., a voltage is not applied between two or more conductive elements within the exotendon 310*b* such that the overall compliance of the exotendon 310*b* is high), the length of the exotendon 310*b* is able to be increased by tensile forces applied to the cable 330*b*. When the exotendon 310*b* is being operated to clutch (i.e., the overall compliance of the exotendon 310*b* is caused to become low by application of voltage between conductive elements of the exotendon 310*b*), forces applied to the cable 330*b* that have a magnitude less than the magnitude of a capstan hold force cannot cause the length of the exotendon 310*b* to increase. Forces applied to the cable 330*b* cause an increase in a normal force between the cable 330*b* and the capstan 324*b*. This increased normal force results in an increased shear force between the cable 330*b* and the capstan 324*b* that is due to friction and that opposes the forces applied to the cable 330*b*. The capstan hold force is related to the clutching force of the exotendon 310*b*, the coefficient of friction between the cable 330*b* and the capstan 324*b*, and the number or times the cable 330*b* wraps around the capstan 324*b*. The capstan hold force can be greater than the clutching force of the exotendon 310*b*, such that the exotendon 310*b*, cable, 330*b*, and capstan 324*b*, in combination, could be able to resist forces applied to the cable 330*b* that have greater magnitude than could be resisted by the exotendon 310*b* without the cable 303*b* and capstan 324*b*.

The capstan hold force of the combination of the exotendon 310*b*, cable, 330*b*, and capstan 324*b* of FIG. 3B could be specified by choosing the radius of the capstan 324*b*, the number of times the cable 330*b* is wrapped around the capstan 324*b*, the coefficient of friction between the cable 303*b* and the capstan 324*b*, or other features. For example, more than one cable 330*b* could be connected to the exotendon 310*b* and wrapped around the capstan 324*b* or around some other element rigidly or otherwise coupled to the first actuated element 322*b*.

The configurations illustrated in FIGS. 3A and 3B are intended as illustrative examples of configurations of exotendons and elements connected to the exotendons having frictive surfaces such that shear forces at the frictive surfaces effectively multiply the clutching force of the exotendons.

Other configurations are anticipated. In some examples, other rigid elements than cylindrical capstans could be in frictive contact with exotendons and/or elements connected to exotendons. For example, an exotendon could be in contact with a curved surface of a rigid force-transmitting element (RFTE) of a flexible exosuit, such that the exotendon in combination with the RFTE could be operated to resists greater forces than the exotendon could resist if not in contact with the RFTE. The shape of those other rigid elements could be specified to maximize the ratio of the capstan holding force to the clutching force of the exotendon or according to some other consideration.

IV. Twisted String Transmissions for Mechanical Actuation

Many applications require linear actuators configured to apply forces and/or effect changes in displacement between two actuated elements. Twisted string actuators are a class of actuators that translate a torque and/or rotation into a force and/or displacement by twisting a string made of two or more flexible strands. Alternatively, a single strand can be folded in half and twisted about itself, resulting in a twisted string able to be incorporated into a twisted string actuator. Rotation of the string causes the two or more strands to twist, shortening the string and/or creating a force between the ends of the string. Such a string could have a first end connected to a first actuated element and a second end connected (via e.g., a thrust bearing) to a second actuated element to convert rotation (e.g., by a motor coupled to a segment or end of the string) of a segment or end of the string into displacement of and/or force between the first and second actuated elements. Further, because the twisted string can be flexible, a twisted string actuator can allow for actuation around curved and/or flexible elements. A twisted string actuator as described herein can be incorporated into a flexible exosuit to enable functions of the flexible exosuit or can be used in a variety of other applications.

FIG. 4A illustrates a twisted string actuator (TSA) 400 configured to apply a force across the ankle of a wearer 405. The force generated by the TSA 400 is coupled to the wearer 405 through a flexible mesh grip 440 worn around the calf of the wearer 405 and a rigid footplate 445 attached to the foot of the wearer 405. The TSA 400 includes an actuator head 410, a transmission tube 420, and a twisted string 430. A first end 433 of the twisted string 430 is rigidly connected to the rigid footplate 445 such that both torques and forces transmitted through the twisted string 430 are transmitted to the rigid footplate 445. A second end (435 in FIG. 4B) is attached to a rotor or other component of the actuator head 410 such that forces transmitted through the twisted string 430 are transmitted to the flexible mesh grip 440 through the actuator head 410 and/or transmission tube 420 and such that torques transmitted through the twisted string 430 are transmitted through the rotor or other component to the actuator head 410 through a rotary actuator, e.g., a motor.

Thus, the TSA 400 can be operated to produce a force and/or induce a reduction of displacement between the flexible mesh grip 440 and the rigid footplate 445 by applying a torque and/or rotation to the second end of the twisted string 430. This force and/or displacement could cause the ankle of the wearer 405 to extend and/or to apply a force and/or torque to the environment of the wearer 405 (e.g., to the ground beneath the wearer 405). Additionally or alternatively, the TSA 400 could be actuated to reduce a force between the flexible mesh grip 440 and the rigid footplate 445 by reducing, removing, or otherwise changing a torque applied to the second end of the twisted string 430.

The TSA 400 could additionally or alternatively be operated to be driven by motions, forces, and/or torques applied between the flexible mesh grip 440 and the rigid footplate 445 by the wearer 405. For example, the rotary actuator in the actuator head 410 could be operated to extract energy from rotation of the twisted string 430 caused by the application of force between the flexible mesh grip 440 and the rigid footplate 445. This energy could be stored by some other system connected to the rotary actuator. Additionally or alternatively, the TSA 400 could be operated to act as a brake on changes in displacement between the flexible mesh grip 440 and the rigid footplate 445 (caused, e.g., by movement of the ankle of the wearer 405).

TSA 400, as illustrated in FIG. 4A, is attached to a first actuated element that is flexible (i.e., flexible mesh grip 440) and to a second actuated element that is rigid (i.e., rigid footplate 445) and configured to apply forces and/or torques across the ankle of a wearer 405. However, a general TSA could be configured to operate across different joints or to be operated in other applications requiring linear or other actuation. Further, a general TSA could be mechanically coupled to other combinations of rigid, flexible, semi-rigid, or otherwise configured actuated elements than flexible and rigid first and second actuated elements, respectively.

Transmission tube 420 is a single, straight, rigid tube. However, a general TSA could be differently configured, as described in detail below. A transmission tube could be straight, curved, serpentine, or have some other shape according to an application. Additionally or alternatively, a transmission tube could be flexible in some way; in some examples, the transmission tube could withstand longitudinal forces while allowing the transmission tube to be bent, for example, around a joint that flexes during operation of the TSA. That is, the transmission tube and twisted string partially contained therein could be configured analogously to the outer housing and inner cable, respectively, of a Bowden cable.

Further, the transmission tube 420 and/or elements attached thereto (e.g., flexible mesh grip 440) could be configured to be adjustable, such that properties of the TSA 400 are adjustable. For example, the transmission tube 420 could include lockable and/or actuated telescoping elements such that the overall length of the transmission tube 420 (i.e., the length between the actuator head 410 and the end of the transmission tube 420 from which the twisted string 430 emerges) could be changed and/or controlled to control a range-of-motion, a transmission ratio, or some other property of the TSA 400. Additionally or alternatively, the transmission tube 420 and/or the flexible mesh grip 440 could be configured to allow the relationship between the transmission tube 420, the flexible mesh grip 440, and the rigid footplate 445 to be changed (i.e., to bring the end of the transmission tube 420 proximate to the rigid footplate 445 closer to the rigid footplate 445) to control a range-of-motion, a transmission ratio, or some other property of the TSA 400. Other methods and types of reconfiguration and/or actuation of the TSA 400 are anticipated.

FIG. 4B is a close-up cross-sectional view of elements of the actuator head 410, transmission tube 420, and twisted string 430 of the twisted string actuator (TSA) 400 illustrated in FIG. 4A. TSA 400 includes a housing 460 that contains part of the transmission tube 420, part of the twisted string 430 (including first and second strands 430*a*, 230*b*; FIG. 4B illustrates the second end 435 of the twisted string 430), a load cell and encoder 445, a thrust bearing 440, a transmission block 470, a slip clutch 455, and a motor 450.

The housing 460, transmission tube 420, load cell and encoder 445, stator elements of the thrust bearing 440, and stator elements of the motor 450 are rigidly mechanically coupled. The second end 435 of the twisted string 430, the transmission block 470, and a first end of the slip clutch 455 are rigidly mechanically connected. A second end of the slip clutch 455 and rotor elements of the motor 450 are rigidly connected.

The motor 450 could be operated to generate a torque between the housing 460 and the second end of the slip clutch 455. This torque could be transmitted through the slip clutch 455 and the transmission block 470 to the twisted string 430, resulting in the TSA 400 applying a torque and/or force between the flexible mesh grip 440 and the rigid footplate 445. Similarly, the motor 450 could be operated such that a rotation of the rotor of the motor 450 resulted in a change in displacement between the flexible mesh grip 440 and the rigid footplate 445.

The slip clutch could be configured such that the torque transferred between the motor 450 and the transmission block 470 does not exceed a specified torque level. The specified torque level could be chosen or set such that a force applied between the flexible mesh grip 440 and the rigid footplate 445 by TSA 400 does not exceed a specified force level. The specified force level could be related to the specified torque level and a transmission ratio of the TSA 400 related to the length of the twisted string 430 and the pitch of the twist of the strands 430a, 430b of the twisted string 430.

The load cell and encoder 445 are configured to measure the force transmitted through and the rotation of the second end 435 twisted string 430. The load cell could include piezoelectric elements, strain gauges, or other elements configured to transduce the force transmitted from the second end 435 of the twisted string 430 into the transmission tube 420 and actuator head 410 into a signal or value able to be used as an indicator of that transmitted force (e.g., an electrical voltage). The encoder could include optical or other elements capable of measure the absolute and/or relative rotation of the second end 435 of the twisted string 430 directly and/or indirectly (e.g., by detecting absolute or relative rotation of the transmission block 470, twisted string 430, and/or a rotor of the thrust bearing 440).

For example, the rotor of the thrust bearing 440 could include a grating that is curved radially around the axis of the thrust bearing 440 and that extends into the load cell and encoder 445. The encoder could include at least one light emitter and at least two light detectors arranged such that a beam of light from the at least one emitter could be detected by the at least two detectors, unless a slat of the grating of the thrust bearing 440 is interposed between one or more of the at least two detectors and the at least one emitter. A pattern of occlusion of the at least two detectors over time could be detected and used to determine an angle and direction of rotation of the thrust bearing 440 rotor (and by proxy, the second end 435 of the twisted string 430). Other types of sensors and sensed elements of rotating members are anticipated, e.g., magnetic sensors, optical sensors, and electrical contacts in contact with corresponding conductive trace patterns. Additionally or alternatively, the motor 450 could be operated to detect rotation of the motor 450 (e.g., by detecting back EMF on coils of the motor 450 and/or counting a number and pattern of coil activations) and from the detected rotation of the motor 450 to infer rotation of the second end 435 of the twisted string 430.

Information from the load cell and encoder 445 could be used to operate TSA 400, for example, to operate the TSA 400 using feedback. For example, a controller could operate the motor 450 based on forces and/or rotations detected using the load cell and encoder 445 to generate a constant force in the twisted string, a constant rotation of the second end 435 of the twisted string 430, or some other specified pattern of actuation of the TSA 400. Additionally or alternatively, a controller could be configured to derive other detectable parameters of the TSA 420, flexible mesh grip 440 and/or rigid footplate 445. For example, the controller could be configured to determine a rotation rate of the second end 435 of the twisted string 430 corresponding to a specified rate of change of linear displacement between the flexible mesh grip 440 and the rigid footplate 445 based on a stored, known, or otherwise determined current length and/or level of twist of the twisted string 430. The controller could then operate the TSA 400 to effect the specified rate of change of linear displacement by operating the motor 450 to effect the rotation rate corresponding to the rate of change of linear displacement. Other methods of operation of the TSA 400 are anticipated.

The TSA 400 illustrated in FIGS. 4A and 4B includes elements configured such that the direction of a force transmitted by the twisted string 430 is in the direction of and aligned with the axis of rotation of the motor 450, the thrust bearing 440, and the second end 435 of the twisted string 430. This alignment could reduce wear and fatigue of the twisted string 430 compared to other configurations. A TSA could additionally include a grommet or other element a specified distance along the axis of rotation and configured to ensure that the direction of a force transmitted by the second end 435 of the twisted string 430 is in the direction of and aligned with the axis of rotation. Note that the direction of a force transmitted by sections of the twisted string 430 that are on the distal side of the grommet relative to the actuator head 410 could be different than the direction of the axis of rotation. Additionally or alternatively, a TSA could include a gimbal and a constant-velocity or universal joint and could be configured such that a thrust bearing, second end of a twisted string, or other rotational elements of the TSA were coupled to the gimbal such that the axis of rotation of the rotational elements of the TSA are aligned with the direction of a force transmitted by the second end of the twisted string. This configuration could reduce wear and fatigue of the twisted string compared to other configurations.

The TSA 400 could be configured to be partially disassembled. For example, the motor 450 and/or elements of the slip clutch 455 could be removed from the actuator head 410 without removing other elements, e.g., the twisted string 430 and transmission block 470. In another example, the transmission block 470, elements of the slip clutch 455 and thrust bearing 440 and the twisted string 430 could be removed without fully disassembling the TSA 400. This partial disassembly could allow for broken elements (e.g., a twisted string 430 that has been flexed, stressed, fatigued, or otherwise utilized to failure) to be replaced quickly and easily (i.e., field-stripped). Additionally or alternatively, this partial disassembly could allow for components having different properties to be swapped out of the TSA 400 according to changing conditions, wearers, and/or applications. For example, a set of twisted strings could be fabricated such that individual twisted strings of the set are configured for respective individual wearers (e.g., wearers having respective different heights, calf lengths, foot lengths, or other properties). A twisted string of the set corresponding to properties of the wearer 405 could be quickly and easily installed in the TSA 400. Additionally or alternatively, the TSA 400 could be operated using a first twisted string having properties (transmission ratio, length, stroke length) specified to enable basic operation of the TSA 400 for a broad population of wearers.

The wearer 405 could operate the TSA 400 and sensors (e.g., the load cell 445, encoder 440, or other sensors) could be operated to determine an optimal transmission ratio, length, stroke length, or other properties of the TSA 400. The second twisted string having properties corresponding to the determined optimal properties could be quickly and easily installed in the TSA 400. Motors 450, slip clutches 455, or other elements could be similarly matched to the wearer 455 and quickly and easily installed in the TSA 400.

The transmission block 470 connected the twisted string 430 to other elements of the TSA 400 within the actuator head 410 and/or transmission tube 420. The transmission block 470 transmits linear forces from the twisted string 430 through the thrust bearing 440 and load cell and encoder 445 to the transmission tube 420 and/or actuator head 410. The transmission block 470 transmits torque from the motor 450 (via the slip clutch 455) to the twisted string 430. Forces, especially time-varying cyclical forces, applied between the transmission block 470 and the strands 430*a*, 430*b* of the twisted string 430 can cause the strands 430*a*, 430*b* to fail at the second end 435 in or near the transmission block 470 before the strands 430*a*, 430*b* fail at other locations along the twisted string 430.

Individual strands 430A, 430*b* of the twisted string 430 enter the transmission block 470 and come into contact with the transmission block 470 along a contact surface 437. The ends of the individual strands 430A, 430*b* rigidly attach to the structure of the transmission block 470 by being tied, welded, clamped, or by some other fixation method. The contact surface 437 has an overall radius of curvature such that loads between the individual strands 430A, 430*b* and the transmission block 470 are distributed substantially evenly across the contact surface 437. That is, a surface on which an individual strand 430A, 430*b* contacts the transmission block 470 can be approximated by an arc of a circle having a radius equal to the radius of curvature. Additionally or alternatively, the contact surface 437 could correspond to a compound curve in three dimensions. The shape of the contact surface 437 could be specified to reduce the rate of fatigue and/or the probability of failure of the strands 430*a*, 430*b* of the twisted string 430 compared to other configurations of the transmission block 470. Additionally or alternatively, the strands 430A, 430*b* could be tied together using a knot (e.g., a single or triple fisherman's knot) and looped around a smooth rigid or semi-rigid element (e.g., a cylinder). The smooth element could be incorporated in the TSA 400 in the place of the transmission block 470. Additionally or alternatively, the smooth element could be incorporated into the transmission block 470.

In some examples, the twisted string 430 could be fabricated from a single strand folded in half and twisted about itself, such that the strands 430*a*, 430*b* correspond to respective halves of the single strand. In those examples, the region of the folding of the single strand corresponds to the second end 435 of the twisted string 430. The halves of the single strand could be folded around a securing element that is mechanically coupled to rigid footplate 445. The securing element could be a cylinder or some other smooth rigid or semi-rigid element configured to minimize the concentration of stress in the strands 430*a*, 430*b* of the twisted string. The radius of the cylinder or other smooth element could be a specified value large enough that, when the TSA 400 is operated to cause maximum twist of the twisted string 430, the strands 430*a*, 430*b* leaving the cylinder or other smooth element form an angle greater than 90 degrees.

Properties of the twisted string 430 and of the individual strands 430*a*, 430*b* of the twisted string 430 could be specified to satisfy some constraint(s) and/or to have some property(s) according to an application. For example, a diameter and composition of the strands 430*a*, 430*b* could be chosen such that the twisted string 430 had a specified strength, fatigue resistance, transmission ratio, compliance, or some other property or properties. In some examples, the strands of the twisted string could be wholly or partially composed of ultra-high-molecular-weight polyethylene or some other high strength, low bending radius, low internal friction, high stiffness material.

The twisted string 430 could be configured and/or include additional elements to reduce the rate of fatigue and/or the probability of failure of the twisted string 430. For example, the individual strands 430*a*, 430*b* near the second end 435 could have a coating or cladding to smooth the transition between contact and non-contact with the transmission block 470. For example, the ends of the individual strands 430*a*, 430*b* could be wholly or partially encased in and/or coated with PTFE, another fluoro-polymer, and/or some other low-friction material. To reduce fatigue of and/or reduce the chance of failure of the twisted string 430, low-friction or otherwise protective coatings and/or claddings could be applied along part of or the entire length of the individual strands 430*a*, 430*b*. Additionally or alternatively, a lubricant could be applied to the twisted string 430, e.g., a silicone lubricant. A low-friction protective material could be interposed between the individual strands 430*a*, 430*b* of the twisted string 430 to reduce friction between the individual strands 430*a*, 430*b* and to prevent surface roughness or other aspects of the individual strands 430*a*, 430*b* from damaging the individual strands 430*a*, 430*b* during use of the TSA 400. For example a long, narrow strip of Teflon sheet (or some other low-friction material) could be interposed between the individual strands 430*a*, 430*b*.

The fabrication of the individual strands 430*a*, 430*b* and/or the twisted string 430 could be executed in such a way as to reduce the rate of fatigue and/or the probability of failure of the strands 430*a*, 430*b* of the twisted string 430. In some examples, the strands 430*a*, 430*b* could individually be fabricated to have a helical geometry such that the individual strands 430*a*, 430*b* experienced minimal internal strain when assembled into the twisted string 430 and when the twisted string 430 is actuated to 'mid-stroke' (i.e., the twisted string 430 is rotated such that the length of the twisted string 430 was some length between the full length of the un-twisted twisted string 430 and a length corresponding to some maximal functional twist of the twisted string 430). This could be accomplished by assembling a bundle of fibers. A first twist could be applied to the bundle of fibers. The bundle of fibers could then be folded in half about an attachment point (e.g., a smooth cylinder rigidly coupled to the rigid footplate 445) such that the point of the folding becomes the second end 435 of the twisted string 430. The two halves of the bundle (identical with respective strands 430*a*, 430*b*) could then be twisted in about each other to form the twisted string 430. The ends of the bundle could be tied together and secured to the transmission block 470. The fibers of the twisted string 430 can exhibit minimal strain at some level of twist and/or length; this level of twist and/or length can be related to the magnitude of the first twist. Thus the magnitude of the first twist could be specified in order to fabricate a twisted string having a specific transmission ration, length, stroke length, or combination of these properties related to the specified magnitude of the first twist. In some examples, the strands 430*a*, 430*b* could be assembled into the twisted string 430 (i.e., tied, welded, clamped, or otherwise attached to string-terminating elements, e.g., the transmission block 470) and the twisted string 430 could be stretched and heated such that the lengths of the individual strands 430a, 430b become more identical.

A twisted string actuator (TSA) could include a string having two strands, like the strands 430a, 430b of the twisted string 430 of TSA 400, or could include more than two strands. The arrangement of the two or more strands could be controlled and/or specified. In some examples, the arrangement of the two or more strands could be controlled by the configuration of a transmission block (e.g., 470) or by the way in which ends of the strands opposite the transmission block are attached to each other and/or to an actuated element. For example, a transmission block could be configured such that the transmission block causes four strands of a twisted string attached to the transmission block to assume a square configuration, a diamond configuration, a triangular configuration (i.e., three of the four strands form a triangle, and the fourth strand is maintained at the center of the triangle), or some other configuration according to an application. Additionally or alternatively, a twisted string could include one or more spaces along the length of the twisted string to control the arrangement of the two or more strands of the twisted string. A spacer could include strips of Teflon or other low-friction substances to additionally reduce the friction between the individual strands of the twisted string as the twisted string is twisted.

TSA 400 is one embodiments of a twisted string actuator (TSA) as described herein. Other configurations of TSAs, including alternate, additional, fewer, and/or differently configured components are anticipated. A TSA could include multiple twisted strings, different number(s) of strands, multiple motors, twisted strings actuated by two rotational actuators (i.e., a rotational actuator coupled to each end of the twisted string), more than one transmission tube, differently configured transmission tubes, different locations and/or means of attachment to actuated elements, or other configurations according to an application. For example, FIGS. 5A-5G illustrates alternate configurations of twisted string actuators (TSAs) 500a-500g.

FIG. 5A illustrates a TSA 500a attached to first 510a and second 520a actuated elements such that the TSA 500a could be operated to apply a force and/or change a displacement between the first 510a and second 520a actuated elements. The TSA 500a includes a transmission tube 550a rigidly coupled to the first actuated element 510a and a stator of a motor 540a. The first actuated element 510a is rigidly attached to the transmission tube 550a and the motor 540a near the connection between the transmission tube 550a and the motor 540a. A first end of a twisted string 530a is mechanically coupled to the second actuated element 520a. A rotor of the motor 540a is coupled to a second end of the twisted string 530a such that the motor 540a can be operated to apply a torque and/or rotation to the second end of the twisted string 530a such that the TSA 500a applies a force and/or changes a displacement between the first 510a and second 520a actuated elements.

FIG. 5B illustrates a TSA 500b attached to first 510b and second 520b actuated elements such that the TSA 500b could be operated to apply a force and/or change a displacement between the first 510b and second 520b actuated elements. The TSA 500b includes a transmission tube 550b rigidly coupled to the first actuated element 510b and a stator of a motor 540b. The first actuated element 510b is rigidly attached to the transmission tube 550b near the end of the transmission tube 550b opposite the motor 540b. A first end of a twisted string 530b is mechanically coupled to the second actuated element 520b. A rotor of the motor 540b is coupled to a second end of the twisted string 530b such that the motor 540b can be operated to apply a torque and/or rotation to the second end of the twisted string 530b such that the TSA 500b applies a force and/or changes a displacement between the first 510b and second 520b actuated elements.

FIG. 5C illustrates a TSA 500c attached to first 510c and second 520c actuated elements such that the TSA 500c could be operated to apply a force and/or change a displacement between the first 510c and second 520c actuated elements. The TSA 500c includes a stator of a motor 540c rigidly coupled to the first actuated element 510c. A first end of a transmission tube 550c is rigidly coupled to a rotor of the motor 540c. A first end of a twisted string 530c is mechanically coupled to the second actuated element 520c. A second end of the twisted string 530c is mechanically coupled to a second end of the transmission tube 550c. A motor 540b can be operated to apply a torque and/or rotation to the first end of the twisted string 530b through the transmission tube 550c such that the TSA 500c applies a force and/or changes a displacement between the first 510c and second 520c actuated elements.

FIG. 5D illustrates a TSA 500d attached to first 510d and second 520d actuated elements such that the TSA 500d could be operated to apply a force and/or change a displacement between the first 510d and second 520d actuated elements. The TSA 500d includes a first rigid transmission tube 551d rigidly coupled to a flexible transmission tube 553d and a stator of a motor 540d. The flexible transmission tube 553d is configured to transmit torques and/or forces along its length and to be flexible in directions perpendicular to its length (similar to the outer housing of a Bowden cable). The first actuated element 510a is rigidly attached to a second rigid transmission tube 552d which is in turn rigidly coupled to an end of the flexible transmission tube 553d opposite the end of the flexible transmission tube 553d connected to the first rigid transmission tube 551d. A first end of a twisted string 530d is mechanically coupled to the second actuated element 520d. A rotor of the motor 540d is coupled to a second end of the twisted string 530d such that the motor 540d can be operated to apply a torque and/or rotation to the second end of the twisted string 530d such that the TSA 500d applies a force and/or changes a displacement between the first 510d and second 520d actuated elements. The flexible transmission tube 553d could enable the TSA 500d to be operated conformably along a partially curved surface or other element (i.e., the flexible transmission tube 553d could conform to the curved aspect of the partially curved surface) and/or to be operated while the flexible transmission tube 553d is flexed, e.g., the flexible transmission tube 553d crosses a joint or hinge and enables operation of the TSA 500d while the hinge or joint flexes.

FIG. 5E illustrates a TSA 500e attached to first 510e and second 520e actuated elements such that the TSA 500e could be operated to apply a force and/or change a displacement between the first 510e and second 520e actuated elements. The TSA 500e includes a flexible transmission tube 552e rigidly coupled to a rigid transmission tube 551e and a stator of a motor 540e. The flexible transmission tube 552e is configured to transmit torques and/or forces along its length and to be flexible in directions perpendicular to its length (similar to the outer housing of a Bowden cable). The first actuated element 510e is rigidly attached to the rigid transmission tube 551e near an end of the rigid transmission tube 551e opposite the end of the rigid transmission tube 551e connected to the flexible transmission tube 552e. A first end of a twisted string 530e is mechanically coupled to the second actuated element 520e. A rotor of the motor 540e is coupled to a second end of the twisted string 530e such that the motor 540e can be operated to apply a torque and/or rotation to the second end of the twisted string 530e such that the TSA 500e applies a force and/or changes a displacement between the first 510e and second 520e actuated elements. The flexible transmission tube 552e could enable the TSA 500e to be operated conformably along a partially curved surface or other element (i.e., the flexible transmission tube 552e could conform to the curved aspect of the partially curved surface) and/or to be operated while the flexible transmission tube 552e is flexed, e.g., the flexible transmission tube 552e crosses a joint or hinge and enables operation of the TSA 500e while the hinge or joint flexes.

FIG. 5F illustrates a TSA 500f attached to first 510f and second 520f actuated elements such that the TSA 500f could be operated to apply a force and/or change a displacement between the first 510f and second 520f actuated elements. The TSA 500f includes a flexible transmission tube 552e rigidly coupled to the first actuated element 510f and a stator of a motor 540f. The flexible transmission tube 550f is configured to transmit torques and/or forces along its length and to be flexible in directions perpendicular to its length (similar to the outer housing of a Bowden cable). The first actuated element 510f is rigidly attached to the flexible transmission tube 550f near the end of the flexible transmission tube 550f opposite the motor 540f. A first end of a twisted string 530f is mechanically coupled to the second actuated element 520f. A rotor of the motor 540f is coupled to a second end of the twisted string 530f such that the motor 540f can be operated to apply a torque and/or rotation to the second end of the twisted string 530f such that the TSA 500f applies a force and/or changes a displacement between the first 510f and second 520f actuated elements. The flexible transmission tube 550f could enable the TSA 500f to be operated conformably along a curved surface or other element and/or to be operated while the flexible transmission tube 550f is flexed, e.g., the flexible transmission tube 550f crosses one or more joints or hinges and enables operation of the TSA 500f while the hinges or joints flex.

FIG. 5G illustrates a TSA 500g and first 510g and second 520g actuated elements. The first 510g and second 520g actuated elements are configured to rotate about an axis 515g. TSA 500g is attached to first 510g and second 520g actuated elements such that the TSA 500g could be operated to apply a torque and/or change an angle between the first 510g and second 520g actuated elements about the axis 515g. The TSA 500g includes a first transmission tube 551g rigidly coupled to the first actuated element 510g and a stator of a motor 540g and a second transmission tube 552g rigidly coupled to the second actuated element 520g and a first end of a twisted string 530g. The TSA 500g additionally includes a spacing member 553g configured to rotate about the axis 515g and connected to a grommet 555g through which the twisted string 530g passes. A rotor of the motor 540g is coupled to a second end of the twisted string 530g such that the motor 540g can be operated to apply a torque and/or rotation to the second end of the twisted string 530g such that the TSA 500g applies a torque and/or changes an angle between the first 510g and second 520g actuated elements about the axis 515g.

A TSA can include more than one string. TSAs can include additional strings configured in a variety of ways to enable additional functionality and/or improve or control one or more operating characteristics of the TSA. For example, including additional strings in a TSA could increase the strength, stroke length, usable lifetime, redundancy, or other characteristics of the TSA. Further, the TSA could be configured to enable differential operation of the strings of the TSA, enabling higher transmission ratios between the motor of the TSA and the linear actuation of the TSA, or other characteristics or operational modes. A variety of TSAs including multiple strings are illustrated in FIGS. 6A-6E.

Figure 6A:
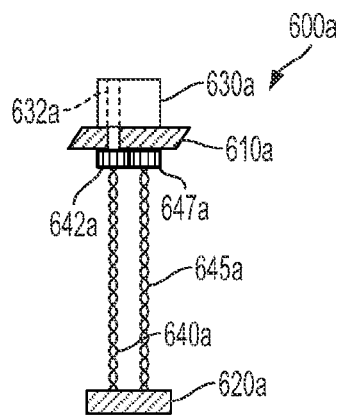
FIG. 6A illustrates a twisted string actuator.

FIG. 6A illustrates a TSA 600a attached to first 610a and second 620a actuated elements such that the TSA 600a could be operated to apply a force and/or change a displacement between the first 610a and second 620a actuated elements. The TSA 600a includes a stator of a motor 630a rigidly coupled to the first actuated element 610a. The TSA 600a additionally includes first 640a and second 645a twisted strings that have respective first ends mechanically coupled to the second actuated element 620a. The TSA 600a further includes first 642a and second 647a gears mechanically coupled to the first actuated element 610a such that the gears 642a, 647a are able to rotate relative to the first actuated element 610a but are unable to translate relative to the first actuated element 610a. The gears 642a, 647a are enmeshed with each other and have an identical number of teeth such that a rotation of one gear is accompanied by an opposite and substantially equal rotation of the other gear. The second gear 647a is mechanically coupled to a second end of the second twisted string 645a. A rotor of the motor 632a is coupled to the first gear 642a and a second end of the first twisted string 640a such that the motor 630a can be operated to apply opposite and substantially equal torque and/or rotations to the second ends of the twisted strings 640a, 645a such that the TSA 600a applies a force and/or changes a displacement between the first 610a and second 620a actuated elements.

Figure 6B:
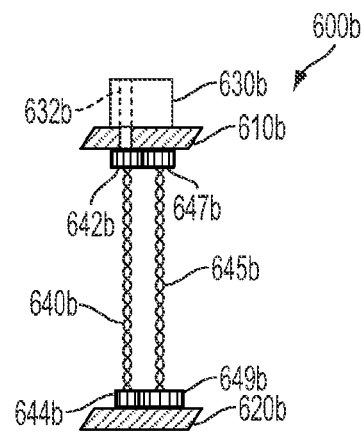
FIG. 6B illustrates a twisted string actuator.

FIG. 6B illustrates a TSA 600b attached to first 610b and second 620b actuated elements such that the TSA 600b could be operated to apply a force and/or change a displacement between the first 610b and second 620b actuated elements. The TSA 600b includes a stator of a motor 630b rigidly coupled to the first actuated element 610b. The TSA 600b additionally includes a two sets of gears. A first set of gears includes first 642b and second 647 gears that are mechanically coupled to the first actuated element 610b such that the first set of gears 642b, 647b are able to rotate relative to the first actuated element 610b but are unable to translate relative to the first actuated element 610b. The first set of gears 642b, 647b are enmeshed with each other and have an identical number of teeth such that a rotation of one of the gears is accompanied by an opposite and substantially equal rotation of the other gear of the first set of gears 642b, 647b (i.e., the first set of gears 642b, 647b has a gear ratio of unity). A second set of gears includes third 644b and fourth 649 gears that are mechanically coupled to the second actuated element 620b such that the second set of gears 644b, 649b are able to rotate relative to the second actuated element 620b but are unable to translate relative to the second actuated element 620b. The second set of gears 644b, 649b are enmeshed with each other and have a different number of teeth such that a rotation of one of the gears is accompanied by an opposite and substantially different rotation of the other gear of the second set of gears 644b, 649b (i.e., the second set of gears 644b, 649b has a non-unity gear ratio).

The TSA 600b additionally includes first 640b and second 645b twisted strings that have respective first ends mechanically coupled to the third 644b and fourth 649b gears, respectively. The first 640b and second 645b twisted strings additionally have respective second ends mechanically coupled to the first 642b and second 647b gears, respectively. A rotor of the motor 632b is coupled to the first gear 642b such that the motor 630b can be operated to apply opposite and substantially equal torque and/or rotations to the second ends of the twisted strings 640b, 645b. As a result of such rotations and/or torques, first ends of the twisted strings 640b, 645b rotations opposite each other and having a ratio related to the ratio of the number of teeth on the third gear 644b and the number of teeth on the fourth gear 649b. Further, these rotations can cause the TSA 600b to apply a force and/or change a displacement between the first 610b and second 620b actuated elements. A transmission ratio of the TSA 600b could be defined as a ratio between a torque applied by the rotor 632b and the forces applied between the first and second actuated elements 610b, 620b as a result of the torque. The transmission ratio of the TSA 600b could be related to the gear ratio of the second set of gears 644b, 649b and the length, degree of twist, or other factors related to the twisted strings 640b, 645b. This configuration could enable a higher transmission ratio (between rotation/torque of the motor 632b and change of displacement/force between the first 610b and second 620b actuated elements) than could be achieved without the second set of gears 644b, 649b by allowing the twisted strings 640b, 645b to engage in a certain degree of rotation that is greater than the degree of twisting of the twisted strings 640b, 645b.

In some examples, the first set of gears 642b, 647b could have a non-unity gear ratio and the second set of gears 644b, 649b could have a gear ratio of unity. In other examples, the first 642b, 647b and second 644b, 649b set of gears could both have respective gear ratios that were not unity. The gear ratio of the first set of gears 642b, 647b could be the reciprocal of the gear ratio of the second set of gears 644b, 649b (e.g., the first set of gears 642b, 647b could have a gear ratio of 2:1, and the second set of gears 644b, 649b could have a gear ratio of 1:2). The choice of the gear ratios of the respective sets of gears could be specified as reciprocal to balance a load, torque, or other consideration between elements of the TSA 600b (e.g., to balance a strain experienced by thrust bearings that couple the gears with respected actuated elements). Other configurations of the TSA 600b are anticipated.

A TSA configured similarly to one or more of the TSAs described herein (e.g., TSAs 600a, 600b) could include additional twisted strings and respective gears configured such that a torque and/or rotation could be applied in common to all of the twisted strings of the TSA. Additional twisted strings could be added to increase a strength, fatigue resistance, lifetime, redundancy, or some other property of the TSA. Gears of the TSA could have one or more gear ratios to effect a specified fixed or variable transmission ratio of the TSA. Additionally or alternatively, the TSA could include additional gears or other elements such that the torques and/or rotations were applied in common to the twisted strings but such that the gears coupled to the strings are not necessarily directly enmeshed with each other. For example, a TSA could be configured similarly to the TSA 600a but could include gears that are linked by a chain drive such that a rotation of one gear is accompanied by a substantially equal rotation of a second gear in the same direction as the rotation of the first gear. Other configurations and additional elements are anticipated.

Figure 6C:
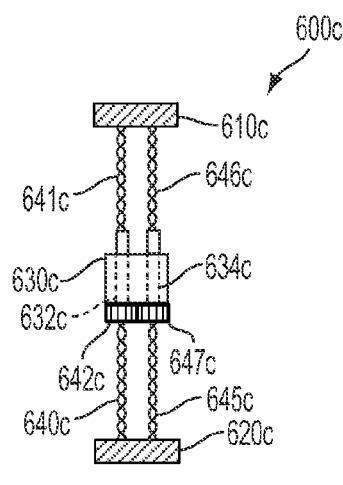
FIG. 6C illustrates a twisted string actuator.

FIG. 6C illustrates a TSA 600c attached to first 610c and second 620c actuated elements such that the TSA 600c could be operated to apply a force and/or change a displacement between the first 610c and second 620c actuated elements. The TSA 600c includes a stator of a motor 630c. The TSA 600a additionally includes first 640c and second 645c twisted strings that have respective first ends mechanically coupled to the second actuated element 620c and third 641c and fourth 646c twisted strings that have respective first ends mechanically coupled to the first actuated element 610c. The first 640c and second 645c twisted strings have opposite twist; for example, the first twisted string 640c could have an S-twist and the second twisted string could have a Z-twist. Further, the first 640c and third 641c twisted strings have opposite twist and the second 645c and fourth 646c twisted strings have opposite twist. The TSA 600c further includes first 642c and second 647c gears mechanically coupled to the first actuated element 610c such that the gears 642a, 647a are able to rotate relative to the stator of a motor 630c but are unable to translate relative to the stator of a motor 630c. The gears 642c, 647c are enmeshed with each other and have an identical number of teeth such that a rotation of one gear is accompanied by an opposite and substantially equal rotation of the other gear. The second gear 647c is mechanically coupled to respective second ends of the second 645c and fourth 646c twisted strings via a second rotor 634c. A rotor of the motor 632c is coupled to the first gear 642c and respective second ends of the first 640c and third 641c twisted strings such that the motor 630c can be operated to apply opposite and substantially equal torque and/or rotations to the second ends of the twisted strings 640c, 641c and 645c, 646c such that the TSA 600c applies a force and/or changes a displacement between the first 610c and second 620c actuated elements. Additionally or alternatively, the second rotor 634c could be a rotor of the motor 630c and the motor 630c could be configured to drive both the rotor 632c and the second rotor 634c. Further, the TSA 600c can be configured such that thrust or other bearings coupling the gears 642c, 647c to the stator of a motor 630c transmit substantially no longitudinal forces (i.e., in the direction of the axes of the twisted strings 640c, 641c, 645c, 646c), due to such forces being substantially transmitted by the twisted strings 640c, 641c, 645c, 646c and/or the rotor 632c and second rotor 634c. This could enable the use of lower-friction bearings and/or higher efficiency operation of the TSA 600c by reducing friction losses due to longitudinal forces on bearings included in the motor 630c.

Figure 6D:
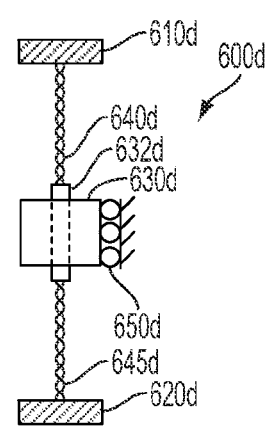
FIG. 6D illustrates a twisted string actuator.

FIG. 6D illustrates a TSA 600d attached to first 610d and second 620d actuated elements such that the TSA 600d could be operated to apply a force and/or change a displacement between the first 610d and second 620d actuated elements. The TSA 600d includes a stator of a motor 630d coupled to an armature 650d such that the stator 630d is able to move along an axis between the first and second actuated elements 610d, 620d but substantially unable to translate perpendicular to the axis or to rotate relative to the first and second actuated elements 610d, 620d. The TSA 600d additionally includes first 640d and second 645d twisted strings that have respective first ends mechanically coupled to a rotor of the motor 632d and respective second ends mechanically coupled to the first 610d and second 620d actuated elements, respectively. The first 640d and second 645d twisted strings have opposite twists, e.g., the first twisted string 640d could have an S-twist and the second twisted string 645d could have a Z-twist.

The TSA 600d can be operated to apply a force and/or change a displacement between the first 610a and second 620a actuated elements by applying a torque to the first ends of the twisted strings 640d, 645d using the rotor 632d. A transmission ratio between rotation of the rotor 632d and change in displacement between the first 610a and second 620a actuated elements can be related to the lengths, degrees of twist, or other factors related to the twisted strings 640d, 645d. TSA 600d, including two twisted strings 640d, 645d driven by the same rotor 632d, could be employed in an application to provide a transmission ratio, stroke length, or other property that could be difficult to achieve using similar materials or components configured as a TSA having a single twisted string (e.g., TSA 600a). The TSA 600d could be configured such that, at rest or at some other default state, twisted strings 640d, 645d have lengths, degrees or twist, or other features such that the transmission ratio of the TSA 600d is a specified value and such that the transmission ratio of the TSA 600d changes as the TSA 600d is operated (e.g., as the rotor 632d is rotated to effect a change in displacement between the first 610a and second 620a actuated elements) according to an application. For example, the transmission ratio of the TSA 600d could be a minimum value when the twisted strings 640d, 645d are fully untwisted and the transmission ratio of the TSA 600d could increase as the twisted strings 640d, 645d are rotated by the rotor 632d.

Additionally or alternatively, the first 640d and second 645d twisted strings could have opposite twist. The TSA 600d, configured in this way, could be operated to apply a force and/or change a displacement between the first 610a and second 620a actuated elements by applying a torque to the first ends of the twisted strings 640d, 645d using the rotor 632d. Further, the TSA 600d can be configured such that thrust or other bearings coupling the rotor 632d to the stator of the motor 630d transmit substantially no longitudinal forces (i.e., in the direction of the axes of the twisted strings 640d, 645d), due to such forces being substantially transmitted by the twisted strings 640d, 645d and/or the rotor 632d. This could enable the use of lower-friction bearings and/or higher efficiency operation of the TSA 600d by reducing friction losses due to longitudinal forces on bearings included in the motor 630d.

Figure 6E:
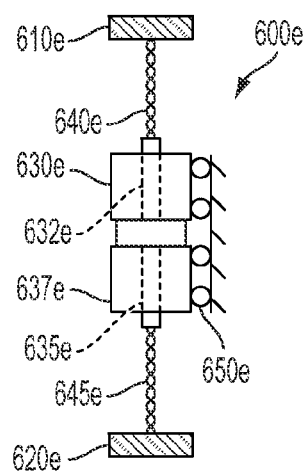
FIG. 6E illustrates a twisted string actuator.

FIG. 6E illustrates a TSA 600e attached to first 610e and second 620e actuated elements such that the TSA 600e could be operated to apply a force and/or change a displacement between the first 610e and second 620e actuated elements. The TSA 600e includes first 630e and second 635e motor stators coupled to an armature 650e such that the stators 630e, 635e are able to move along an axis between the first and second actuated elements 610e, 620e but substantially unable to translate perpendicular to the axis or to rotate relative to the first and second actuated elements 610e, 620e. The TSA 600e additionally includes first 640e and second 645e twisted strings that have respective first ends mechanically coupled to respective first 632e and second 637e motor rotors and respective second ends mechanically coupled to the first 610e and second 620e actuated elements, respectively.

The first and second motors 630e, 635e could be operated to apply respective torques to respective second ends of respective twisted strings 640e, 645e to effect a force and/or change in displacement between the first 610e and second 620e actuated elements. In some examples, the twisted strings 640e, 645e could have respective different lengths, degrees or twist, or other features such that the respective transmission ratios of the twisted strings 640e, 645e are different. The first 630e, 632e and second 635e, 637e could be configured and/or operated advantageously relative to the different properties of the twisted strings 640e, 645e. For example, the first string 640e could have a higher transmission ratio than the second string 645e and the first motor 630e, 632e could have a higher torque capacity and a lower positional bandwidth than the second motor 635e, 637e. A TSA 600e configured in this way could have better overall performance (in terms of torque, positional bandwidth, or other operational properties) than a TSA including only the first twisted string 640e and motor 630e, 632e alone or the second twisted string 645e and motor 635e, 637e alone. Other configurations and operations of TSA 600e are anticipated.

Figure 6F:
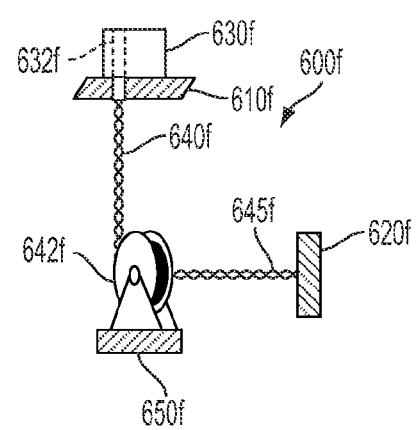
FIG. 6F illustrates a twisted string actuator.

FIG. 6F illustrates a TSA 600f attached to first 610f and second 620f actuated elements such that the TSA 600f could be operated to apply a force and/or change a displacement between the first 610f and second 620f actuated elements. The TSA 600f includes stator of a motor 630f rigidly coupled to the first actuated element 610f. A first end of a first twisted string 640f is wrapped around and mechanically coupled to the edge of a pulley 642f. The pulley is configured to freely rotate but not to translate relative to a third element 650f. A second twisted string 645f is connected between an axle of the pulley 642f and the second actuated element 620f. A rotor of the motor 630f is coupled to a second end of the first twisted string 640f such that the motor 630f can be operated to apply a torque and/or rotation to the second end of the first twisted string 640f such that the first twisted string 640f applies a torque and/or rotation to the pulley 642f and to the end of the second twisted string 645f such that the TSA 600f applies a force and/or changes a displacement between the first 610f and second 620f actuated elements. A transmission ratio of the TSA 600f (i.e., a ratio between a torque applied by the motor 630f and a resulting force applied between the first 610f and second 620f actuated elements and/or a ratio between a rotation of the rotor of the motor 630f and a resulting change in displacement between the first 610f and second 620f actuated elements) could be a transmission ratio of the first twisted string 640f multiplied by the transmission ratio of the second twisted string 645f. A TSA configured similarly to the TSA 600f (i.e., having twisted strings wrapped around pulleys and configured to rotate the pulleys, and further having other twisted strings driven by the rotation of the pulleys) could include more than two stages (i.e., two or more pulleys and twisted strings attached thereto) and could have a transmission ratio equal to the product of the transmission ratios of all of the twisted strings of the TSA multiplied together.

Further, the twisted string of a TSA can be configured in a variety of ways. The twisted string could include two strands, as described elsewhere herein, or could include more than two strands. A twisted string could be configured such that the two or more strands of the twisted string were located at the same distance from a rotational axis of the string (where the rotational axis could be a local rotational axis for strings that are not straight, e.g., strings that are contained within Bowden cable housings and that are deformed about another object or otherwise not straight). To ensure that the strands of a twisted string are located at the same distance from the rotational axis of the string and/or for other purposes, spacers could be incorporated into the string. In some examples, the spacers could be toroidal, disc-shaped, or otherwise configured rings or plates having holes through which the strands of the twisted string could pass; the size, shape, and positioning of the holes could be such that the strands could change an angle of twist (e.g., as the twisted string is rotated) but such that the strands could not change their positioning relative to each other (i.e., they would maintain a radial distance from a rotational axis of the string and they would maintain an angular relationship between each other). Additionally or alternatively, the twisted string could include a central element that ensured that the strands of a twisted string are located at the same distance from the rotational axis of the string and/or for other purposes. For example, one or more spheres, cylinders, or other-shaped objects could be localized in the center (i.e., centered on a rotational axis) of the twisted string. The location of the objects in the center of the twisted string could be maintained by having three or more strands in the twisted string and/or by including grooves or rings in the objects to ensure a specified relationship between the strands and the objects. Additionally or alternatively, the objects could be held in place by an additional center strand that did not substantially act to transmit longitudinal forces of the twisted string.

Alternatively, the twisted string of a TSA could comprise a single strand that is folded in half about an attachment point. The two halves of the strand then twist around each other to form the twisted string.

The material composition of the strands of the twisted string, and of possible lubricants, spacers, anti-friction coatings or shims, or other elements of or relating to the twisted string could be specified according to an application. Material compositions and configurations of twisted strings and elements thereof can be specified to enable a certain application and/or to ensure that the twisted string has a specified value of a property, e.g., compliance or fatigue resistance. Generally, strands of a twisted string can be configured to have a low compliance (i.e., the twisted string will deform minimally in response to longitudinal stress on the string) a high strength (i.e., the twisted string will only fail when exposed to very high longitudinal stresses) and a small bending radius (i.e., the strands of the twisted string are able to be coiled very tightly, about a small radius, without failure). Further, strands of a twisted string can be configured (by having a material composition and/or being woven in a certain manner from fibers) to have a low external friction (i.e., the strand will move against an external object, e.g., another strand, with low friction) and low internal friction (i.e., sub-strands, fibers, or other elements composing the strand will move against each other with low friction).

In some examples, the strands could be composed of ultra-high-molecular-weight polyethylene (compositions of which are traded under the trade name Dyneema). In some examples, individual strands of the twisted string could include a low-friction coating, surface treatment, or cladding. For example, an individual strand could be clad in polytetrafluoroethylene (PTFE). Additionally or alternatively, sheets of low-friction material (e.g., sheets of PTFE) could be disposed between strands of a twisted string to reduce friction between the strands, decreasing mechanical losses to heat and decreasing fatigue of the strands. In some examples, strands or other elements of the twisted strings could be coated, impregnated with, or otherwise exposed to a lubricant. For example, a twisted string could be coated in a silicone lubricant. Other compositions and configurations of twisted strings are anticipated according to applications of twisted strings in TSAs. In an example, a twisted string could be composed of Dynex 70 or Dynex 75 and could be lubricated by silicone grease.

Figure 7C:
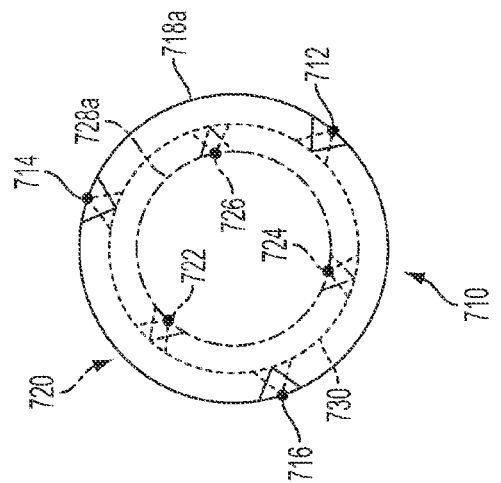
FIG. 7C shows a top view of the nested twisted string of FIG. 7A.
Figure 7B:
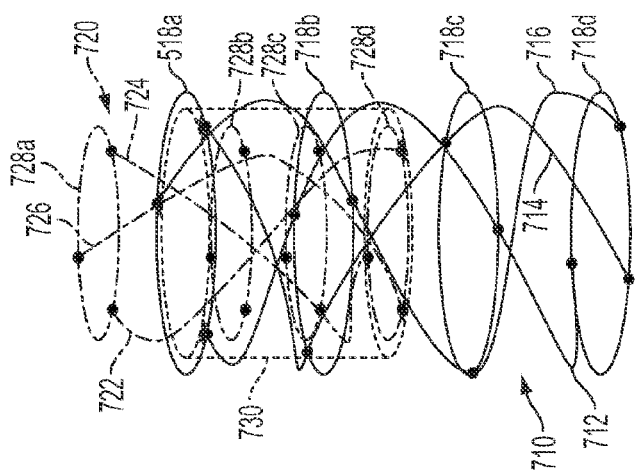
FIG. 7B illustrates the nested twisted string of FIG. 7A, twisted.
Figure 7A:
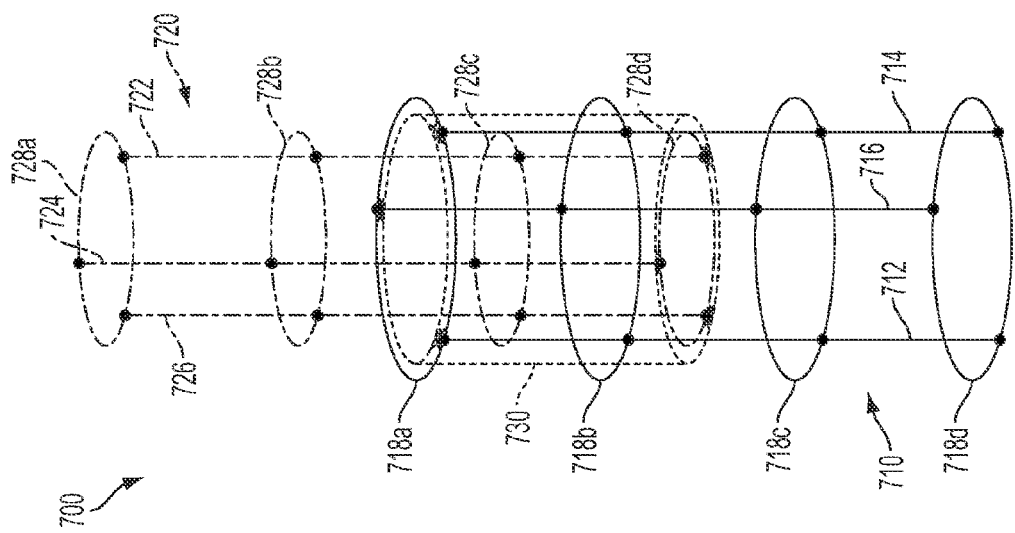
FIG. 7A illustrates a nested twisted string.

Individual twisted strings could be nested and connected together to form composite twisted strings. Such a composite twisted string, incorporated into a TSA, could enable an actuator having many of the benefits of a non-nested twisted string while having a greater stroke length per unit string length. FIGS. 7A, 7B, and 7C illustrate a nested twisted string 700 (NTS) that includes an outer twisted string 710, an inner twisted string 720, and a cylinder 730. The cylinder 730 is configured to transmit compression and torsion from one end of the cylinder 730 to the other end while exhibiting substantially no deformation. The outer twisted string 710 includes three strands 712, 714, 716 each connected to four spacer rings 718a, 718b, 718c, 718d. A first spacer ring 718a is connected to a first end of the cylinder 730 and a second spacer ring 718d could be connected to a first termination block or other element configured to transmit forces and/or torques into the twisted string 700. The inner twisted string 720 includes three strands 722, 724, 726 each connected to four spacer rings 728a, 728b, 728c, 728d. A first spacer ring 728a could be connected to a second termination block or other element configured to transmit forces and/or torques into the twisted string 700 and a second spacer ring 728d is connected to a second end of the cylinder 730.

FIG. 7A shows a side view of the NTS 700 where the NTS 700 is fully extended; that is, the strands 712, 714, 716, 722, 724, 726 of the outer 710 and inner 720 twisted strings are substantially parallel and untwisted. FIG. 7B shows a side view of the NTS 700 where the NTS 700 is partially twisted. The overall length of the NTS 700 shown in FIG. 7B is less than the overall length of the NTS 700 in FIG. 7A. FIG. 7C shows a top view of the NTS 700, showing how the inner twisted string 720, outer twisted string 710, and cylinder 730 are coaxial about a rotational axis of the NTS 700.

Example NTS 700 includes inner 720 and outer 710 twisted strings that are substantially similarly configured; that is, their lengths and strand and spacer compositions and configurations are substantially identical and the radius of the spacers is identical except for a small difference to accommodate the cylinder 730 and to accommodate the motion of the inner 720 and outer 710 twisted strings relative to each other when the NTS 700 is twisted. As a result, the behavior of the NTS 700 in response to twisting (i.e., the degree of shortening, a transmission ratio) is substantially identical to another twisted string configured similarly to either the outer 710 or inner 720 twisted strings that has a total length equal to the sum of the lengths of the inner 720 and outer 710 twisted strings. As a result, the NTS 700 can provide the functionality of a non-nested twisted string while having a shorter overall length.

Note that NTS 700 is intended only as an illustrative example of a nested twisted string that could be applied to a TSA or to other applications. The relative lengths, relative radii, number of spacers, number of strands, and other properties of the twisted strings could be different than those described herein. In some examples, one or both of the twisted string could lack spacers. For example, the inner twisted string 720 and/or the outer twisted string 710 could be tightly wound, i.e., could have no spacers. Further, the inner diameter of the cylinder 730 could be related to a maximum effective diameter of the inner twisted string 720 when the inner twisted string 720 is fully twisted. In some example, an NTS could include more than two twisted strings. For example, an NTS could include three twisted strings and two cylinders. The twisted cylinder could be a solid cylinder (like the illustrated cylinder 730) or could be a rigid or semi-rigid mesh, rings connected by bars or plates, or some other structure capable of transmitting compressive forces and torques from one end of itself to another.

A TSA configured as described herein could enable a variety of applications by enabling high-performance flexible linear actuation (i.e., generation of tensile forces and changes in linear displacement between ends of a flexible or semi-flexible element, e.g., twisted string). Such a TSA can enable transduction of energy from a rotational actuator to a linear displacement at greater than 92%. Use of high-speed electrical motors as the rotational actuator driving a twisted string of such a TSA can enable the actuation of the TSA to change length from a maximum length to a minimum length (i.e., to change in length by the stroke length of the TSA) in less than 200 milliseconds. Further, the TSA could be operated to achieve a positional bandwidth greater than 5 hertz for displacements on the order of the stroke length. Such high-performance capabilities enable novel applications, for example, the actuation of a flexible exosuit to augment or assist the activities of a wearer.

V. Actuators, Sensors, Power Sources, User Feedback Elements, and Other Elements of an Exosuit System.

A flexible exosuit can include a variety of actuators, sensors, and other elements. The actuators could include the aforementioned exotendons and twisted string actuators or could include additional or alternate actuators. A flexible exosuit can additionally include feedback and control elements for detecting information about the wearer and/or elements of the flexible exosuit and its environment and for indicating information to the wearer and/or some other person or system mechanically or electronically coupled to the flexible exosuit.

A flexible exosuit could include hydraulic and/or pneumatic actuators and other elements to enable to the use of those actuators (e.g., fluid pumps, reservoirs). Actuators of the flexible exosuit could be coupled to other elements of the flexible exosuit and/or tissues of the wearer by a variety of transmission methods. For example, a rotational actuator could create a rotational torque that is translated into a linear force by a drive screw, a ball screw, a cable wrapped around a driven drum, or some other method. Further, transmissions may be included in the flexible exosuit to transmit a force and/or torque from one location in the flexible exosuit to another location; e.g., a cable (possibly disposed within a Bowden-cable style sheath) could be used to transmit a linear actuation from a location at one end of the cable to another location at the other end of the cable. For example, an exotendon could be connected via one or more cables that may be disposed within one or more Bowden-cable style sheaths to two or more elements of a flexible exosuit or other system to allow the exotendon to apply a controller compliance between, store a mechanical energy from a change in displacement between, or otherwise apply a force between the two or more elements of the flexible exosuit.

A class of actuators that could be included in a flexible exosuit includes electro-active polymers (EAPs) configured to transduce electrical energy into mechanical energy. EAPs are polymer materials containing electro-active molecules, crystals, or other materials that are orientable or otherwise capable of exhibiting a physical change when subjected to an electric field, such that the EAP material deforms when exposed to an electrical field. Conversely, the EAP material may produce an electrical field when deformed by an external force, allowing for bidirectional transduction of mechanical and electrical energy.

EAPs can be included in electroactive polymer artificial muscles (EPAMs). EPAMs are actuators that include an EAP material and two or more electrodes configured to transduce an electrical voltage and/or current applied to the electrodes into a mechanical force/displacement, due to a deformation of the EAP caused by an electrical field around the electrodes that is caused by the applied voltage and/or current. In an example configuration, a thin sheet of EAP has an electrode disposed on either side (i.e., the electrodes are opposite each other along the short axis of the EAP). Application of a high voltage between the two electrodes causes the EAP to deform, becoming thinner and wider/longer. The EAP can also become thicker due to the applied voltage. Conversely, energy can be extracted from the EPAM from an externally applied mechanical force and deformation. Additionally or alternatively, an EPAM and/or other element including EAP material could be configured and operated as a mechanical sensor, detecting strain, force, or some other mechanical variable by transducing the mechanical variable into a voltage and/or current at electrodes of the EPAM or other element including EAP material.

EPAMs could be included in a flexible exosuit to inject and/or sink mechanical energy to/from elements of the flexible exosuit and/or the wearer. An EPAM could be employed as an alternative to a twisted string actuator or could be employed in other applications. For example, a chemical-burning engine could include an EPAM and/or EAP material to enable extraction of energy from combustion of a fuel by transducing a mechanical deformation of the EPAM or EAP (due, e.g., to an increased pressure in a volume due to combustion of the fuel) into an electrical energy that could be used to power a flexible exosuit, or to power some other electrical system. Additionally or alternatively, other elastomeric polymers could be included in in such a chemical-burning engine.

EPAMs could be employed in a flexible exosuit as haptic elements. That is, an EPAM could be disposed in a flexible exosuit such that the EPAM was in direct or indirect mechanical contact with skin of the wearer. Application of patterns of electrical energy to the EPAM could cause deformation of the EPAM that could be mechanically coupled into the skin of the wearer, causing the wearer to experience a haptic sensation. Such a haptic indication could be used to communicate a variety of information to the wearer. In some examples, an alert could be communicated to the wearer using an EPAM haptic element. In some examples, an EPAM haptic element could be operated to indicate a physical action and/or to indicate a change in a physical action to be performed by the wearer. In an example, an EPAM haptic element could be activated at the knee of a wearer to indicate to the wearer that a step should be initiated using the leg of which the knee is a part. In another example, a wearer could be locomoting using a gait that is likely to result in fatigue and/or injury, and EPAM haptic elements of a flexible exosuit worn by the wearer could indicate ways the wearer could alter their gait (e.g., by activating EPAM haptic elements in directions opposite 'good' directions of motion, to stimulate the wearer away from 'bad' motions) to reduce the rate of fatigue and/or the probability of injury.

Other operations of EPAM or other haptic elements to indicate information to a wearer of a flexible exosuit are anticipated. Further, EPAM haptic elements need not be limited to application in flexible exosuits, and may be used to enable a variety of applications, including indication using a variety of wearable devices (e.g., watches, headbands), haptic feedback as part of a virtual reality device, haptic feedback as part of a tele-robotic system, or other applications. Further, other devices could be incorporated into a flexible exosuit or other system to enable to haptic indication or other functions described herein. For example, piezoelectric elements, vibrating elements (e.g., motors driving off-axis masses), heating elements, electrodes configured to inject safe and sense-able electrical currents into human skin, or other mechanical transducers or actuators. Additionally or alternatively, other actuators (e.g., exotendons, TSAs) of a flexible exosuit or other system could be operated to provide haptic feedback to a user. For example, an exotendon could un-clutch and then quickly re-clutch several times in a row, resulting in a series of momentary changes in the force transmitted by the exotendon that could be detected by a wearer of a flexible exosuit including the exotendon. Further, EPAM could be used as an input device by transducing a force exerted by a user (e.g., by a user pressing on an EPAM using a fingertip) into an electrical signal that could be detected by a controller or other system of a flexible exosuit or other system.

A flexible exosuit could include a smart sole device. A smart sole device is mechanically coupled to the sole of the foot of the wearer and includes at least one mechanical transducer. The mechanical transducer could be operated to sense a force between the sole of the wearer and the ground, to extract and/or inject mechanical energy from/into an interaction between the sole of the wearer and the ground, to modulate a compliance of the smart sole, or some other mechanical function. The mechanical transducer could include a variety of transducing elements, including EPAM elements, piezo elements, hydraulic elements, pneumatic elements, or some other elements. The smart sole could include one or many mechanical transducers arranged in a variety of ways. For example, the smart sole could include a hexagonal array of EPAM transducers across the sole of the foot of the wearer. Electrolaminates (e.g., exotendons) could also be included in a smart sole to enable functions of the smart sole, e.g., to control the compliance of the smart sole. The smart sole could be operated in a variety of ways to enable a variety of applications.

In some examples, the one or more mechanical transducers could be operated to generate a detected distribution of force between the sole and the ground during a step. This information could be used to diagnose a medical condition, to indicate a way for the wearer to alter their gait according to some application (e.g., to increase the efficiency of locomotion of the wearer, to decrease a probability of injury), or some other application. In some examples, the one or more mechanical transducers could be operated to indicate a physical action and/or to indicate a change in an a physical action to be performed by the wearer (e.g., to reduce the amount of force the wearer applies to the heel during a step, to reduce the degree of a heel strike, to reduce the amount of force the wearer applies to the outer edge of the sole during a step). In some examples, the one or more mechanical transducers could be operated to modulate a compliance of the one or more mechanical transducers to increase the efficiency with which the wearer locomotes (e.g., by matching an impedance between the foot of the wearer and the ground that the wearer is locomoting on). Other operations and applications of a smart sole are anticipated.

A flexible exosuit could include a wide variety of sensors. The sensors could be configured to sense a wide variety of physical phenomena, including electrical fields, electrical current, magnetic fields, mechanical stress, mechanical strain, pressure, humidity, electromagnetic radiation, high-energy particles, acceleration, displacement, rotational acceleration, rotational velocity, angular displacement, or other phenomena. The detected physical phenomena could be related to one or more properties of the wearer, of the flexible exosuit, and/or of the environment of the wearer and flexible exosuit. The sensors could be disposed at a variety of locations on the flexible exosuit. For example, a set of accelerometers could be disposed in the flexible exosuit to enable detection of the acceleration (and by proxy, location and displacement) of segments of the wearer's body. The sensors could be incorporated into other elements of the flexible exosuit. For example, electrodes of an exotendon could be used to detect displacement and/or force between actuated elements attached to either end of the exotendon by detected the capacitance between the two electrodes. The capacitance between the two electrodes could be related to the degree of overlap of the electrodes, which could in turn be related to the length, force, strain, or other properties of the exotendon. In another example, an encoder could detect rotation of a motor of a TSA; the rotation of the motor could be used to determine the length of the TSA based on information about the twisted string of the TSA.

The sensors could be configured and/or disposed to allow for a partial or complete determination of the kinematic state of the wearer and/or the flexible exosuit. That is, the sensors could be configured to allow for detection of the position, velocity, relative orientation, relative orientation velocity, and other properties of some or all of the segments of the body of the wearer and/or segments of the flexible exosuit. The sensors could include accelerometers and/or gyroscopes configured such that the accelerometers and/or gyroscopes could detect motion and acceleration of parts of a wearer's body. The accelerometers and/or gyroscopes could be microelectromechanical systems (MEMS) or some other kind of systems.

The sensors could include displacement sensors for measuring the distance between two points (e.g., between two different elements of the flexible exosuit). The displacement sensors could be implemented in a variety of ways; for example, the sensors could include two substantially parallel plates that are free to move relative to each other and that are connected to respective measured locations; the displacement between the measured locations could be related to a degree of overlap of the parallel plates, which could in turn be related to a capacitance between the parallel plates that could be detected to determine the distance between the measured locations. The parallel plates could be part of an exotendon. Additionally or alternatively, a displacement between two locations actuated by a TSA could be determined by detecting the rotation of the twisted string of the TSA. In some examples, a displacement could be detected by detecting the capacitance of an EPAM as the EPAM is deformed by changes in the displacement. A joint angle could be determined based on a detected displacement between two locations on opposite sides of the joint. Additionally or alternatively, a joint angle could be detected by using a goniometer included in the flexible exosuit.

The flexible exosuit could include biosensors configured to detect one or more properties of the body of the wearer of the exosuit. In some examples, the flexible exosuit could include two or more electrodes disposed on the skin of the wearer for detecting biopotentials or for detecting other properties of the wearer. For example, electrodes could be used to detect an electromyogram (EMG) generated by muscles of the wearer beneath the skin. Additionally or alternatively, electrodes could be used to detect an electrocardiogram (ECG) or an electrooculogram (EOG) generated by the heart or eye(s), respectively, of the wearer. Additionally, a small current could be injected into the skin of the wearer using the electrodes to detect a Galvanic skin response (GSR), an impedance spectrum, or some other property of the skin. The biosensors could include light emitters and light sensors configured to detect a pulse and/or blood oxygen level of the wearer. Other biosensors could be included in the flexible exosuit. Further, the properties of the wearer detected using the biosensors could be used to enable a variety of different applications, including health monitoring, fatigue dosing (i.e., altering the operation of the flexible exosuit to meter the rate at which the wearer becomes fatigued), control of the exosuit (e.g., detecting a controlled muscle twitch of the user and using the detection to change an operating mode of the flexible exosuit), or other applications.

A flexible exosuit could include additional elements. For example, the flexible exosuit could include one or more controllers operatively coupled to one or more actuators, sensors, or other elements of the flexible exosuit such that the one or more controllers could operate the flexible exosuit based on one or more stored programs accessible to the one or more controllers. The flexible exosuit could additionally include batteries, fuel cells, engines, solar cells, or other elements to provide power to operate the flexible exosuit. The flexible exosuit could include communications elements, including radios, Bluetooth transceivers, WiFi transceivers, LTE or other cellular communications equipment, satellite uplinks, ZigBee transceivers, IRdA or other optical communications elements, or some other components configured to enable communications between elements of the flexible exosuit (e.g., a controller) and some remote system.

A flexible exosuit could include electroadhesive elements. That is, the flexible exosuit could include elements that could electrically modulate an electrostatic attraction between the elements and some other object. The other object could be another element of the exosuit, skin of the wearer of the exosuit, or an element of the environment of the exosuit (e.g., a rock face, a wall, a box).

Figure 8A:
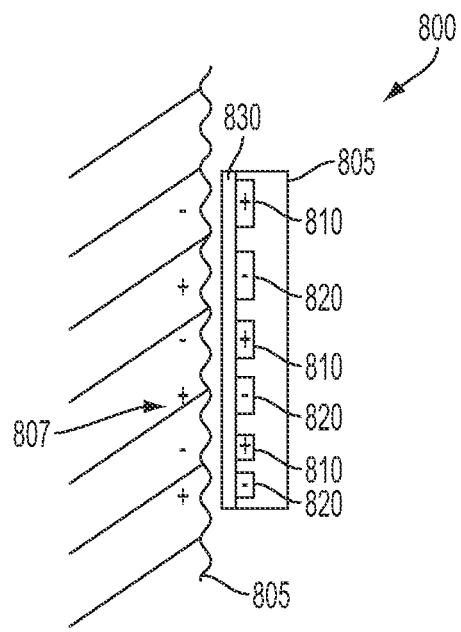
FIG. 8A is a schematic cross-sectional view of an electroadhesive element.
Figure 8B:
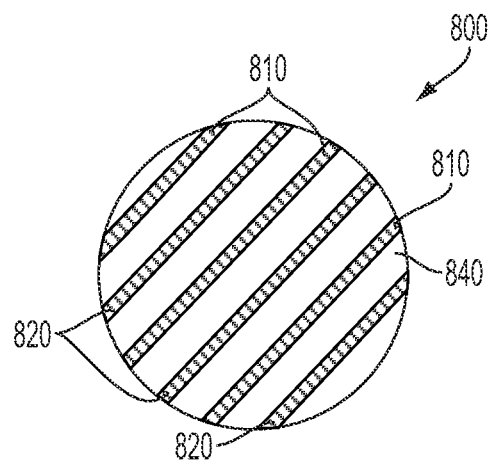
FIG. 8B is a front view of the electroadhesive element illustrated in FIG. 8A.

FIG. 8A is a cross-sectional view of an electroadhesive element 800 being operated to electrostatically adhere to an object 805. The object 805 is substantially electrically neutral. The electroadhesive element 800 includes first 810 and second 820 conductors embedded in a nonconductive substrate 840. An insulator layer 830 is disposed on a face of the electroadhesive element 800 that is positioned against the object 805. The application of a high positive voltage to the first conductors 810 relative to the second conductors 820 causes positive and negative charges in the object 807 to separate and to be electrostatically attracted to the second 820 and first 810 conductors. This electrostatic attraction causes the electroadhesive element 800 to experience a normal force against the object 805. This normal force could be allow the electroadhesive element 800 to adhere to the object 805 and not to slip against the object 805 despite a perpendicular force applied between the object 805 and the electroadhesive element 800. The magnitude of perpendicular force that could be applied without slipping can be related to the magnitude of the electrostatic normal force and a coefficient of friction between the insulator layer 830 and the surface of the object 805.

The electroadhesive element 800 could be operated to allow for elements of a flexible exosuit to skin of the wearer to transmit forces from elements of the flexible exosuit (e.g., exotendons, TSAs) into tissues of the wearer. Further, such adhesion could be electronically controlled, allowing the adhesion to be turned off when the flexible exosuit was not transmitting forces to tissues of the wearer. In some examples, the electroadhesive element 800 could be used to adhere objects to the flexible exosuit. For example, the electroadhesive element 800 could be used to adhere a pack, weapon, or other equipment reversibly to the flexible exosuit. In some examples, the electroadhesive element 800 could be operated to enable a wearer of the flexible exosuit to climb a wall, cliff, or other surface by operating the electroadhesive element 800 to adhere to the wall, cliff, or other surface while the wearer and/or exosuit transmitted a force through the electroadhesive element 800 allowing the wearer and/or flexible exosuit to lift the wearer and flexible exosuit upwards.

Figure 8C:
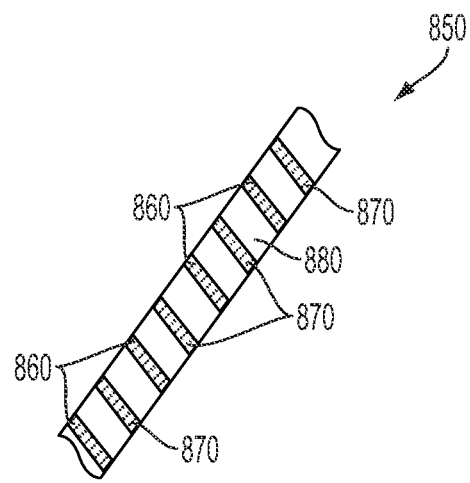
FIG. 8C is a front view of part of an electroadhesive element.

FIG. 8A shows a front view of the electroadhesive element 800. The nonconductive substrate 840 is substantially circular and planar, and the first 810 and second 820 conductors are substantially parallel alternating bars. FIG. 8C illustrates an electroadhesive strap 850 that is configured similarly to the electroadhesive element 800. The electroadhesive strap 850 includes a nonconductive substrate 880 into which are embedded parallel alternating first 860 and second 860 conductors that are configures as strips. The electroadhesive strap 850 additionally includes an insulator layer (not shown). The electroadhesive strap 850 could be operated similarly to the electroadhesive element 800 and could be disposed on the surface of a flexible or rigid force-transmitting element of a flexible exosuit to enable the flexible or rigid force-transmitting element to adhere to skin of a wearer of the flexible exosuit and to transmit forces into the skin of the wearer.

Note that the electroadhesive element 800 and electroadhesive strap 850 and operations and applications thereof described herein are meant as illustrative examples only. An electroadhesive element could be disposed as part of a flexible exosuit or as part of some other device or system to enable electrically-controlled adhesion to objects or other devices or systems. An electroadhesive element could take the form of a circle, a strap, or any other shape that could be substantially flat or could have a curved rigid or flexible surface according to an application. Further, the arrangement of first and second sets of conductors as parallel alternating strips on the surface of an electroadhesive element is intended as an illustrative example. The strips could be circles, rectangles, spirals, polygons, or other shapes and they could be tiled, intercalated, or related to each other in some other manner according to an application. There could be more than two sets of conductors; indeed, each conductor of an electroadhesive element could be individually electronically actuated. For example, high voltage could be applied individually to specified conductors of an electroadhesive element in a specified region of the electroadhesive element to enable only the specified region of the electroadhesive element to adhere to an object. Other operations and configurations are anticipated.

VI. Structures for Transmitting Forces Between a Flexible Exosuit System and a User.

A flexible exosuit can include actuators (e.g., exotendons, TSAs) capable of generating, transmitting, modulating, or otherwise controlling forces between two or more elements. In order to enable applications of the flexible exosuit (e.g., applying forces and or torques to a body of a wearer to assist, record, or otherwise interact with physical activities of a wearer), the flexible exosuit can be configured to transmit forces into tissues of a wearer (e.g., bones, joints, and muscles of the wearer) by transmitting forces into the skin of the wearer. By transmitting forces into the tissues of the wearer, rather than transmitting forces across joints of the wearer using a rigid exoskeleton, the flexible exosuit can be lighter and can cause less impediment to motions of the wearer (including motions of joints), even when unpowered, than a rigid exoskeleton. A flexible exosuit can include rigid and flexible elements to transmit forces from elements of the flexible exosuit (e.g., actuators) to other elements of the flexible exosuit and/or the skin of a wearer. The flexible exosuit could include straps, plates configured to follow a contour of a body part of the wearer, flexible meshes, boots, harnesses, or other flexible, rigid, and semi-rigid elements.

Flexible and/or rigid elements of a flexible exosuit can be configured to apply a normal force and/or stress evenly across a section of a wearer's skin. Distributing loads evenly across a section of the wearer's skin can reduce discomfort experienced by the wearer when forces are applied to the skin and can reduce the change of injury (e.g., tears or abrasions of the skin) of the wearer. To evenly distribute a load applied to skin of the wearer, the flexible exosuit could include a flexible mesh or woven network of flexible elements configured to be mounted to the skin.

For example, the flexible exosuit could include a cuff made of woven flexible straps that has a shape specified to conform to an aspect of the wearer's body, e.g., the thigh of the wearer. The cuff could include an attachment point for a force-transmitting actuator (e.g., an exotendon or a TSA) and the woven elements of the cuff could be connected to the attachment point such that forces transmitted to the cuff from the actuator are in turn transmitted through the woven elements and into the skin of the wearer evenly along the length of the woven elements. The compliance of the woven elements, the pattern of the woven structure, and other aspects of the configuration of the cuff could be specified based on information about the aspect of the wearer's body (e.g., thigh). For example, the pattern of individual woven elements of a cuff configured to be mounted to a shank of a limb of a wearer could follow a catenary pattern as the individual woven element wrapped around the shank of the limb. The shape of the catenary, pattern of interconnection between individual woven elements, and compliance of individual woven elements could be specified to ensure that the normal force between a segment of a woven element and the skin beneath the segment was sufficient to enable the segment to transmit an amount of shear force into the skin that was substantially similar to the amount of shear force transmitted into other areas of the skin beneath respective other segments of the woven element. Other configurations of flexible and semi-flexible cuffs configured to be worn by a wearer and to transmit shear and/or normal forces into skin of the wearer are anticipated.

Flexible elements configured to transmit forces into skin of a wearer can be configured to follow, be adhered to, approximate, or otherwise be related to lines of non-extension of the skin. Lines of non-extension of the skin are lines on the surface of the skin of a wearer along which the skin substantially does not deform during normal motions of the wearer and perpendicularly to which the skin substantially does deform during normal motions of the wearer. A flexible strap (that is a substantially linear element configured to be highly compliant in directions perpendicular to the length of the strap, and substantially non-compliant in along the length of the strap) could be adhered to skin along a line of non-extension and the deformation of the skin in response to normal motions of the wearer could be substantially unaffected by the adhesion of the strap. Thus, the strap could be used to transmit forces into the skin in a manner that did not substantially impede normal motions of the wearer when the strap is not being used to transmit forces into the skin. Configuring flexible elements of a flexible exosuit to conform to lines of non-extension of skin could reduce abrasion of the skin relative to the use of flexible elements not configure to substantially conform to and/or follow lines of non-extension of the skin.

Elements of a flexible exosuit (e.g., flexible and/or rigid force-transmitting elements) could be adhered to skin of a wearer in a variety of ways. A chemical adhesive could be applied to bond elements of the flexible exosuit to skin of the wearer and to prevent the elements from slipping. Elements of the flexible exosuit configured to contact and/or transmit forces into skin of a wearer could include electroadhesive elements, and the electroadhesive elements could be configured to adhere the elements of the flexible exosuit to the skin. The electroadhesive elements could be operated to adhere to and release from the skin according to an application. For example, the electroadhesive elements could be operated to adhere elements of the flexible exosuit to the skin when actuators of the flexible exosuit were being operated to apply forces to the body of the wearer. The electroadhesive elements could be operated to release the elements of the flexible exosuit from the skin of the wearer at other times to save energy, to increase the comfort of the wearer, to allow for repositioning of elements of the flexible exosuit, or to enable other functions or applications.

A flexible exosuit that includes elements configured to transmit forces into skin over at least two segments of the body of a wearer (e.g., skin of the thigh and of the calf of the wearer) could include actuators configured to apply, modulate, or otherwise transmit forces between the at least two segments to effect and/or affect a torque on a joint or joints between the at least two segments (e.g., to apply a torque to the knee of the wearer). Additionally or alternatively, such a flexible exosuit could be configured to transfer a load or other forces between segments of the body to enable some application.

Flexible and/or rigid elements of a flexible exosuit that are configured to transmit forces into skin of a wearer can be incorporated into, on, and/or beneath other elements of the flexible exosuit and/or other garments worn by a wearer. In some examples, the flexible exosuit includes a conformal undersuit. Flexible and/or rigid force-transmitting elements of the flexible exosuit can be incorporated into and/or disposed on top of elements of the undersuit. In examples where the force-transmitting elements are disposed on top of elements of the undersuit, the elements of the undersuit could be configured to enable the transmission of normal and/or shear forces from the force-transmitting elements into the skin. Additionally or alternatively, the undersuit could allow the force-transmitting elements to move relative to the skin when the force-transmitting elements were not transmitting substantial forces into the skin (e.g., to reduce abrasion and discomfort of the skin during motion of the wearer). The undersuit could include electroadhesive elements or other elements to facilitate and/or modulate the transmission of forces between flexible and/or rigid force-transmitting elements of the flexible exosuit and the skin of the wearer.

The undersuit could be configured to provide additional functionality. The material of the undersuit could include anti-bacterial, anti-fungal, or other agents (e.g., silver nanoparticles) to prevent the growth of microorganisms. The undersuit could be configured to manage the transport of heat and/or moisture (e.g., sweat) from a wearer to improve the comfort and efficiency of activity of the wearer. The undersuit could include straps, seams, Velcro, or other elements configured to maintain a specified relationship between elements of the flexible exosuit and aspects of the wearer's anatomy. This could additionally increase the ease with which a wearer could don and/or doff the flexible exosuit. The undersuit could additionally be configured to protect the wearer from ballistic weapons, sharp edges, shrapnel, or other environmental hazards (by including, e.g., panels or flexible elements including Kevlar or other armor materials).

VII. System Overview of an Exosuit System

Figure 9:
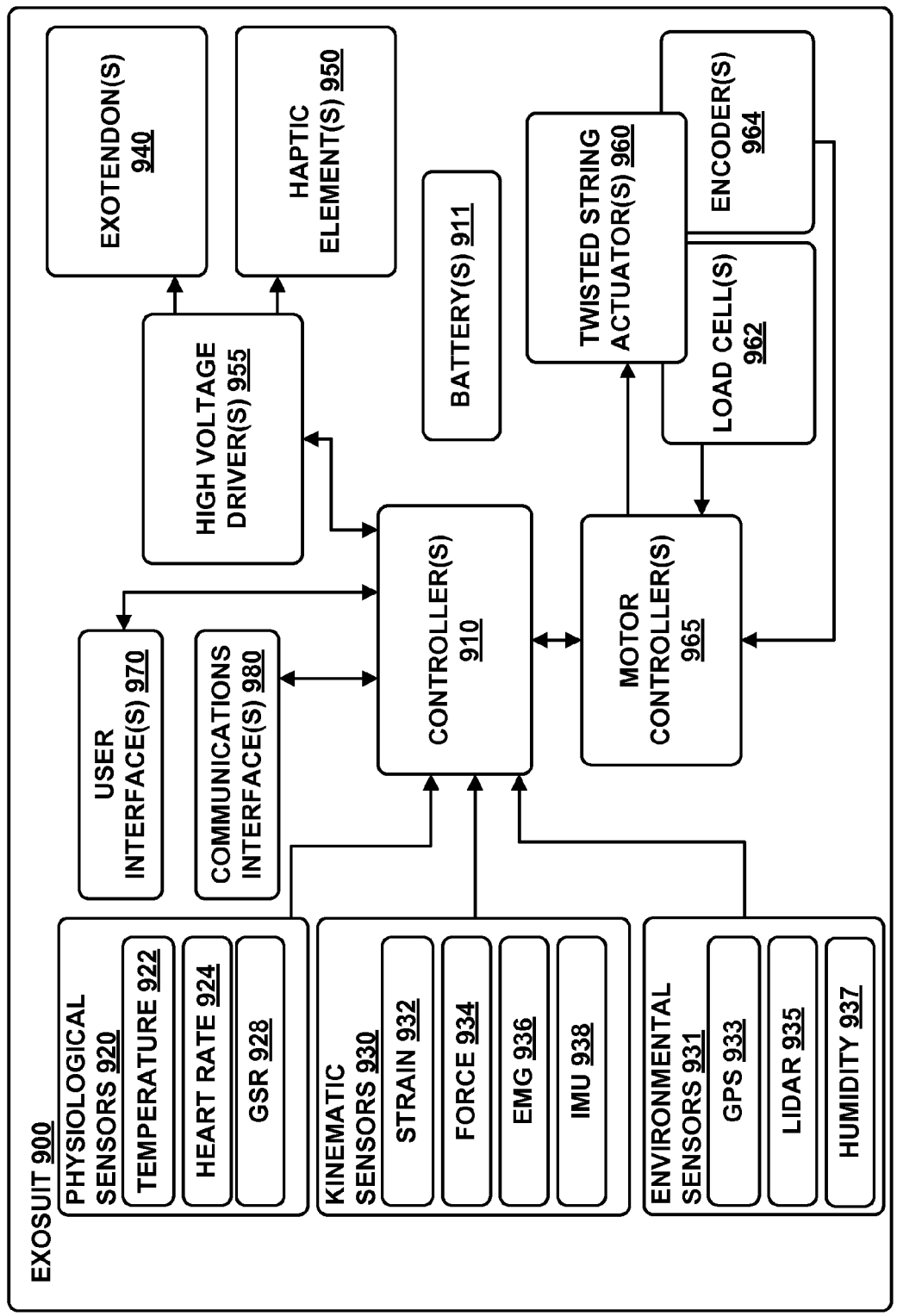
FIG. 9 is a functional block diagram of an example flexible exosuit.

FIG. 9 is a simplified block diagram illustrating the components of a flexible exosuit 900, according to an example embodiment. Exosuit 900 may take the form of or be similar to flexible exosuit 100 shown in FIG. 1. However, exosuit 900 may also take other forms, such as an exosuit configured to be worn over only the legs, torso, arms, or a combination of these or other aspects of a wearer. The exosuit 900 could include elements similar to other sensors, actuators, or other elements described herein (e.g., exotendons 200a-d, TSAs 400, 500a-g, 600a-e, electroadhesive elements 800, 850, STEMs 1000a-d) and/or could include other elements according to an application. Further, the exosuit 900 could consist of or include structures similar to the example joint-crossing and/or joint-torque-applying structures described herein (e.g., 1100a-i, 1200). Exosuit 900 could also take the form of an exosuit configured to be used in combination with a prosthetic (e.g., an artificial limb). Exosuit 900 also could take other forms.

In particular, FIG. 9 shows an example of an exosuit 900 having controller(s) 910, physiological sensors 920, kinematic sensors 930, environmental sensors 931, user interface(s) 970, battery(s) 911, and communications interface(s) 980. The exosuit 900 additionally includes high voltage driver(s) 955 configured to drive exotendon(s) 940 and haptic elements(s) 950 of the exosuit 900. The exosuit 900 further includes motor controller(s) 965 configured to control twisted string actuator(s) 960 (TSA(s)) of the exosuit 900 using information from load cell(s) 962 and encoders 964 that are configured to detect properties (e.g., applied load, rotation rate and direction) of elements of the TSA(s) 960.

The exosuit 900 additionally includes flexible and/or rigid elements (not shown) configured to be worn by a wearer of the exosuit 900 and to enable elements of the exosuit 900 to apply forces to the body of the wearer or to enable other functions of the exosuit 900 according to an application. The components of the exosuit 900 may be disposed on or in the flexible and/or rigid wearable elements of the exosuit 900 or other elements of the exosuit 900 (e.g., protective housings, a backpack or pouch) to enable functions of the exosuit. Note that exosuit 900 is intended as an example, and that exosuits as described herein can have more or fewer components than those illustrated in FIG. 9. For example, an exosuit could lack TSAs, exotendons, and/or haptic elements, and/or could include electroadhesive elements or other components.

The physiological sensors 920 include a temperature sensor 922, a heart rate sensor 924 (that could include an ECG sensor, an optical pulse sensor, a microphone, or some other elements configured to detect a pulse of a wearer), and a Galvanic skin response (GSR) sensor 928. The physiological sensors 920 could include additional or alternate sensors. The kinematic sensors 930 include strain sensors 932, force sensors 934, EMG sensors 936, and inertial measurement unit (IMU) sensors 938. The kinematic sensors 930 could include one or more of each of the types of sensors according to an application of the flexible exosuit; for example, the flexible exosuit could include and IMU 938 for each of the segments of a wearer's body, such that the exosuit 900 could operate the IMUs 938 to determine a posture of the wearer's body that includes information about the relative location and orientation of each segment of the wearer's body. The kinematic sensors 930 could include additional or alternate sensors. The environmental sensors 931 include global positioning system (GPS) location receivers 933 configured to determine the location of the exosuit 900 on the surface of the Earth using GPS signals, light detection and ranging (LIDAR) sensors 935 configured to detect the location of objects in the environment of the exosuit 900, and humidity sensors 937. The environmental sensors 931 could include additional or alternate sensors.

The battery(s) 911 are configured to power elements of the exosuit 900. The battery(s) 911 could be rechargeable or single-use. The battery(s) 911 could include a variety of chemistries, including but not limited to alkaline, zinc-air, zinc-oxide, nickel-cadmium, lead-acid, lithium-polymer, and nickel metal hydride. The battery(s) 911 could include a single battery or a plurality of batteries disposed on or within the exosuit 900 according to an application. Additionally or alternatively, the exosuit 900 could be powered by a tether (e.g., a tether plugged into a mains power grid), a fuel cell, a chemical engine (e.g., chemical engine that include an electro-active polymer as describe above), solar cells, or some other power source or combination of power sources.

Controller(s) 910 may be a general-purpose processor(s), a special purpose processor(s) (e.g., digital signal processors, application specific integrated circuits, etc.), or combinations thereof. The one or more controllers 910 can be configured to execute computer-readable programs that are stored in a computer readable medium disposed in the exosuit 900 (not shown) and that are executable to provide the functionality of the exosuit 900 described herein. Additionally or alternatively, the controller(s) 900 could execute instructions received from an outside system using the communications interface(s) 980. The instructions could include descriptions of application programming interfaces (APIs) or other protocols to allow functions of the exosuit 900 (e.g., biosensing, actuation) to be monitored, initiated, altered, or otherwise interacted with by a remote system communicating with the exosuit through some communications channel (e.g., a smartphone application communicating with the exosuit 900 through the communications interface(s) 980).

Controller(s) 910 may be disposed at various locations in or on the exosuit 910 according to an application. For example, one of the controller(s) could be disposed in the motor controller(s) 965 to facilitate high-bandwidth, low-latency control of the TSA(s) 960. The controller(s) 910 could be configured in ways related to their location and/or function in the exosuit 900. For example, a controller disposed in the motor controller(s) 965 could be an FPGA or ASIC while a controller configured to coordinate all of the elements of the exosuit 900 (i.e., 920, 930, 931, 955, 965, 970, 980) could be a more multi-purpose processor (e.g., ARM, PIC, x86). Further, the program instructions executed by individual controllers of the controller(s) 910 could be specific to the individual controllers. For example, a controller disposed to enable functions of the user interface(s) 970 may execute program instructions containing descriptions of the user interface elements and methods for conveying information to/from other controllers, while a controller disposed to enable control of an actuator may execute program instructions that define a real-time operating system (RTOS) and PID controller that enable fixed-latency updates of any actuator control outputs generated by the controller.

The user interface(s) 970 could include buttons, screens, touchpads, indicator lights, joysticks, or other elements configured to present information to a wearer of the exosuit 900 and/or to receive commands from the wearer. The user interface(s) 970 could be operated to allow the user to select a mode of operation of the exosuit 900, to adjust one or more parameters of the exosuit 900, initiate a function of the exosuit 900, or to otherwise input information to the exosuit 900. For example, the user interface(s) 970 could include a touchscreen disposed on an element of the exosuit 900 configured to be worn on an arm of the wearer. The touchscreen could be operated to present a number of operating modes of and/or applications installed in the exosuit 900 to the user (e.g., walk, sprint, stand at attention, jump, carry object, lift object), to detect the presence and location of the wearer's finger on the touchscreen, to detect the operating mode and/or application selected by the wearer, and to communicate the identity of the selected option to another system (e.g., the controller(s) 910).

Conversely, the interface(s) 970 could be operated to indicate information to the user. For example, the interface(s) 970 could include a display screen (possibly a touchscreen additionally configured to accept user input, as described above) configured to indicate a mode or property of the exosuit 900, a component of the exosuit 900, the wearer of the exosuit, or some other information. Example information indicated by the screen could include a battery level of a battery powering the exosuit 900, a pulse rate of the wearer as detected by the physiological sensors 920, an operational mode of the exosuit 900, and the posture of the wearer of the exosuit 900 as detected by the physiological sensors 920, environmental sensors 931, and/or kinematic sensors 930.

The communications interface(s) 980 could be any component or components configured to enable elements of the exosuit 900 (e.g., controller(s) 910) to send and/or receive information to/from some other system or systems. For example, the communications interface(s) 980 could include a radio transceiver configured to transmit telemetry data (e.g., exosuit 900 operations, physiological data about a wearer) to a remote system. In another example, the communications interface(s) 980 could be configured to communicate with a cellphone or tablet of the wearer and to facilitate control of the exosuit 900 by an application on the cellphone or tablet by enabling communication between the application and the controller(s) 910. The communications interface(s) 980 could be configured to communicate over wired and/or wireless media. The communications interface(s) 980 could include radios, Bluetooth transceivers, WiFi transceivers, LTE or other cellular communications equipment, satellite uplinks, ZigBee transceivers, IRdA or other optical communications elements, or some other components configured to enable communications between elements of the exosuit 900 (e.g., controller(s) 910) and some remote system.

The communications interface(s) 980 could be operated to enable the sending of telemetry about the exosuit 900 and/or wearer, the sending and/or receiving of calibration data for elements of the exosuit 900 or aspects of a wearer, receiving program instructions or other data from a remote system (e.g., an online application store). Further, the communications interface(s) 980 could be configured to facilitate communication between a wearer of the exosuit 900 and some other person or system. For example, the exosuit 900 could include a microphone and/or speakers and could operate the communications interface(s) 980, microphone, and speakers to facilitate verbal communications between the wearer and another person.

The high-voltage driver(s) 955 are configured to produce and modulate high voltage signals to operate exotendon(s) 940 and/or electropolymer artificial muscle (EPAM) haptic element(s) 950. The high-voltage driver(s) 955 could include inductors, transformers, flybacks, capacitors, high-voltage switches, oscillators, or other elements to enable the production, storage, modulation, gating, and other functions relating to high voltage. The high voltage could be a voltage of several hundred volts, or some other voltage, according to the configuration of the exotendon(s) 940 and/or haptic element(s) 950. In some examples, the high-voltage driver(s) 955 could include a single high voltage generator and one or more high-voltage switches configured to gate a high voltage generated by the high voltage generator to a set of respective actuators (e.g., exotendon(s) 940, haptic element(s) 950). The high-voltage driver(s) 955 could be configured to provide intermediate levels of voltage to an actuator (e.g., exotendon(s) 940, haptic element(s) 950) to enable operation of the actuator at an intermediate level, e.g., to operate an exotendon 940 such that the exotendon 940 slipped under tension rather than being fully clutched (no slip) or fully un-clutched (free movement).

The high-voltage driver(s) 955 could be configured to enable other functions. In some examples, the high-voltage driver(s) 955 could be configured to allow for detection of some property or properties of the actuator(s) 940, 950. For example, the high-voltage driver(s) 955 could be configured to detect a capacitance of an exotendon 940 and the detected capacitance could be used to determine a length, strain, or other information about the exotendon 940. Further, the high-voltage driver(s) 955 could be configured to perform closed-loop control of an actuator; for example, the high-voltage driver(s) 955 could detect a length of an exotendon 940 that is under tension and could operate to apply a voltage to the exotendon 940 such that the length of the exotendon 940 increased at a controlled rate, or according to some other command or constraint. In some examples, the high-voltage driver(s) 955 could be configured to ensure safe operation, e.g., to prevent over-voltage, over-current, injury to a wearer, damage to elements of the exosuit 900 or some other adverse condition by including breakers, varistors, voltage clamping diodes, or some other element or elements. The high-voltage driver(s) 955 could additionally include level-shifting circuitry to enable components operating at lower voltages (e.g., controller(s) 910) to operate the high-voltage driver(s) 955 without being damaged by the high voltages produced in the high-voltage driver(s) 955.

The motor controller(s) 965 are configured to produce and modulate voltages and/or currents to operate motor(s) of TSA(s) 960. The motor controller(s) 965 could include inductors, transformers, flybacks, buck converters, boost converters, capacitors, switches, oscillators, controllers, comparators, or other elements to enable the production, storage, modulation, gating, and other functions relating to driving a motor. The motor controller(s) 965 could be configured to produce voltage and/or current waveforms to drive coils of motors of TSA(s) 960. For example, the motor controller(s) 965 could include pulse-width-modulated (PWM) switches configured to produce pulses of voltage having specified pulse widths such that a coil of a motor connected to such a PWM switch would experience an effective current related to the specified pulse widths. The motor controller(s) 965 could include electronics (e.g., comparators, ADCs, amplifiers) to detect rotation of and/or forces applied to elements of the TSA 960 using the encoder(s) 964 and/or load cell(s) 962, respectively. The motor controller(s) 965 could control the timing of voltages and/or currents applied to motor coils based on a detected angle of the rotor of the motor and/or a magnetic field detected by a Hall sensor disposed in the motor. Additionally or alternatively, the motor controller(s) 965 could control the timing of voltages and/or currents applied to motor coils based on a detected back-EMF from the motor coils and/or currents through motor coils detected using current sensors of the motor controller(s) 965. Further, the motor controller(s) 965 could be configured to perform closed-loop control of TSA(s) 960; for example, the motor controller(s) 965 could detect a tension being applied by a TSA 960 (e.g., by using the load cell(s) 962) and could operate the TSA 960 such that the tension increased/decreased at a controlled rate, or according to some other command or constraint.

VIII. Smart Tendon Exomuscles

Exotendons, twisted string actuators (TSAs), and other actuators can be operated to apply and/or transmit forces individually between two different actuated elements. Exotendons, TSAs, and other actuators can alternatively be incorporated into composite actuators to apply and/or transmit forces between two different actuated elements. Composite actuators including exotendons and TSAs could be configured to operate in a manner that was superior in some way to operating those actuators individually. For example, a composite actuator could have a superior compliance, similarity to biological actuators, efficiency, range of motion, stroke length, or some other property when compared to independently configured and/or operated exotendons and/or TSAs. A composite actuator including at least one TSA and at least one exotendon is referred to herein as a smart tendon exomuscle (STEM).

Figure 10A:
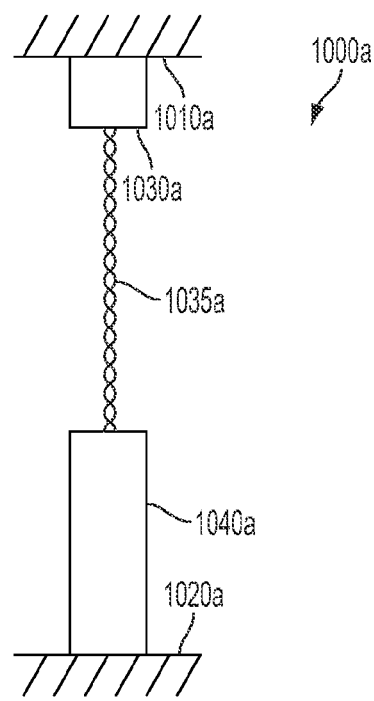
FIG. 10A is a schematic diagram of a smart tendon exomuscle.

FIG. 10A illustrates a STEM 1000a attached to first 1010a and second 1020a actuated elements such that the STEM 1000a could be operated to apply a force and/or change a displacement between the first 1010a and second 1020a actuated elements. The STEM 1000a includes a motor 1030a rigidly coupled to the first actuated element 1010a. A first end of a twisted string 1035*a* is mechanically coupled to a first end of an exotendon 1040*a*. A second end of the exotendon 1040*a* is mechanically coupled to the second actuated element 1020*a*. A rotor of the motor 1010*a* is coupled to a second end of the twisted string 1035*a* such that the motor 1010*a* can be operated to apply a torque and/or rotation to the second end of the twisted string 1035*a* such that a force and/or change in displacement is applied between the first 1010*a* actuated element and the first end of the exotendon 1040*a*. The exotendon 1040*a* is configured to act as a switched compliance element, able to be electrically operated to have one of at least two effective compliances (i.e., two different relationships between forces applied between the first and second ends of the exotendon 1040*a* and strains of the exotendon 1040*a*). The exotendon 1040*a* and twisted string actuator 1030*a*, 1035*a* could be configured similarly to other exotendons (e.g., 200*a*, 200*b*, 200*c*, 200*d*) and TSAs (e.g., 400, 500*a-g*, 600*a-e*), respectively, described herein or could be configured in other ways.

The exotendon 1040*a* could be configured such that it had a very high compliance when unclutched and a very low compliance when clutched. That is, the exotendon 1040*a* could be configured such that it acted to engage and disengage the TSA 1030*a*, 1035*a* from the first 1010*a* and second 1020*a* actuated elements. The exotendon 1040*a* could be operated in this way to allow a range of motion of the TSA 1030*a*, 1035*a* to be adapted to an application. The range of motion of the TSA 1030*a*, 1035*a* is the total change in displacement between the first 1010*a* and second 1020*a* actuated elements that the TSA 1030*a*, 1035*a* could effect by rotating the second end of the twisted string 1035*a*.

In some examples, the STEM 1000*a* could be part of a flexible exosuit, and the first 1010*a* and second 1020*a* actuated elements could be a shank of a wearer's leg and a wearer's foot, respectively, such that the STEM could be operated to apply a torque to the ankle of the wearer. Displacement of the first 1010*a* and second 1020*a* actuated elements can correspond to changes in angle of the ankle of the wearer. The displacement corresponding to the full range of ankle angles that the wearer could experience could be greater than the range of motion of the TSA 1030*a*, 1035*a*. In such a situation, the exotendon 1040*a* could be operated to un-clutch the TSA 1030*a*, 1035*a* to allow the wearer to freely move their ankle joint. Once it was determined that the flexible exosuit should apply a torque to the ankle of the wearer, the exotendon 1040*a* could be operated to clutch the TSA 1030*a*, 1035*a* and the TSA 1030*a*, 1035*a* could be operated to apply the torque to the ankle of the wearer. In this way, incorporation into the STEM 1000*a* could be said to have increased the effective range of motion of the TSA 1030*a*, 1035*a* by allowing the first 1010*a* and second 1020*a* actuated elements to be un-clutched from the TSA 1030*a*, 1035*a* and repositioned.

In some examples, the exotendon 1040*a* could be clutched (i.e., could be operated to have a relatively low compliance). A flexible exosuit that includes the STEM 1000*a* could operate the TSA 1030*a*, 1035*a* and sensors (e.g., load cell(s), encoder(s), accelerometer(s)) according to some application. The flexible exosuit could operate the TSA 1030*a*, 1035*a* and sensors to determine an optimal transmission ratio, length, stroke length, or other property or properties of the TSA 1030*a*, 1035*a* relative to the application. The flexible exosuit could then clutch and un-clutch the exotendon 1040*a* to adjust the transmission ratio, length, stroke length, or other property or properties of the TSA 1030*a*, 1035*a* to correspond to the determined optimal property or properties of the TSA 1030*a*, 1035*a*.

For example, the transmission ratio of a TSA included in a STEM configured to apply forces across an ankle of a wearer could be related to the weight, geometry, or other properties of the wearer and/or of the STEM. A flexible exosuit including the STEM could operate the STEM to apply forces to the ankle of the wearer, determine the optimal transmission ratio of the TSA, and operate STEM to cause the transmission ratio of the TSA to correspond to the determined optimal transmission ratio. Thus could include un-clutching the exotendon, then operating the motor of the STEM to change the twist of the twisted string of the STEM (thus changing the transmission ration of the TSA), and then clutching the exotendon. In some examples, the flexible exosuit could indicate to a wearer (using a user interface, a haptic element, operation of the STEM, or some other method) actions to be performed by the wearer to facilitate a change in the properties of the TSA (e.g., by instructing the wearer to exert an isometric force while the exotendon is un-clutched so that the TSA can be operated to change a property of the TSA; the exotendon could subsequently clutch such that the TSA could assist the musculature of the wearer in applying dynamic and/or static forces).

The STEM 1000*a* could additionally or alternatively be operated in a bio-mimetic manner. That is, the compliance of the exotendon 1040*a* and the force and/or displacement of the TSA 1010*a*, 1015*a* could be controlled to enable application and/or transmission of forces between the first 1010*a* and second 1020*a* actuated elements that was more efficient, less likely to cause injury or damage to a wearer or system attached to the first 1010*a* and second 1020*a* actuated elements, or in some other way superior to operating individual TSAs and/or exotendons according to an application. In some examples, the exotendon 1040*a* could be configured to extract, inject, and/or store mechanical energy by including one or more springs or other compliant elements. In an example, the STEM 1000*a* could operate such an exotendon 1040*a* to be 'charged' with elastic potential energy by operating the TSA 1010*a*, 1015*a* to apply a force and displacement to the exotendon 1040*a*. The exotendon 1040*a* could then be operated to release the stored elastic potential energy. For example, the exotendon 1040*a* could be operated to release the stored elastic potential energy to allow a wearer of a flexible exosuit containing the STEM 1000*a* to accomplish a jump that was higher than the wearer and/or TSA 1010*a*, 1015*a* could have accomplished without the elastic potential energy stored in the exotendon 1040*a*.

Figure 10B:
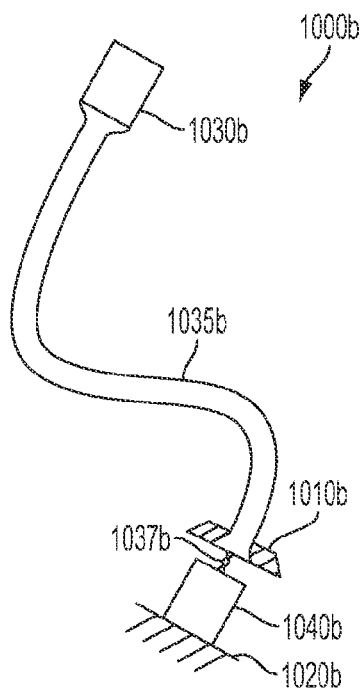
FIG. 10B is a schematic diagram of a smart tendon exomuscle.

A STEM configured similarly to STEM 1000*a* could be configured as a self-contained, flexible unit. FIG. 10B illustrates a STEM 1000*b* attached to first 1010*b* and second 1020*b* actuated elements such that the STEM 1000*b* could be operated to apply a force and/or change a displacement between the first 1010*b* and second 1020*b* actuated elements. The STEM 1000*b* includes a motor 1030*b* rigidly coupled to a first end of a flexible transmission tube 1035*b* that is configured to transmit torques and/or forces along its length and to be flexible in directions perpendicular to its length (similar to the outer housing of a Bowden cable). A second end of the flexible transmission tube 1035*b* is rigidly coupled to the first actuated element 1010*b*. A first end of a twisted string 1037*b* is mechanically coupled to a first end of an exotendon 1040*b*. A second end of the exotendon 1040*b* is mechanically coupled to the second actuated element 1020*b*. The twisted string 1037*b* is partially contained within and protected by flexible transmission tube 1035*b*. A rotor of the motor 1010*b* is coupled to a second end of the twisted string 1037*b* such that the motor 1010*b* can be operated to apply a torque and/or rotation to the second end of the twisted string 1037*b* such that a force and/or change in displacement is applied between the first 1010b actuated element and the first end of the exotendon 1040b. The exotendon 1040b is configured to act as a switched compliance element, able to be electrically operated to have one of at least two effective compliances (i.e., to have two different relationships between forces applied between the first and second ends of the exotendon 1040b and strains of the exotendon 1040b). The exotendon and twisted string actuator 1030b, 1035b could be configured similarly to other exotendons (e.g., 200a, 200b, 200c, 200d) and TSAs (e.g., 400, 500a-g, 600a-e), respectively, described herein or could be configured in other ways. STEM 1000b could be operated similarly to STEM 1000a.

Figure 10C:
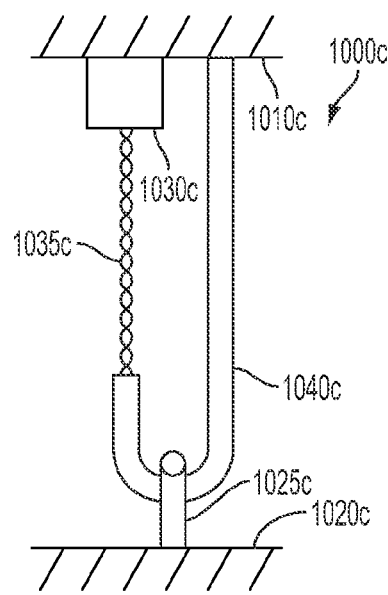
FIG. 10C is a schematic diagram of a smart tendon exomuscle.

FIG. 10C illustrates a STEM 1000c attached to first 1010c and second 1020c actuated elements such that the STEM 1000c could be operated to apply a force and/or change a displacement between the first 1010c and second 1020c actuated elements. The STEM 1000c includes a motor 1030c rigidly coupled to the first actuated element 1010c. A first end of a twisted string 1035c is mechanically coupled to a first end of an exotendon 1040c. A second end of the exotendon 1040c is mechanically coupled to the first actuated element 1010c. The exotendon 1040c is flexible and wrapped around a bar 1025c that is rigidly coupled to the second actuated element 1020c. A rotor of the motor 1010c is coupled to a second end of the twisted string 1035c such that the motor 1010c can be operated to apply a torque and/or rotation to the second end of the twisted string 1035c such that a force and/or change in displacement is applied between the first 1010c actuated element and the first end of the exotendon 1040c. The exotendon 1040c is configured to act as a switched compliance element, able to be electrically operated to have one of at least two effective compliances (i.e., two different relationships between forces applied between the first and second ends of the exotendon 1040c and strains of the exotendon 1040c). The exotendon 1040c and twisted string actuator 1030c, 1035c could be configured similarly to other exotendons (e.g., 200a, 200b, 200c, 200d) and TSAs (e.g., 400, 500a-g, 600a-e), respectively, described herein or could be configured in other ways. STEM 1000c could be operated similarly to STEM 1000c.

Figure 10D:
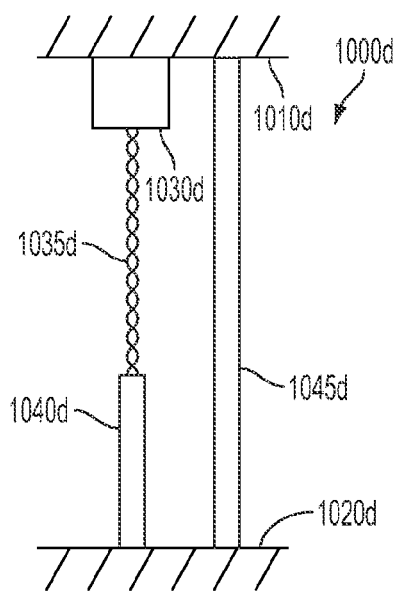
FIG. 10D is a schematic diagram of a smart tendon exomuscle.

FIG. 10D illustrates a STEM 1000d attached to first 1010d and second 1020d actuated elements such that the STEM 1000d could be operated to apply a force and/or change a displacement between the first 1010d and second 1020d actuated elements. The STEM 1000d includes a motor 1030d rigidly coupled to the first actuated element 1010d. A first end of a twisted string 1035d is mechanically coupled to a first end of a first exotendon 1040d. A second end of the first exotendon 1040d is mechanically coupled to the second actuated element 1020d. A rotor of the motor 1010d is coupled to a second end of the twisted string 1035d such that the motor 1010d can be operated to apply a torque and/or rotation to the second end of the twisted string 1035d such that a force and/or change in displacement is applied between the first 1010d actuated element and the first end of the first exotendon 1040d. The STEM 1000d additionally includes a second exotendon 1045d that has two ends that are rigidly coupled to the first 1010d and second 1020d actuated elements, respectively. The exotendons 1040d, 1045d are configured to act as a switched compliance elements, able to be independently electrically operated to each have one of at least two effective compliances (i.e., two different relationships between forces applied between first and second ends of an exotendon 1040d, 1045d and strains of the exotendon 1040d, 1045d). The exotendons 1040d, 1045d and twisted string actuator 1030d, 1035d could be configured similarly to other exotendons (e.g., 200a, 200b, 200c, 200d) and TSAs (e.g., 400, 500a-g, 600a-e), respectively, described herein or could be configured in other ways.

The STEM 1000d could be operated to provide some application or operation of a flexible exosuit. In some examples, the second exotendon 1045d could be connected in series with a spring to allow the spring to be clutched to transmit forces (e.g., to/from a body of a wearer) during a first period of time and to transmit substantially no forces during a second period of time. For example, the exotendon 1045d could be connected in series with a spring and the first 1010d and second 1020d actuated elements could be the calf and the foot of a wearer, such that the STEM 1000d could be operated to apply an extensor torque to the ankle of the wearer. The second exotendon 1045d could be clutched following contact of the heel of the user with the ground during locomotion. The clutched spring could then be 'charged' with elastic potential energy as the user flexes their ankle. The 'stored' elastic potential energy could be released to the ankle of the wearer as the wearer extends their ankle before lifting their foot from the ground; this storage and release of mechanical energy from/to the ankle of the wearer could increase the efficiency of the locomotion of the wearer. The second exotendon 1045d could be un-clutched following the lifting of the wearer's foot from the ground, such that the second exotendon 1045d and spring did not substantially affect the rotation and/or torque at the wearer's ankle while the wearer's foot was not in contact with the ground. In parallel, the first exotendon 1040d could be clutched at the point in time that the spring began to release stored elastic potential energy, and un-clutched following the lifting of the wearer's foot from the ground. While the first exotendon 1040d is clutched, the TSA 1030d, 1035d could be operated to apply an extensor torque to the ankle of the wearer, assisting the spring and the muscles of the wearer in applying force against the ground through the foot of the wearer. Other configurations and patterns of use of the STEM 1000d are anticipated according to an application. Further, a spring connected in series with an exotendon could be implemented as an element of the exotendon.

In some examples, the exotendons 1040d, 1045d and/or additional exotendons (not shown) included in the STEM 1000d could be clutched and un-clutched in an alternating fashion to allow greater forces to be generated and/or applied between the first 1010d and second 1020d actuated elements. For example, the exotendons 1040d, 1045d could be operated to 'ratchet' a spring, mechanically connecting it to force-applying and/or force generating elements (the body of a wearer, the TSA 1030d, 1035d) to progressively add mechanically energy in a spring (not shown and/or included in the exotendons 1040d, 1045d). Other repeated, mechanically additive operations of a STEM are anticipated.

Note that the STEMs described herein (e.g., 1000a, 1000b, 1000c, 1000d) are intended as non-limiting illustrative examples. Other configurations and operations of a STEM are anticipated. Further, the TSA of any example STEM herein could be replaced with some other linear actuator, for example, an EPAM.

IX. Configurations of Elements of a Flexible Exosuit to Apply Forces and/or Torques to a Single Joint Configurations of actuators and rigid and flexible force-transmitting elements in a flexible exosuit can enable the transmission of forces from a first segment of a wearer's body to a second segment. This can be accomplished using electrically-operated elements such that the flexible exosuit could operate the actuators to minimally encumber relative motion of the first and second segments. FIGS. 11A-11I illustrate schematic side views, respectively of flexible exosuits 1100*a-i* configured to selectively transmit forces between the calf and the foot of respective wearers 1105*a*-I such that torques are applied to respective ankles 1107*a-i*.

Figure 11A:
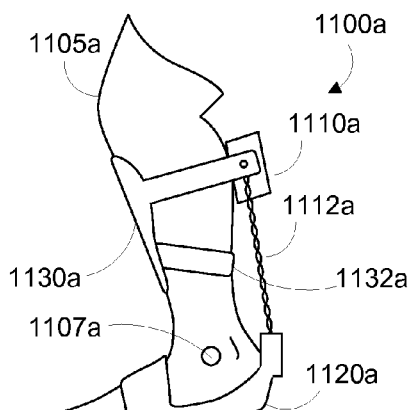
FIG. 11A is a side view of elements of a flexible exosuit being worn by a wearer.

FIG. 11A illustrates elements of a flexible exosuit 1100*a* configured to apply an extensor torque to the ankle 1107*a* of a wearer 1105*a* and/or a tensile force between the calf and the foot of the wearer 1105*a*. The flexible exosuit 1100*a* includes a motor 1110*a* rigidly coupled to a first force-transmitting element (FTE) 1130*a*. The first force-transmitting element 1130*a* is configured to couple the motor 1110*a* to the calf of the wearer 1105*a* such that the location of the motor 1110*a* relative to the calf of the wearer 1105*a* does not significantly change when the flexible exosuit 1100*a* is operated to apply an extensor torque and/or tensile force to the body of the wearer 1105*a*. Further, the first FTE 1130*a* is configured such that the location of the motor 1110*a* relative to the calf of the wearer 1105*a* is behind the calf of the wearer 1105*a*. The flexible exosuit 1100*a* additionally includes a second FTE 1120*a* configured to couple a first end of a twisted string 1112*a* to the foot of the wearer 1105*a*. A second end of the twisted string 1112*a* is coupled to a rotor of the motor 1110*a*.

Operation of the motor 1110*a* causes an extensor torque to be applied to the ankle of the wearer 1105*a*. Operation of flexible exosuit 1100*a* to apply such an extensor torque can also result in a normal force applied to the posterior of the calf of the wearer 1105*a* applied by straps 1132*a* coupled to the first FTE 1130*a* and configured to maintain the location of the first FTE 1130*a* relative to the calf of the wearer 1105*a*. Operation of flexible exosuit 1100*a* to apply such an extensor torque can further result in significant compressive loading of the ankle 1107*a*.

Figure 11B:
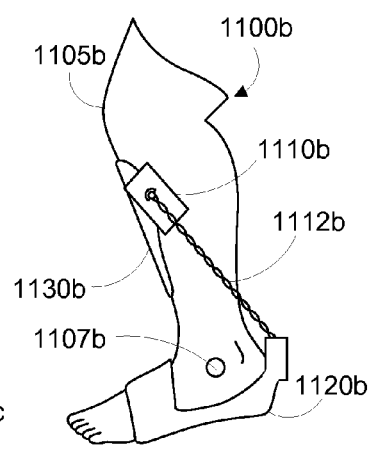
FIG. 11B is a side view of elements of a flexible exosuit being worn by a wearer.

FIG. 11B illustrates elements of a flexible exosuit 1100*b* configured to apply an extensor torque to the ankle 1107*a* of a wearer 1105*b* and/or a tensile force between the calf and the foot of the wearer 1105*b*. The flexible exosuit 1100*b* includes a motor 1110*b* rigidly coupled to a first FTE 1130*b*. The first force-transmitting element 1130*b* is configured to couple the motor 1110*b* to the calf of the wearer 1105*b* such that the location of the motor 1110*b* relative to the calf of the wearer 1105*a* does not significantly change when the flexible exosuit 1100*b* is operated to apply an extensor torque and/or tensile force to the body of the wearer 1105*b*. Further, the first FTE 1130*b* is configured such that the location of the motor 1110*b* relative to the calf of the wearer 1105*b* is in front of the calf of the wearer 1105*b*. The flexible exosuit 1100*b* additionally includes a second FTE 1120*b* configured to couple a first end of a twisted string 1112*b* to the foot of the wearer 1105*b*. A second end of the twisted string 1112*b* is coupled to a rotor of the motor 1110*b*.

Operation of the motor 1110*b* causes an extensor torque to be applied to the ankle of the wearer 1105*b*. Operation of flexible exosuit 1100*b* to apply such an extensor torque can also result in a significant downward shear force to be applied to the front of the calf of the wearer 1105*b* by the first FTE 1130*b*. Operation of flexible exosuit 1100*b* to apply such an extensor torque can further result in significant compressive loading of the ankle 1107*b*.

Figure 11C:
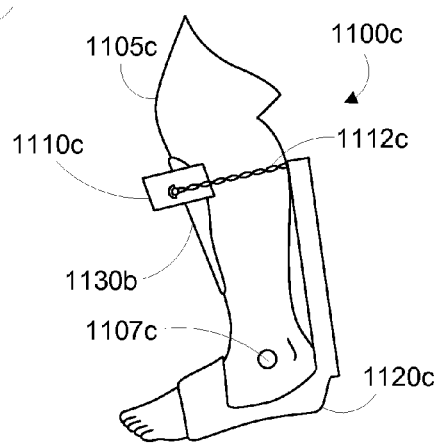
FIG. 11C is a side view of elements of a flexible exosuit being worn by a wearer.

FIG. 11C illustrates elements of a flexible exosuit 1100*c* configured to apply an extensor torque to the ankle 1107*c* of a wearer 1105*c*. The flexible exosuit 1100*c* includes a motor 1110*c* rigidly coupled to a first FTE 1130*c*. The first force-transmitting element 1130*c* is configured to couple the motor 1110*c* to the calf of the wearer 1105*c* such that the location of the motor 1110*c* relative to the calf of the wearer 1105*c* does not significantly change when the flexible exosuit 1100*c* is operated to apply an extensor torque and/or tensile force to the body of the wearer 1105*c*. Further, the first FTE 1130*c* is configured such that the location of the motor 1110*c* relative to the calf of the wearer 1105*c* is in front of the calf of the wearer 1105*c*. The flexible exosuit 1100*c* additionally includes a second FTE 1120*c* configured to couple a first end of a twisted string 1112*c* to the foot of the wearer 1105*c*. The second FTE 1120*c* includes at least one rigid member (i.e., a member capable of transmitting compressive forces and torques in addition to tensile forces) that extends from the heel of the wearer 1105*c* to the first end of a twisted string 1112*c*. A second end of the twisted string 1112*c* is coupled to a rotor of the motor 1110*c*.

Operation of the motor 1110*c* causes an extensor torque to be applied to the ankle of the wearer 1105*c*. Operation of flexible exosuit 1100*c* to apply such an extensor torque can result in the application of very little shear force between the front of the calf of the wearer 1105*c* and the first FTE 1130*c*. The movement of the rigid member of the second FTE 1120*c* can require a significant volume behind the calf of the wearer 1105*c* to be clear of other objects.

Figure 11D:
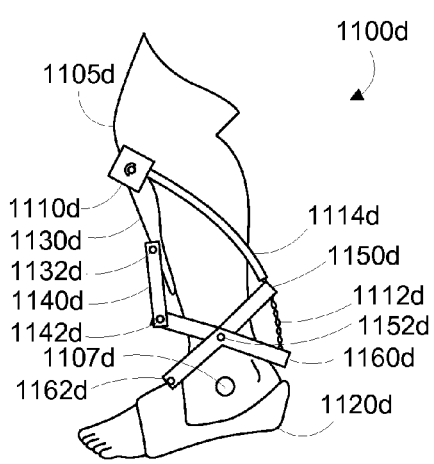
FIG. 11D is a side view of elements of a flexible exosuit being worn by a wearer.

FIG. 11D illustrates elements of a flexible exosuit 1100*d* configured to apply an extensor torque to the ankle 1107*d* of a wearer 1105*d* and/or a force between the calf and the foot of the wearer 1105*d*. The flexible exosuit 1100*d* includes a motor 1110*d* rigidly coupled to a first FTE 1130*d*. The first force-transmitting element 1130*d* is configured to couple forces to the calf of the wearer 1105*d*. The flexible exosuit 1100*d* additionally includes first 1140*d*, second 1150*d*, and third 1160*d* rigid force-transmitting elements (RFTEs). The first RFTE 1140*d* is connected to the first FTE 1130*d* and the second RFTE 1150*d* through bearings 1132*d* and 1142*d*, respectively. Third RFTE 1160*d* is connected to the second RFTE 1150*d* and a second FTE 1120*d* through bearings 1152*d* and 1162*d*, respectively. Second FTE 1120*d* is configured to couple forces from bearing 1162*d* to the foot of the wearer 1105*b*. The flexible exosuit 1100*d* additionally includes a flexible transmission tube 1114*d* that is configured to transmit torques and/or forces along its length and to be flexible in directions perpendicular to its length (similar to the outer housing of a Bowden cable). The ends of the flexible transmission tube 1114*d* are connected to the motor 1110*d* and to the second RFTE 1150*d*. A twisted string 1112*d* is partially disposed within the flexible transmission tube 1114*d* and is connected to a rotor of the motor 1110*b* and to the third RFTE 1160*d*.

Operation of the motor 1110*d* causes a force to be applied between the posterior ends of the second 1150*d* and third 1160*d* RFTEs, such that bearings 1142*d* and 1162*d* are forced away from each other. This can result in an extensor torque being applied to the ankle of the wearer 1105*d*. Operation of flexible exosuit 1100*d* to apply such an extensor torque can also result in a significant upward shear force to be applied to the front of the calf of the wearer 1105*d* by the first FTE 1130*d*. Operation of flexible exosuit 1100*d* to apply such an extensor torque can further result in a decreased compressive loading of the ankle 1107*d*.

Figure 11E:
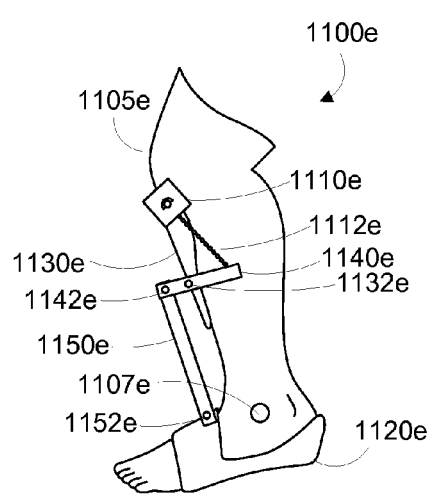
FIG. 11E is a side view of elements of a flexible exosuit being worn by a wearer.

FIG. 11E illustrates elements of a flexible exosuit 1100*e* configured to apply an extensor torque to the ankle 1107*e* of a wearer 1105*e* and/or a force between the calf and the foot of the wearer 1105*e*. The flexible exosuit 1100*e* includes a motor 1110*e* rigidly coupled to a first FTE 1130*e*. The first force-transmitting element 1130*e* is configured to couple forces to the calf of the wearer 1105*e*. The flexible exosuit 1100*e* additionally includes first 1140*e* and second 1150*e* rigid force-transmitting elements (RFTEs). The first RFTE 1140*e* is connected to the first FTE 1130*e* and the second RFTE 1150*e* through bearings 1132*e* and 1142*e*, respectively. The second RFTE 1150*e* is connected to a second FTE 1120*e* through a bearing 1152e. Second FTE 1120e is configured to couple forces from bearing 1152e to the foot of the wearer 1105e. The flexible exosuit 1100e additionally includes a twisted string 1112e that is connected to a rotor of the motor 1110e and to the first RFTE 1140e.

Operation of the motor 1110e causes a force to be applied such that bearings 1132e and 1152e are forced away from each other. This can result in an extensor torque being applied to the ankle of the wearer 1105e. Operation of flexible exosuit 1100e to apply such an extensor torque can also result in a significant upward shear force to be applied to the front of the calf of the wearer 1105e by the first FTE 1130e. Operation of flexible exosuit 1100e to apply such an extensor torque can further result in a decreased compressive loading of the ankle 1107e.

Figure 11F:
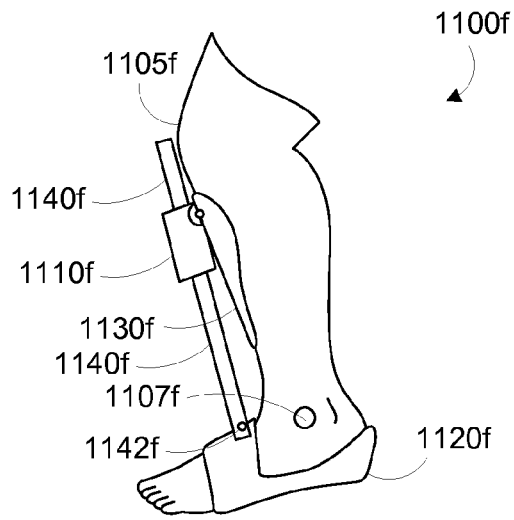
FIG. 11F is a side view of elements of a flexible exosuit being worn by a wearer.

FIG. 11F illustrates elements of a flexible exosuit 1100f configured to apply an extensor torque to the ankle 1107f of a wearer 1105f and/or a force between the calf and the foot of the wearer 1105f. The flexible exosuit 1100f includes an actuator 1110f rigidly coupled to a first FTE 1130f. The first force-transmitting element 1130f is configured to couple the actuator 1110f to the calf of the wearer 1105f such that the location of the actuator 1110f relative to the calf of the wearer 1105f does not significantly change when the flexible exosuit 1100f is operated to apply an extensor torque and/or force to the body of the wearer 1105f. Further, the first FTE 1130f is configured such that the location of the actuator 1110f relative to the calf of the wearer 1105f is in front of the calf of the wearer 1105f. The flexible exosuit 1100f additionally includes a second FTE 1120f configured to couple a first end of a rigid force-transmitting element 1140f (RFTE) through a bearing 1142f to the foot of the wearer 1105f. The RFTE 1140f is configured to be acted upon by the actuator 1110f.

Operation of the actuator 1110f causes a force to be applied such that bearing 1142f and first FTE 1130f are forced away from each other. This can result in an extensor torque being applied to the ankle of the wearer 1105f. Operation of flexible exosuit 1100f to apply such an extensor torque can also result in a significant upward shear force to be applied to the front of the calf of the wearer 1105f by the first FTE 1130f. Operation of flexible exosuit 1100f to apply such an extensor torque can further result in a decreased compressive loading of the ankle 1107f. The actuator 1110f and RFTE 1140f could be configured to act as a rack-and-pinion, ball screw, and/or a screw drive (i.e., part of the RFTE 1140f was threaded, knurled, or otherwise toothed such that the actuator 1110f could apply a downward force and/or displacement to the RFTE 1140f relative to the first FTE 1130f). Additionally or alternatively, the actuator 1110f could be a twisted string actuator, and a twisted string of the actuator 1110f could extend from the actuator 1110f to an end of the RFTE 1140f opposite the bearing 1142f such that operation of the twisted string actuator 1110f caused a downward force and/or displacement to be applied to the RFTE 1140f relative to the first FTE 1130f. Other configurations are anticipated.

Figure 11G:
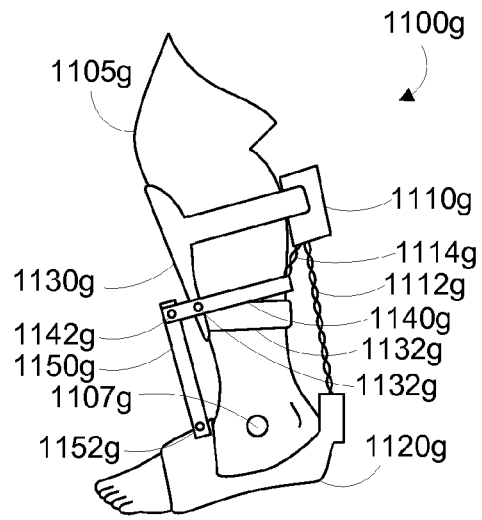
FIG. 11G is a side view of elements of a flexible exosuit being worn by a wearer.

FIG. 11G illustrates elements of a flexible exosuit 1100g configured to apply an extensor torque to the ankle 1107g of a wearer 1105g. The flexible exosuit 1100g includes a motor 1110g rigidly coupled to a first FTE 1130g. The first force-transmitting element 1130g is configured to couple forces to the calf of the wearer 1105g. The flexible exosuit 1100g additionally includes first 1140g and second 1150g rigid force-transmitting elements (RFTEs). The first RFTE 1140g is connected to the first FTE 1130g and the second RFTE 1150g through bearings 1132g and 1142g, respectively. The second RFTE 1150g is connected to the anterior of a second FTE 1120g through a bearing 1152g. Second FTE 1120g is configured to couple forces to the foot of the wearer 1105g from bearing 1152g and from a first twisted string 1112g that is connected to the posterior of the second FTE 1120g. The first twisted string 1112g is additionally connected to elements of the motor 1110g such that the motor can be operated to rotate one end of the first twisted string 1112g. The flexible exosuit 1100g additionally includes a second twisted string 1114g that is connected to the first RFTE 1140g and to elements of the motor 1110g such that the motor 1110g can be operated to rotate one end of the second twisted string 1114g.

Operation of the motor 1110g causes a force to be applied such that bearings 1132g and 1152g are forced away from each other and such that the posterior of the second FTE 1120g is forced upward toward the motor 1110g. This can result in an extensor torque being applied to the ankle of the wearer 1105g. The flexible exosuit 1100g can be configured such that operation of the flexible exosuit 1100g to apply such an extensor torque results in significantly no shear force between the front of the calf of the wearer 1105g and the first FTE 1130g. Operation of flexible exosuit 1100g to apply such an extensor torque can further result in a normal force applied to the posterior of the calf of the wearer 1105g applied by straps 1132g coupled to the first FTE 1130g and configured to maintain the location of the first FTE 1130g relative to the calf of the wearer 1105g. Note that the flexible exosuit 1100g being configured to drive the first 1112g and second 1114g twisted strings using the motor 1110g could be implemented in a number of ways, including a set of gears wherein the gears are configured to be driven by the motor 1110g and wherein two of the gear are configured to drive respective twisted strings 1112g, 1114g. Additionally or alternatively, the flexible exosuit 1100g could include two motors configured to drive respective twisted strings 1112g, 1114g.

Figure 11H:
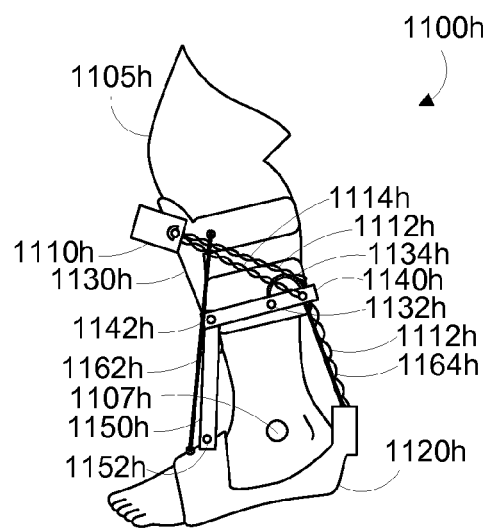
FIG. 11H is a side view of elements of a flexible exosuit being worn by a wearer.

FIG. 11H illustrates elements of a flexible exosuit 1100h configured to apply an extensor torque to the ankle 1107h of a wearer 1105h. The flexible exosuit 1100h includes a motor 1110h rigidly coupled to a first FTE 1130h. The first force-transmitting element 1130h is configured to couple forces to the calf of the wearer 1105h. The flexible exosuit 1100h additionally includes first 1140h and second 1150h rigid force-transmitting elements (RFTEs). The first RFTE 1140h is connected to the first FTE 1130h and the second RFTE 1150h through bearings 1132h and 1142h, respectively. The second RFTE 1150h is connected to the anterior of a second FTE 1120h through a bearing 1152h. Second FTE 1120h is configured to couple forces to the foot of the wearer 1105h from bearing 1152h and from a first twisted string 1112h that is connected to the posterior of the second FTE 1120h. The first twisted string 1112h is additionally connected to elements of the motor 1110h such that the motor can be operated to rotate one end of the first twisted string 1112h. The first twisted string 1112h is additionally configured to slide over a pulley 1134h that is connected to the first FTE 1130h. The flexible exosuit 1100h additionally includes a second twisted string 1114h that is connected to the posterior of the first RFTE 1140h and to elements of the motor 1110h such that the motor 1110h can be operated to rotate one end of the second twisted string 1114g.

Operation of the motor 1110g causes a force to be applied such that bearings 1132h and 1152h are forced away from each other and such that the posterior of the second FTE 1120h is forced upward toward the pulley 1134h. This can result in an extensor torque being applied to the ankle of the wearer 1105h. The flexible exosuit 1100h can be configured such that operation of the flexible exosuit 1100h to apply such an extensor torque results in significantly no shear force between the front of the calf of the wearer 1105h and the first FTE 1130*h*. Operation of flexible exosuit 1100*h* to apply such an extensor torque can further result in a normal force applied to the posterior of the calf of the wearer 1105*g* applied by straps coupled to the first FTE 1130*h* and configured to maintain the location of the first FTE 1130*h* relative to the calf of the wearer 1105*h*. Note that the flexible exosuit 1100*h* being configured to drive the first 1112*h* and second 1114*h* twisted strings using the motor 1110*h* could be implemented in a number of ways, including a set of gears wherein the gears are configured to be driven by the motor 1110*h* and wherein two of the gear are configured to drive respective twisted strings 1112*h*, 1114*h*. Additionally or alternatively, the flexible exosuit 1100*h* could include two motors configured to drive respective twisted strings 1112*h*, 1114*h*.

The flexible exosuit 1100*h* additionally includes a first exotendon 1162*h* connected between the first FTE 1130*h* and the anterior of the second FTE 1120*h* and a second exotendon 1164*h* connected between the posterior end of the first RFTE 1140*h* and the posterior end of the second FTE 1120*h*. The first and second exotendons 1162*h*, 1164*h* could be operated to clutch and un-clutch elements having a specified compliance (e.g., springs, straps) included in the exotendons 1162*i*, 1164*i* to store and release elastic potential energy and/or to modulate the impedance of elements of the flexible exosuit 1100*h* during locomotion or during other activities of the wearer, as described herein.

Figure 11I:
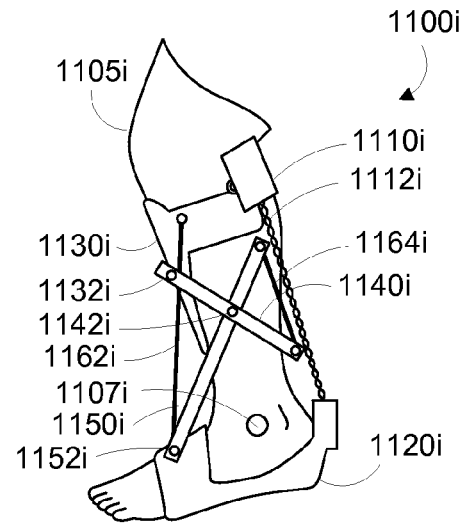
FIG. 11I is a side view of elements of a flexible exosuit being worn by a wearer.

FIG. 11I illustrates elements of a flexible exosuit 1100*i* configured to apply an extensor torque to the ankle 1107*i* of a wearer 1105*i*. The flexible exosuit 1100*i* includes a motor 1110*i* rigidly coupled to a first FTE 1130*i*. The first force-transmitting element 1130*i* is configured to couple forces to the calf of the wearer 1105*i*. The flexible exosuit 1100*i* additionally includes first 1140*i* and second 1150*i* rigid force-transmitting elements (RFTEs). The first RFTE 1140*i* is connected to the first FTE 1130*i* and the second RFTE 1150*i* through bearings 1132*i* and 1142*i*, respectively. The second RFTE 1150*i* is connected to a second FTE 1120*i* through a bearing 1152*i*. Second FTE 1120*i* is configured to couple forces from bearing 1152*i* and a twisted string 1112*i* connected to the posterior of the second FTE 1120*i* to the foot of the wearer 1105*i*. The twisted string 1112*e* is also connected to a rotor of the motor 1110*i*.

Operation of the motor 1110*i* causes a force to be applied such that the posterior of the second FTE 1120*i* is pulled toward the motor 1110*i*. This can result in an extensor torque being applied to the ankle of the wearer 1105*i*. Operation of flexible exosuit 1100*i* to apply such an extensor torque can result in significant compressive loading of the ankle 1107*i* and shear and/or normal forces transmitted into skin of the calf of the wearer 1105*i* by the first FTE 1130*i*.

The flexible exosuit 1100*i* additionally includes a first exotendon 1162*i* connected between the first FTE 1130*i* and the second FTE 1120*i* and a second exotendon 1164*i* connected between the posterior end of the first RFTE 1140*i* and the posterior end of the second RFTE 1150*i*. The first and second exotendons 1162*i*, 1164*i* could be operated to clutch and un-clutch elements having a specified compliance (e.g., springs, straps) included in the exotendons 1162*i*, 1164*i* to store and release elastic potential energy and/or to modulate the impedance of elements of the flexible exosuit 1100*i* during locomotion or during other activities of the wearer, as described herein. Further, the first and second exotendons 1162*i*, 1164*i* could be operated to reduce the compressive loading of the ankle 1107*i* and the shear and/or normal forces transmitted into skin of the calf of the wearer 1105*i* by the first FTE 1130*i* when the flexible exosuit 1100*i* is operated to apply an extensor torque to the ankle of the wearer 1105*i*.

Note that FIGS. 11A-11I show simplified, cross-sectional schematic views of elements of respective flexible exosuits 1100*a*-1100*i*. Some or all of the elements of flexible exosuits 1100*a*-1100*i* could be duplicated and the original and duplicate elements disposed on opposite sides of the leg of the respective wearer 1105*a*-1105*i*. Additionally or alternatively, elements of flexible exosuits 1100*a*-1100*i* could be configured to wholly or partially encircle parts of respective wearers' 1105*a*-1105*i* bodies such that forces and/or torques transmitted between elements and/or between elements and parts of respective wearers' 1105*a*-1105*i* bodies are applied substantially along a plane bisecting local elements (e.g., joints) of respective wearers' 1105*a*-1105*i* bodies (e.g., along a mid-sagittal plane of a leg in the illustrated examples). Further, elements described as 'bearings' (e.g., 1132*d,e,g,h,i*, 1142*d,e,g,h,i*, 1162*d*) could be any variety of bearings (e.g., plain bearings, ball bearings, roller bearings, fluid bearings) or could be other elements configured to allow a rotation between elements but not to allow translation (e.g., a ball-and-socket joint), according to an application. Additionally, illustrated 'bearings' (e.g., 1132*d,e,g,h,i*, 1142*d,e,g,h,i*, 1162*d*) could include rods or pins configured to rigidly couple duplicate, paired elements (as described above) on opposite sides of an aspect of a wearer's body. Further, note that where rods and/or pins are shown, other rotational or other joints could be used according to an application. For example, hinge joints, ball-and-socket joints, Hardy-Spicer joints, or other joints could be used according to an application requiring two elements to not be able to translate but to be able to rotate in one or more dimensions.

Figure 12A:
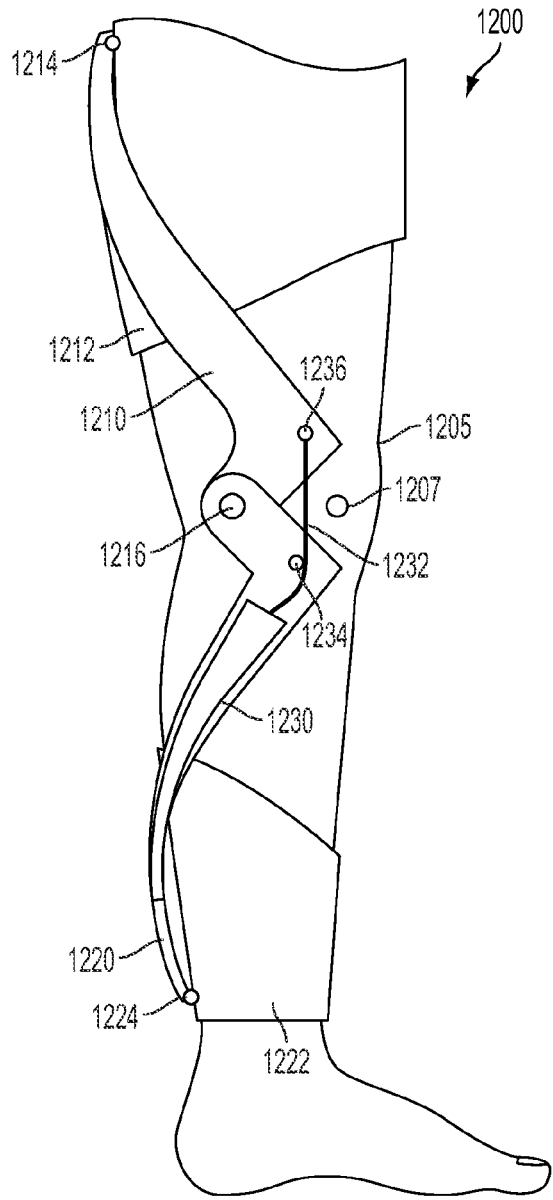
FIG. 12A is a side view of elements of a flexible exosuit being worn by a wearer.
Figure 12B:
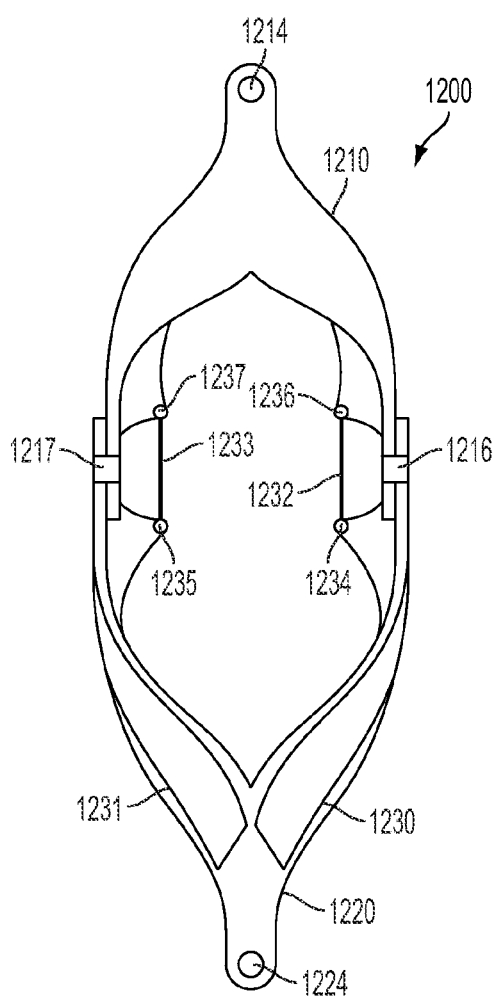
FIG. 12B is a back view of the flexible exosuit illustrated in FIG. 12A.

Configurations of actuators and rigid and flexible force-transmitting elements in a flexible exosuit can additionally enable the transmission of compressive forces from a first segment of a wearer's body to a second segment. This can be accomplished using electrically-operated elements such that the flexible exosuit could operate the actuators to minimally encumber relative motion of the first and second segments. FIGS. 12A and 12B illustrate side and back views, respectively, of parts of a flexible exosuit 1200 configured to selectively transmit compressive forces between the thigh and the calf of a wearer 1205.

The flexible exosuit 1200 includes first 1210 and second 1220 rigid force-transmitting elements (RFTEs). The first 1210 and second 1220 RFTEs are connected together by bearings 1216, 1217 configured to allow the first 1210 and second 1220 RFTEs to rotate relative to each other. When the flexible exosuit 1200 is worn by the wearer 1205 (as shown in FIG. 12A), an axis of rotation of the bearings 1216, 1217 is located proximate to, by not necessarily coaxial with, an axis of rotation of the knee 1207 of the wearer 1205. The flexible exosuit 1200 is configured such that relatively unencumbered motion of the wearer's 1205 knee and/or operation of the flexible exosuit 1200 to transmit compressive forces between the thigh and calf of the wearer 1205 are not contingent upon a precise alignment of the axis of rotation of the bearings 1216, 1217 and the axis of rotation of the knee 1207. The first 1210 and second 1220 RFTEs are connected at first 1214 and second 1224 attachment points, respectively, to first 1212 and second 1222 force coupling elements (FCEs), respectively. The FCEs 1212, 1222 can include rigid and/or flexible elements as described elsewhere in this disclosure and are configured to transmit forces transmitted to the FCEs 1212, 1222 from the RFTEs 1210, 1220 through the attachment points 1214, 1224, respectively, into skin of the thigh and calf, respectively, of the wearer 1205.

The flexible exosuit 1200 includes exotendons 1230, 1231 having first ends rigidly coupled to the second RFTE 1220 and second ends connected to respective cables 1232, 1233 that wrap around respective pulleys 1234, 1235 on the second RFTE 1220. The cables 1232, 1233 then connect to respective attachment points 1236, 1237 on the first RFTE 1210. When the exotendons 1230, 1231 are unclutched, the RFTEs 1210, 1220 can rotate about each other in response to movement of the knee of the wearer 1205. When the exotendons 1230, 1231 are clutched, rotation of the RFTEs 1210, 1220 about the bearings 1216, 1217 can be prevented by tensile forces transmitted between the RFTEs 1210, 1220 by the cables 1232, 1233. As a result, a compressive force could be transmitted by the flexible exosuit 1200 between the thigh and calf of the wearer 1205 through the attachment points 1214, 1224 when the exotendons 1230, 1231 are clutched.

The illustrated elements of the flexible exosuit 1200 are only one example of how elements of a flexible exosuit could be configured to allow transmission of compressive forces from a first segment of a wearer's body to a second segment while being able to be operated to substantially not encumber relative motion of the first and second body segments. In some examples, the actuator could include a twisted string actuator or some other flexible or rigid linear actuator, a rotational actuator (e.g., a motor, a clutch), or could include a combination of actuators (e.g., a STEM). For example, instead of the exotendon, cable, and pulley system illustrated in FIGS. 12A and 12B, a mechanical clutch could be situated on or near the bearings 1216, 1226 to prevent relative motion of the RFTEs 1210, 1220. The mechanical clutch could be configured to prevent rotation of the bearings in either direction, allowing the flexible exosuit 1200 to transmit both compressive and tensile forces. Additionally or alternatively, additional cables, pulleys, and other elements could enable at least one exotendon to prevent rotation of the bearings 1216, 1226 in one or both directions, allowing the flexible exosuit 1200 to transmit compressive and/or tensile forces between segments of a user's body.

Further, the illustrated flexible exosuit 1200 could include additional or alternate elements to enable additional functionality. Flexible straps or other elements could be connected to the RFTEs 1210, 1220 to maintain the RFTEs 1210, 1220 close to the leg of the wearer 1205 and/or to maintain some minimum alignment between the axis of rotation of the bearings 1216, 1217 and the axis of rotation of the knee 1207 while allowing the flexible exosuit 1200 to be operated so as to not substantially encumber relative motion of the thigh and calf of the wearer 1205. The shape of the second RFTE 1220, the composition of surface coatings of the second RFTE 1220 and/or the exotendons 1230, 1231, or some other aspect of the flexible exosuit 1200 could be specified to enhance the clutching force of the exotendons 1230, 1231 through the capstan effect. That is, the flexible exosuit 1200 could be configured such that a significant fraction of the force transmitted by the cables 1232, 1233 between the RFTEs 1210, 1220 is transmitted into the second RFTE 1210 through friction between a surface of the second RFTE 1220 (and/or a surface of some element rigidly mechanically coupled to the second RFTE 1220) and surfaces of the cables 1232, 1233 and/or exotendons 1230, 1231. Other configurations of a flexible exosuit configured to transmit compressive forces between body segments of a wearer are anticipated.

The illustration of elements of a flexible exosuit configured to apply forces between the calf and the foot of a wearer, as in FIGS. 11A-11I, or forces between the calf and the thigh or a wearer, as in FIGS. 12A-12B, are intended as examples. A flexible exosuit could include similar structures to transmit compressive and/or tensile forces between different segments of a wearer's body and/or across different joints of a wearer's body. For example, structures similar to those illustrated in FIGS. 11A-11I and/or FIGS. 12A-12B could, with minimal modification, be configured to apply torques to elbows, wrists, shoulders, hips, knees, ankles, and/or other joints and/or combinations of joint of a wearer. Additionally, the use of twisted string actuators in FIGS. 11A-11E and 11G-11I and the use of exotendons in FIGS. 11H-I and FIGS. 12A-B are meant as illustrative examples of actuators. Additionally or alternatively, flexible linear actuators, twisted string actuators, exotendons, EPAMs, STEMs, motor-and-drum-driven cables, servos, pneumatic or hydraulic pistons, racks and pinions, motorized screw drives or ball screws, or other actuators could be used in place of the illustrated twisted string actuators or exotendons according to an application.

X. Endo-Herr Model of Lower-limb Locomotion

FIG. 13A illustrates a schematic diagram of the Endo-Herr model 1300 of the human leg. The model can be used to simulate locomotion of the leg using a reduced set of actuators, i.e., three active force transducers and seven exotendons. The model includes rigid elements representing the bones of the leg and torso; specifically, the model includes the foot 1310a, tibia 1310b, femur 1310c, and torso and pelvis 1310d. The model additionally includes pin joints representing the in-plane movements of the joints of the leg, including the ankle 1315a, knee 131b, and hip 1315c. The bones and joints can include simulated properties according to their analogous elements of human anatomy, including masses, moments of inertia, friction and damping coefficients, or other properties.

The model 1300 includes force transducers comprising a force-generating element connected in series with a spring. These force transducers are intended to simulate some of the properties of muscles, including the ability to add energy to the leg during locomotion. The force transducers include an ankle plantarflexor 1330a connected between the tibia 1310b and a spring 1325 that is connected in turn to the foot 1310a, such that the ankle plantarflexor 1330a and spring 1325 together cross the ankle 1315a. The force transducers additionally include a hip extensor 1330b and a hip flexor 1330c connected between the torso and pelvis 1310d and the femur 1310c across the hip 1315c. Properties of the force transducers 1330a, 1330b, 1330c could be chosen to represent elements of human anatomy, available artificial transducers, or according to some other constraint or application.

The model 1300 includes exotendons comprising a clutch connected in series with a spring. These exotendons are intended to simulate some of the properties of tendons, including the ability to store energy from, dissipate energy from, and/or and release stored energy to the leg during locomotion. The exotendons additionally include the clutch, enabling the energy storage and/or compliance of the exotendons to be modulated during movement of the simulated leg to enable more efficient locomotion. The exotendons include a knee extensor 1320c and a knee flexor 1320f connected between the femur 1310c and the tibia 1310b across the knee 1315b. The exotendons additionally include a posterior femur exotendon 1320g and an anterior femur exotendon 1320h connected between the torso and pelvis 1310d and the tibia 1310b across both the hip 1315c and knee 131b. The exotendons additionally include a hip flexor 1320a connected between the torso and pelvis 1310d and the femur 1310c across the hip 1315c. The exotendons additionally include an ankle dorsiflexor 1320d connected between the tibia 1310b and the foot 1310a across the ankle 1315a. The exotendons additionally include a posterior tibia exotendon 1320e connected between the femur 1310c and the spring 1325 that is connected in turn to the foot 1310a, such that the posterior tibia exotendon 1320e and spring 1325 together cross the ankle 1315*a* and knee 1315*b*. Properties of the exotendons 1320*a*, 1320*b*, 1320*c*, 1320*d*, 1320*e*, 1320*f*, 1320*g* and spring 1325 could be chosen to represent elements of human anatomy, available artificial exotendons or other clutched-compliance components, or according to some other constraint or application.

The model 1300 can be used to simulate the effect of a sequence of activations of clutches of the exotendons and/or force-generating elements of the force transducers on a leg. A sequence of such simulations could be used to develop sets of exotendon properties, force transducer properties, clutch and force-generating element activation timings, and/or other model properties to optimize some metric. For example, simulations using the model could be used to develop a set of clutch and force-generating element activation timings to enable simulated locomotion using minimal energy. Other metrics could be optimized, including system stability, perturbation tolerance, segment jerk, joint angular acceleration, instantaneous power use, or other factors.

The model 1300 could be used to develop control algorithms for flexible exosuits, prosthetics, assistive devices, or other applications of or devices relating to the human leg. For example, a prosthetic leg could be configured to reflect the configuration of elements in the model 1300 (i.e., to include force transducer-like and exotendon-like elements). The prosthetic leg could then be operated to locomote according to an output of the model 1300, e.g., a set of clutch and force-generating element activation timings. In another example, the model 1300 could be used to test and/or train a controller for a device configured to reflect the configuration of elements in the model 1300 (e.g., the prosthetic above, or a flexible exosuit). That is, gains, timings, topologies, or other aspects of a controller could be optimized, trained, validated, or otherwise specified based on simulations performed using the model. Other uses and applications of the model 1300 are anticipated.

In some examples, the model 1300 could be used to determine joint angles, joint angular velocities, joint torques, and other variables of locomotion across a stereotypical locomotor cycle. This stereotypical locomotor cycle could be determined by including additional constraints to the behavior of the model, e.g., by attempting to develop a stable, maximally efficient locomotor cycle. From the determined information about the stereotypical locomotor cycle, a mapping or other relationship between a set of joint angles, a set of joint angular velocities, a locomotor phase, and/or a set of joint torques. For example, given a set of joint angles and joint angular velocities, one could determine a corresponding locomotor phase (e.g., a point 60% from the beginning of the stereotypical locomotor phase). One could then determine a set of joint torques corresponding to the determined locomotor phase.

The Endo-Herr model 1300, or some other model including the Endo-Herr model 1300, could be implemented as part of a controller of a flexible exosuit, prosthetic, assistive device, or other device related to a human leg. For example, a controller be configured to generate a set of activations for clutches and force-generating elements in the model 1300 based on sensed information about the human leg (e.g., joint angles, joint velocities, joint torques, user interface commands from the owner of the leg, etc.). An implementation of the model 1300 could be included in the controller and could be configured to generate a simulated set of joint torques based on the generated set of activations. Another element of the controller could be configured to operate a flexible exosuit or other device interacting with the human leg to create torques about the human leg approximating the set of simulated joint torques produced by the implementation of the model 1300. Additionally or alternatively, a controller could be configured to generate a set of joint torques for a human leg based on sensed information about the human leg. An inverse implementation of the model 1300 could be included in the controller to generate a set of activations for clutches and force-generating elements and to operate a flexible exosuit or other device interacting with the human leg based on the generated set of activations. Other uses and implementations of the Endo-Herr model 1300, or some other model including the Endo-Herr model 1300 are anticipated.

Properties and patterns of operation of the exotendons 1320*a*, 1320*b*, 1320*c*, 1320*d*, 1320*e*, 1320*f*, 1320*g*, spring 1325, and force transducers 1330*a*, 1330*b*, 1330*c* could be chosen to mimic forces, moments, movements, or other properties of locomotion recorded from a human. For example, a pattern of torques applied by muscles of a human to bones of the human while the human walks could be recorded. The properties and patterns of actuation of elements (e.g., 1320*a-g*, 1325, 1330*a-c*) of the Endo-Herr model 1300 could be specified such that the torques applied to the joints 1315*a-c* of the simulated skeleton 1310*a-d* by the elements 1320*a-g*, 1325, 1330*a-c* of the Endo-Herr model 1300 mimicked the torqued recorded from the human and/or maximized some cost function related to the recorded torques and/or the simulated work performed by the elements 1320*a-g*, 1325, 1330*a-c* of the Endo-Herr model 1300.

Figure 14:
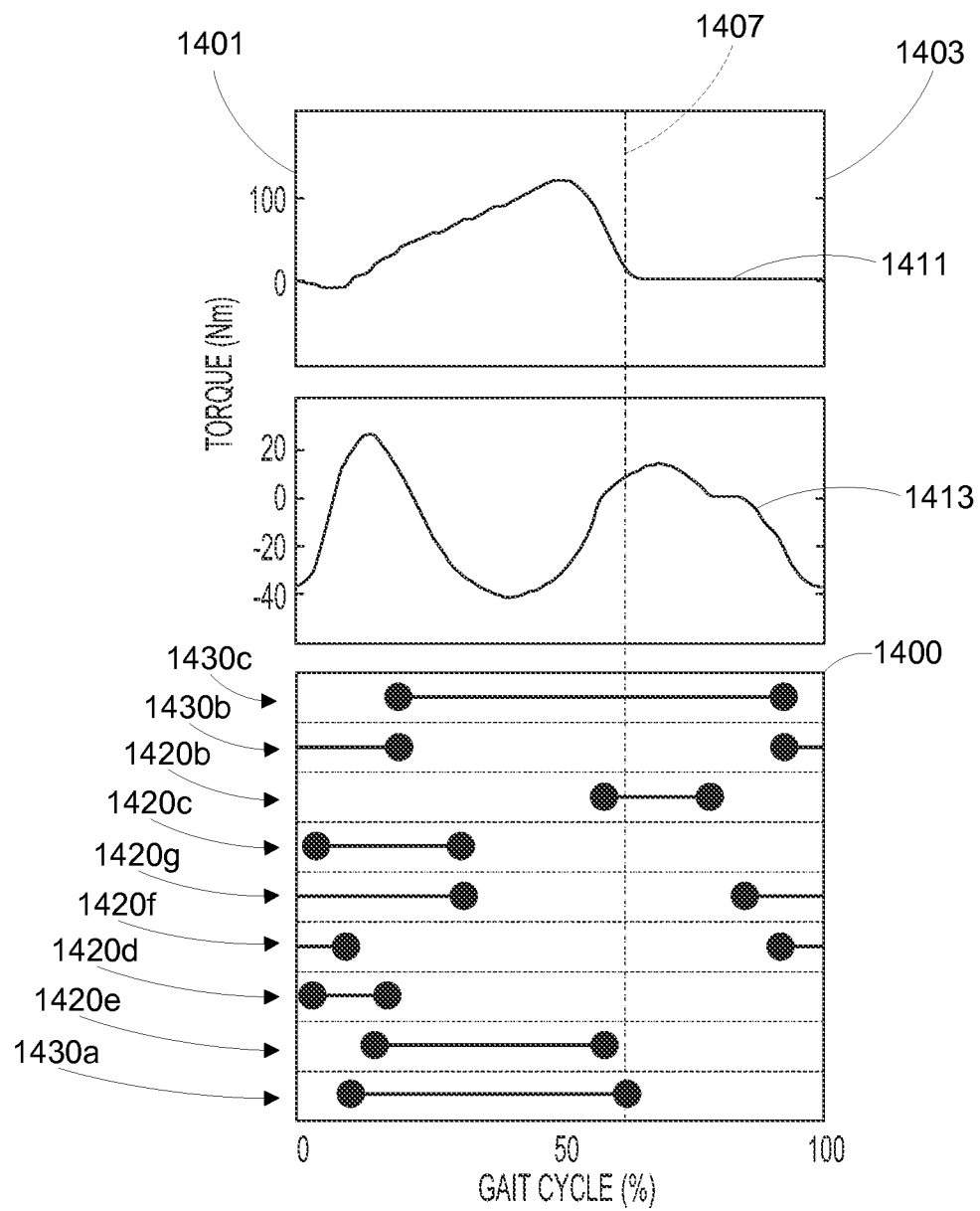
FIG. 14 illustrates patterns of operation of elements of the model of a leg illustrated in FIG. 13A.

FIG. 14 illustrates timing patterns 1400 for operating exotendons 1320*a-g* and force transducers 1330*a-c* to mimic a pattern of joint torque recorded from a human during locomotion. The timing patterns 1400 represent the timing of activation of exotendons 1320*a-g* and force transducers 1330*a-c* relative to a normalized locomotor cycle, i.e., from 0% of a walking or running step (defined as the moment the heel of the foot strikes the ground, the first heel strike 1401) to 100% (defined as the moment of the subsequent heel strike, the second heel strike 1403). The moment the foot lifts from ground surface (the beginning of swing 1407) is also illustrated. The black bars indicate periods of the normalized locomotor cycle wherein an individual actuator is active, that is, when an exotendon 1320*a-g* is clutched or a force transducer 1330*a-c* is being operated to produce a tensile force.

The levels of activation (not shown) and timing of activation (1430*a-c*) of the force transducers (1330*a-c*, respectively) are specified to produce a simulated torque at the hip 1315*c* (using 1430*b* and 1430*c*) and at the ankle 1315*a* that mimics the recorded torques. The simulated hip torque mimics the recorded torque exactly due to the presence of independent hip extensor 1330*c* and hip flexor 1330*b* force actuators. The simulated ankle torque 1411 is produced partially by the ankle extensor force actuator 1330*a* and closely matches the recorded ankle torque.

The specified compliances and timings of actuation 1420*a-g* of respective exotendons 1320*a-g* are specified using an optimization process to maximize correspondence between the simulated joint torques 1411, 1413 and recorded joint torques, to simulated energy used by the force transducers 1330*a-c*, or according to some other cost function, combination of cost functions, or some other constraints and/or considerations. Recorded torque patterns could be from an individual, from a population of individuals, or from some other source (e.g., a pattern of torque determined from a model or simulation to be in some way optimal for crouched locomotion, jumping, running, or some other application of lower limbs of a human). Further, the parameters of the Endo-Herr model 1300 that is used to generate the levels and patterns of actuator activation 1400 could be specified based on a specific individual (e.g., the weight of the body segments 1310*a-d* could be related to a weight of an individual) and/or a specific physical implementation of elements of the Endo-Herr model 1300 (e.g., the compliances of the exotendons 1320*a-g* could be specified based on the compliances of corresponding exotendons of a flexible exosuit configured to mimic the configuration of elements of the Endo-Herr model 1300). The levels and patterns of actuator activation 1400 produced from a model having parameters specified for a specific individual and/or physical implementation of the Endo-Herr model 1300 could be used to operate elements of the specific physical implementation of the Endo-Herr model 1300 being used to apply forces and/or torques to the specific individual.

More complicated methods of control of the simulated elements of the Endo-Herr model 1300 to effect some simulated behavior or goal could be implemented. Controllers could include state machines, feedback loops, feed-forward controllers, look-up tables (LUTs), proportional-integral-derivative (PID) controllers, inverse kinematic models, state-space controllers, bang-bang controllers, linear-quadratic-Gaussian (LQG) controllers, other controllers and/or combinations of controllers. Parameters, topologies, or other aspects of configuration of a controller could be optimized (according to some constraint or cost function similar to the cost functions and constraint outlined above, or according to some other application) in simulation before being used to control a specific physical implementation of the Endo-Herr model 1300 being used to apply forces and/or torques to a specific individual and/or some other physical application. Parameters of the Endo-Herr model 1300 that is used to simulate the operation of a controller could be specified based on a specific individual and/or a specific physical implementation of elements of the Endo-Herr model 1300.

FIG. 15A illustrates a set of state machine controllers 1510, 1520, 1530 configured to operate simulated force transducers 1330*a-c* and exotendons 1320*a-g* of the Endo-Herr model 1300. Each of the state machine controllers 1510, 1520, 1530 changes state based on respective events in the locomotor cycle. Further, each of the state machine controllers 1510, 1520, 1530 is configured to operate elements of the Endo-Herr model 1300 of a respective joint; that is, 1510 controls elements 1330*a*, 1320*d* related to the ankle 1315*a*, 1520 controls elements 1320*b*, 1320*c*, 1320*e*, 1320*f*, 1320*g* related to the knee 1315*b*, and 1530 controls elements 1330*b*, 1330*c* related to the hip 1315*c*. Further, a number of dynamical controllers (not shown) can be activated by the state machine controllers 1510, 1520, 1530 to control the amplitude of forces generated by the force transducers 1330*a-c*. Further, the exotendons 1320*b-g* are configured to clutch during specified transitions of respective state machine controllers 1510, 1520, 1530 and to un-clutch when the force transmitted by respective exotendons 1320*b-g* becomes substantially zero subsequent to clutching.

The ankle state machine controller 1510 has first 1511, second 1513, and third 1515 states. The ankle state machine controller 1510 transitions from the third 1515 to the first 1511 states when the foot 1310*a* first makes contact with the ground (also known as heel strike); this transition results in the clutching of exotendon 1520*d*. The ankle state machine controller 1510 transitions from the first 1511 to the second 1513 states when the foot 1310*a* first becomes flat on the ground the ground; this transition results in the ankle force transducer 1330*a* being controlled by a force-feedback controller configured to actuate the ankle force transducer 1330*a* to generate forces such that the a ground reaction force between the foot 1310*a* and the ground is a set level. The first 1511 and second 1513 states could be considered analogous to the stance phase of human locomotion. The ankle state machine controller 1510 transitions from the second 1513 to the third 1515 states when the foot 1310*a* first leaves contact with the ground; this transition results in the ankle force transducer 1330*a* being controlled by a low-gain proportional-derivative (PD) controller configured to actuate the ankle force transducer 1330*a* to generate forces such the angle of the ankle joint 1315*a* is a set level. The set level could be specified such that the foot 1310*a* made contact with the ground heel-first. The third state 1515 could be considered analogous to the swing phase of human locomotion.

The hip state machine controller 1530 has first 1531 and second 1533 states. The hip state machine controller 1510 transitions from the second 1533 to the first 1531 states when the foot 1310*a* first makes contact with the ground (also known as heel strike); this transition results in the hip force transducers 1330*b*, 1330*c* being controlled by a first PD controller configured to actuate the hip force transducers 1330*b*, 1330*c* to generate forces such the angle of the hip joint 1315*c* is a set level. The set level could be specified such that elements of the Endo-Herr model 1300 leg swung forward enough during each simulated locomotor cycle to enable forward movement. The hip state machine controller 1510 transitions from the first 1531 to the second 1533 states when the knee 1315*b* reaches maximum extension during the swing phase (i.e., when the ankle state machine controller 1510 occupies the third state 1515); this transition results in the hip force transducers 1330*b*, 1330*c* being controlled by a second PD controller configured to actuate the hip force transducers 1330*b*, 1330*c* to generate forces such the angle between the torso and pelvis 1310*d* segment and gravity is a set level. The set level could be specified such that elements of the Endo-Herr model 1300 are stable (i.e., such that the elements do not fall over).

The knee state machine controller 1520 has first 1521, second 1523, third 1525, and fourth 1527 states. The knee state machine controller 1520 transitions from the fourth 1527 to the first 1521 states when the knee 1315*b* reaches maximum flexion during the stance phase (i.e., when the ankle state machine controller 1510 occupies either the first 1511 or second 1513 states); this transition results in the clutching of exotendon 1520*e*. The knee state machine controller 1520 transitions from the first 1521 to the second 1523 states when the foot 1310*a* first leaves contact with the ground; this transition results in the clutching of exotendon 1520*b*. The knee state machine controller 1520 transitions from the second 1523 to the third 1525 states when the knee 1315*b* angle equals 48 degrees following maximum knee 1315*b* flexion during the swing phase (i.e., when the ankle state machine controller 1510 occupies the third state 1515); this transition results in the clutching of exotendons 1520*f* and 1520*g*. The knee state machine controller 1520 transitions from the third 1525 to the fourth 1527 states when the knee 1315*b* reaches maximum extension during the swing phase (i.e., when the ankle state machine controller 1510 occupies the third state 1515); this transition results in the clutching of exotendon 1520*c*.

FIG. 15B illustrates the time course of state machine controller states 1551, 1553, 1555 (first 1510, second 1520, and third 1530 state machine controllers, respectively), simulated joint angles 1561*b*, 1563*b*, 1565*b* (ankle 1315*a*, knee 1315*b*, and hip 1315*c*, respectively), and simulated joint torques 1571*b*, 1573*b*, 1575*b* (ankle 1315*a*, knee 1315*b*, and hip 1315*c*, respectively), over a normalized locomotor cycle resulting from operating the elements of the Endo-Herr model 1300 using the state machine controllers 1510, 1520, 1530 as described above. Additionally, joint angles 1561*a*,

1563a, 1565a (ankle 1315a, knee 1315b, and hip 1315c, respectively) and joint torques 1571a, 1573a, 1575a (ankle 1315a, knee 1315b, and hip 1315c, respectively) are shown in FIG. 15B to show that the state machine controllers 1510, 1520, 1530 can operate the elements of the Endo-Herr model 1300 in a biofidelic manner; i.e., similarly to the patterns with which a human uses muscles to effect locomotion.

The Endo-Herr model 1300 could be implemented as part of a larger model. FIG. 13B illustrates a combined model 1350 that includes elements corresponding to elements of the Endo-Herr model 1300 (elements 1312a-d, 1317a-c, 1322a-g, 1327, 1332a-c, corresponding respectively to elements 1310a-d, 1315a-c, 1320a-g, 1325, 1330a-c). Rigid elements corresponding to the foot, tibia, femur, and torso and pelvis (1312a, 1312b, 1312c, and 1312d, respectively) have geometrical extents and other properties in addition to the properties of the corresponding elements (1310a, 1310b, 1310c, and 1310d) of the Endo-Herr model 1300. The geometrical extents and relative positions of the rigid elements 1312a, 1312b, 1312c, 1312d could be based on anatomical data from an individual human, an anatomical database, a description of an idealized 'mean' human skeleton, or some other source. Properties of the force transducers 1332a, 1332b, 1332c, exotendons 1322a, 1322b, 1322c, 1322d, 1322e, 1322f, 1322g, and spring 1325 could be chosen to represent elements of a prosthetic, a flexible exosuit, available artificial transducers, or according to some other constraint or application.

The combined model 1350 additionally includes simulated muscles 1352. The locations, origins, insertions, actions, biomechanical properties, slack lengths, force-velocity curves, and other properties of the simulated muscles 1352 could be based on physiological and anatomical data from an individual human, a database of physiological and/or anatomical data from a plurality of humans, a statistical value calculated from a database of physiological and/or anatomical data from a plurality of humans, or some other source.

The combined model 1350 could be used to model a wearer of a flexible exosuit or some other assistive device during locomotion or other tasks. The activation of the simulated muscles 1352, movement of the rigid elements 1312a, 1312b, 1312c, 1312d, and other aspects of such simulations could be defined by data collected from individual users. Additionally or alternatively, the activation of the simulated muscles 1352, movement of the rigid elements 1312a, 1312b, 1312c, 1312d, and other aspects of such simulations could be based on ongoing properties of such simulations; for example, simulated muscle 1352 activations could be generated by a simulated nervous system or other controller based on the state of the combined model 1352 and/or the locations of the rigid elements 1312a, 1312b, 1312c, 1312d could be based on kinematics, torques or other outputs of the combined model 1352. Simulations using the combined model 1350 could include the presence of simulated loads rigidly or otherwise attached to the simulated torso and pelvis 1312d.

The combined model 1350 could be used to develop control algorithms for flexible exosuits, prosthetics, assistive devices, or other applications of or devices relating to the human leg. For example, the model 1350 could be used to test and/or train a controller for a device configured to reflect the configuration of non-anatomical elements in the model 1350 (e.g., a flexible exosuit). That is, gains, timings, topologies, or other aspects of a controller could be optimized, trained, validated, or otherwise specified based on simulations performed using the combined model 1350 model. The combined model 1350 could be used to train a controller to activate elements of the device to assist a non-simulated leg of a wearer of the device to perform some activity, e.g., locomotion, jumping, and/or to perform sort activity in a manner that is more optimal in some way, e.g., more efficiently. Additionally or alternatively, the combined model 1350 could be used to train a controller to activate elements of the device to prevent injury of a non-simulated leg of a wearer of the device while allowing the wearer to use the leg relatively unimpeded. Other uses and applications of the combined model 1350 are anticipated.

XI. Configurations of Actuators in Flexible Exosuits

A flexible exosuit may be configured in a variety of ways according to a variety of applications. Indeed, it is this versatility in the choice of elements and software that establishes the exosuit as a human augmentation platform for the variety of applications. Further, a flexible exosuit may be configured according to an overall topology (e.g., having a twisted string actuator configured to apply a flexor torque to a knee of a wearer and an exotendon configured to apply an extensor torque to an ankle of a wearer) and additionally have specific parameters or measurements specified according to an individual wearer and/or be configured to have one or more parameters or measurements adjustable to accommodate an individual wearer. A flexible exosuit may be configured to apply forces to the lower body, upper body, torso, or combinations of some or all of these parts of a wearer. A flexible exosuit could be symmetric (able to apply the same types of forces and torques to one side of a wearer's body as to the opposite side) or could be asymmetric (e.g., to enable strength assists and/or rehabilitation to a wearer that has experienced an injury to one limb and not to the opposite limb). Different overall topologies of configuration of flexible exosuits may correspond to and/or be specified by respective applications of flexible exosuits.

FIGS. 16A, 16B, and 16C show side, front, and back views, respectively, of a schematic illustrating actuators of a flexible exosuit 1600 being worn by a wearer 1605 on the wearer's 1605 torso and lower limbs. The ankle 1615a, Knee 1615b, and hip 1615c of the wearer 1605 are illustrated to indicate which joints of the wearer 1605 are crossed by individual actuators 1620a-g, 1630a-c of the flexible exosuit 1600. The flexible exosuit includes flexible linear actuators 1630a, 1630b, 1630c (e.g., twisted string actuators (TSAs)) configured to apply extensor torque to the ankle 1615a, extensor torque to the hip 1615c, and flexor torque to the hip 1615c, respectively. The flexible exosuit 1600 additionally includes clutched-compliance elements 1620a, 1620b, 1620c, 1620d, 1620e, 1620f, 1620g (e.g., exotendons) configured to apply a flexor force to the lower torso/lower back of the wearer 1605, flexor torque to the hip 1615c and extensor torque to the knee 1615b, extensor torque to the knee 1615b, flexor torque to the ankle 1615a, flexor torque to the knee 1615b and extensor torque to the ankle 1615a, flexor torque to the knee 1615b, and extensor torque to the hip 1615c and flexor torque to the knee 1615b, respectively. The clutched-compliance elements could be configured to enable switching between different levels of compliance and/or to enable the storage and later release of mechanical energy.

The flexible exosuit 1600 could include other elements and actuators (not shown). The flexible exosuit 1600 could include sensors to detect one or more properties of the flexible exosuit 1600, the wearer 1605, and/or the environment of the flexible exosuit 1600. The sensors could be discrete, or could be incorporated into assemblies with or integrated as part of the actuators 1620a-g, 1630a-c. The sensors could include accelerometers, gyroscopes, strain gauges, load cells, encoders, displacement sensors, capacitive sensors, biosensors, thermometers, or others types of sensors. The flexible exosuit 1600 could include feedback elements, including haptic feedback elements that could be operated to indicate information to the wearer 1605. Additionally or alternatively, the actuators 1620*a-g*, 1630*a-c* could be operated to indicate haptic information to the wearer 1605. The flexible exosuit could additionally include controllers, batteries, engines, fuel cells, communications devices, user interfaces, or other elements as described herein or as are familiar to one of skill in the art to enable functions and applications of the flexible exosuit 1600.

Note that a flexible exosuit need not be capable of independent actuation of each joint or degree of freedom of a wearer's body that is covered by the flexible exosuit. That is, the flexible exosuit could be under-actuated, and the degrees of freedom of the wearer's body that are actuated could be specified according to an application of the flexible exosuit. For example, the flexible exosuit 1600 illustrated in FIGS. 16A-C is underactuated, i.e., the flexible exosuit 1600 is unable to independently actuate (e.g., apply independent torques to using tension-generating actuators 1630*a*, 1630*b*, 1630*c*) all of the joints 1615*a*, 1615*b*, 1615*c* of the wearer's 1605 lower limb. The configuration of actuators in the flexible exosuit 1600 is related to the pattern of simulated actuators in the Endo-Herr reduced model of efficient bipedal locomotion.

The flexible exosuit 1600 is sufficiently actuated to enable various applications and uses of the flexible exosuit 1600. The flexible exosuit could be operated to prevent the development of fatigue during extended locomotion by the wearer by extracting, storing, and/or injecting energy to/from the legs of the wearer 1605. The flexible exosuit 1600 could be operated to increase the maximum load carried by the wearer 1605 by adding extensor torques to the joints of the legs of the wearer 1605 and/or by operating the clutched-compliance elements 1620*a-g* to modulate the effective impedance of the joints 1615*a-c* of the wearer 1615 to reduce the development of fatigue. The flexible exosuit 1600 could be operated to prevent injury of the wearer 1605, for example, by increasing the effective joint impedance and/or limiting the range of motion of a joint that was about to experience an injury-inducing amount of torque, force, and/or angular displacement.

FIG. 17 shows a schematic illustrating actuators of a flexible exosuit 1700 being worn by a wearer 1705 on the wearer's 1705 torso and upper limbs. The shoulder 1715*a*, elbow 1715*b*, and wrist 1715*c* of the wearer 1705 are illustrated to indicate which joints of the wearer 1705 are crossed by individual actuators 1720*a-b*, 1730 of the flexible exosuit 1700. The flexible exosuit includes a flexible linear actuator 1730 (e.g., a twisted string actuator (TSA)) configured to apply extensor torque to upper torso of the wearer 1705. The flexible exosuit 1700 additionally includes clutched-compliance elements 1720*a*, 1720*b* (e.g., exotendons) configured to transmit a supportive force to a load held in the hand of the wearer 1705 to the shoulder and/or upper torso of the wearer 1705. The clutched-compliance elements could be configured to enable switching between different levels of compliance and/or to enable the storage and later release of mechanical energy.

The flexible exosuit 1700 could be operated to assist the wearer 1705 in carrying heavy loads and/or reducing the development of fatigue in the arms of the wearer while carrying a load for a prolonged period of time. For example, the clutched-compliance elements 1720*a*, 1720*b* could be deactivated (i.e., substantially slack, high-compliance, and non-interfering with motions of the wearer 1705) when the wearer 1705 is not carrying a load. When the wearer 1705 is carrying a load, the clutched-compliance elements 1720*a*, 1720*b* could be activated such that the clutched-compliance elements 1720*a*, 1720*b* are substantially non-compliant, such that the force necessary to carry the load is transferred between the wearer's upper torso by the flexible exosuit 1700 instead of by the muscles and other active, metabolic-energy-consuming, fatigue-able elements of the wearer's 1705 arm. The flexible exosuit 1700 could additionally or alternatively be operated to enable other functions; for example, the actuators 1720*a-b*, 1730 could be operated to effect a specified posture of the arm of the wearer 1705, e.g., to effect greater accuracy of operation of a weapon. In another example, the flexible exosuit 1700 could be operated to assists the wearer 1705 in climbing, e.g., by assisting the wearer 1705 by using the tension-generating actuator 1730.

The illustration of elements of a flexible exosuit in FIGS. 16A-B and FIG. 17 are intended as examples. A flexible exosuit could include actuators in a similar or different arrangement according to an application. In some examples, elements of a flexible exosuit could allow the arms and legs of the body of a wearer to be controllably mechanically coupled. For example, exotendons could be disposed in an exosuit to couple motions of the arms of a wearer to motions of the legs of a wearer. This configuration could enable a wearer to use the wearer's arms to assists the wearer's legs in walking, running, sprinting, climbing, or some other activity. Other alternate configurations and applications of a flexible exosuit are anticipated. Additionally, illustrated twisted string actuators and exotendons are meant as illustrative examples of actuators. Additionally or alternatively, twisted string actuators, exotendons, EPAMs, STEMs, motor-and-drum-driven cables, servos, pneumatic or hydraulic pistons, racks and pinions, motorized screw drives or ball screws, or other actuators could be used in place of the illustrated twisted string actuators or exotendons according to an application.

XII. Methods for Controlling and Applications of an Exosuit

A flexible exosuit or similar mechatronic system could be operated by electronic controllers disposed on or within the flexible exosuit or in wireless or wired communication with the flexible exosuit. The electronic controllers could be configured in a variety of ways to operate the flexible exosuit and to enable functions of the flexible exosuit. The electronic controllers could access and execute computer-readable programs that are stored in elements of the exosuit or in other systems that are in direct or indirect communications with the flexible exosuit. The computer-readable programs could describe methods for operating the flexible exosuit or could describe other operations relating to a flexible exosuit or to a wearer of a flexible exosuit.

Figure 18:
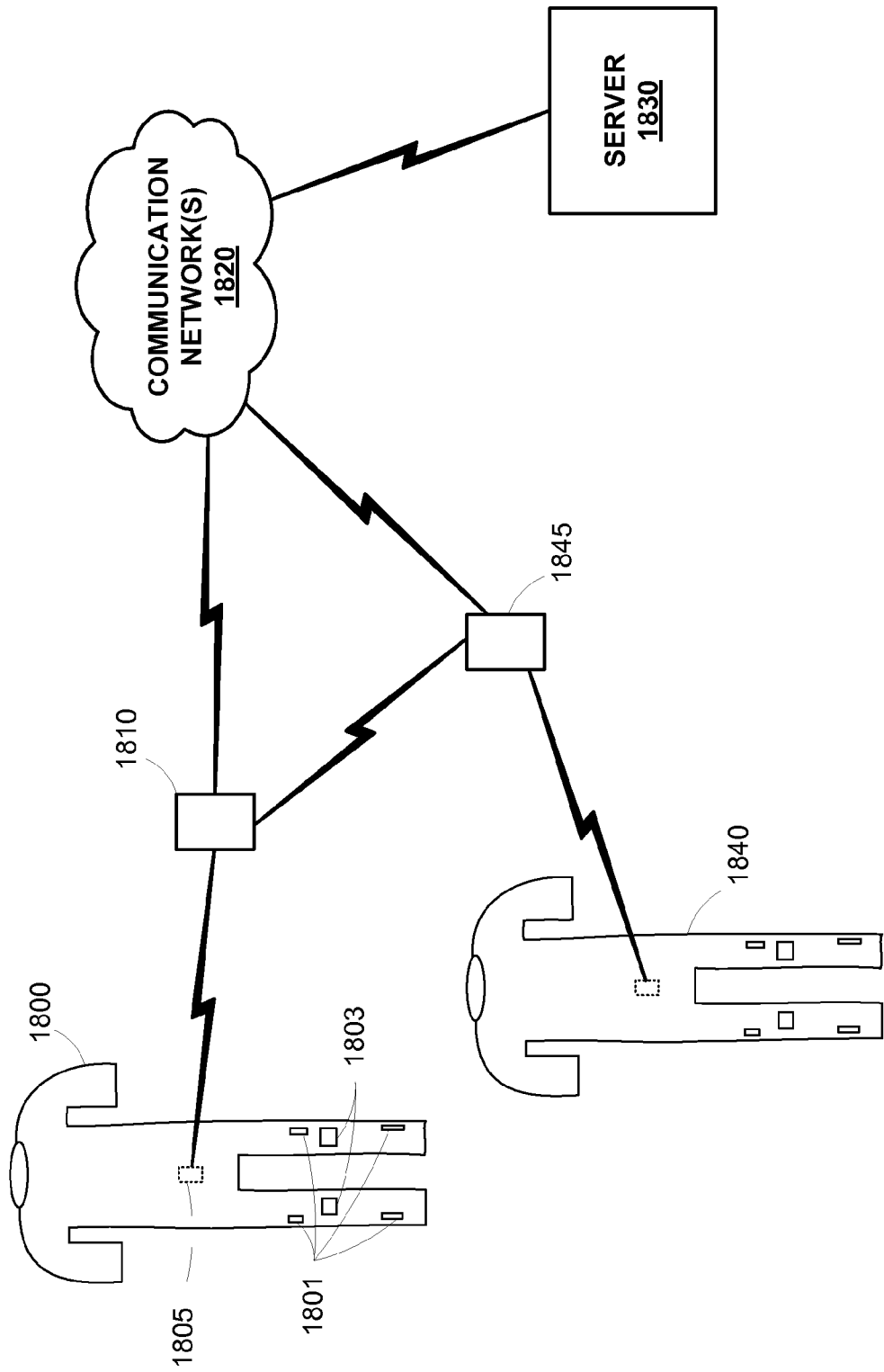
FIG. 18 illustrates a flexible exosuit and system configured to communicate with the flexible exosuit.

FIG. 18 illustrates an example flexible exosuit 1800 that includes actuators 1801, sensors 1803, and a controller configured to operate elements of the flexible exosuit 1800 (e.g., 1801, 1803) to enable functions of the flexible exosuit 1800. The controller 1805 is configured to communicate wirelessly with a user interface 1810. The user interface 1810 is configured to present information to a user (e.g., a wearer of the flexible exosuit 1800) and to the controller 1805 of the flexible exosuit or to other systems. The user interface 1810 could be involved in controlling and/or accessing information from elements of the flexible exosuit 1800 (e.g., 101, 1803). For example, an application being executed by the user interface 1810 could access data from the sensors 1803, calculate an operation (e.g., to apply a torque of 50 newton-meters to the knee of a wearer for 200 milliseconds) of the actuators 1801, and transmit the calculated operation to the flexible exosuit 100. The user interface 1810 could additionally be configured to enable other functions; for example, the user interface 1810 could be configured to be used as a cellular telephone, a portable computer, an entertainment device, or to operate according to other applications.

The user interface 1810 could be configured to be removably mounted to the flexible exosuit 1800 (e.g., by straps, magnets, Velcro, charging and/or data cables). Alternatively, the user interface 1810 could be configured as a part of the flexible exosuit 1800 and not to be removed during normal operation. In some examples, a user interface could be incorporated as part of the flexible exosuit 1800 (e.g., a touchscreen integrated into a sleeve of the flexible exosuit 1800) and could be used to control and/or access information about the flexible exosuit 1800 in addition to using the user interface 1810 to control and/or access information about the flexible exosuit 1800. In some examples, the controller 1805 or other elements of the flexible exosuit 1800 are configured to enable wireless or wired communication according to a standard protocol (e.g., Bluetooth, ZigBee, WiFi, LTE or other cellular standards, IRdA, Ethernet) such that a variety of systems and devices could be made to operate as the user interface 1810 when configured with complementary communications elements and computer-readable programs to enable such functionality.

The flexible exosuit 1800 could be configured as described in example embodiments herein or in other ways according to an application. The flexible exosuit 1800 could be operated to enable a variety of applications. The flexible exosuit 1800 could be operated to enhance the strength of a wearer by detecting motions of the wearer (e.g., using sensors 1803) and responsively applying torques and/or forces to the body of the wearer (e.g., using actuators 1801) to increase the forces the wearer is able to apply to his/her body and/or environment. This could include enabling a wearer to lift heavier objects or to jump higher than the wearer would be able to when not wearing the flexible exosuit 1800. This could include allowing a wearer to walk or run while carrying a load or while unencumbered farther than the wearer would be able to when not wearing the flexible exosuit 1800 by providing some fraction of the ground reaction forces or other forces and/or torques that the wearer generates while locomoting. Further, elements of the flexible exosuit 1800 could be operated to reduce and/or meter fatigue of the wearer by supplementing the forces and/or torques that the wearer generates with a specified fraction of the forces and/or torques by suing the actuators 1801. The specified fraction could be constant, could be related to a detected fatigue state of the wearer (e.g., detected using the sensors 1803), or could be based on some other consideration.

The flexible exosuit 1800 could be operated to avoid and/or reduce injuries experienced by a wearer. In some examples, reducing the fatigue experienced by a wearer (by operating the suit as described herein to supplement forces generated by the wearer to perform tasks, or according to other applications) can reduce the probability that the wearer experiences joint damage, sprains, strains, or other injuries. The actuators 1801 (e.g., exotendons) could be operated to increase the effective impedance of a wearer's joints to reduce the forces and/or torques experienced by the joints during a fall or other injury-inducing event. Additionally or alternatively, actuators 1801 of the flexible exosuit 1800 could be operated to ensure that joints of the wearer were able to move freely in certain directions but not in other directions likely to result in injury (e.g., an ankle could be able to move freely to dorsiflex and/or plantarflex, but not to rotate in directions other than the dorsiflexion/plantarflexion direction (e.g., adduction/abduction)), or to ensure that the rate and/or extent of joint motion does not exceed some safety threshold.

The flexible exosuit 1800 could be operated to avoid and/or reduce injuries experienced by a wearer by operating actuators 1801 continuously (e.g., by continuously operating actuators to reduce the effective impedance of a joint of the wearer) or could operate the actuators 1803 in response to a detected condition (e.g., by the sensors 1803). For example, the sensors 1803 could detect that a rate of joint movement was above a threshold, and the actuators 1801 could be responsively operated to increase the effective impedance of the joint. In some examples, the flexible exosuit 1800 could operate the actuators 1803 to avoid and/or reduce the occurrence of injuries in response to the presence of unstable or otherwise dangerous terrain or other dangerous environmental conditions. For example, the flexible exosuit 1800 could include LIDAR, radar, ultrasonic rangefinders, or other sensors configured to detect that terrain in front of a wearer is uneven. Additionally or alternatively, the flexible exosuit 1800 could receive information from the server 1830 about the terrain in front of the wearer. The flexible exosuit 1800 could then be operated to avoid and/or reduce the occurrence of injuries to the wearer in response to information indicating that the terrain was uneven.

The flexible exosuit 1800 could be operated to train a wearer to perform certain physical activities. For example, the flexible exosuit 1800 could be operated to enable rehabilitative therapy of a wearer. The flexible exosuit 1800 could operate to amplify motions and/or forces produced by a wearer undergoing therapy in order to enable the wearer to successfully complete a program of rehabilitative therapy. Additionally or alternatively, the flexible exosuit 1800 could be operated to prohibit disordered movements of the wearer and/or to use the actuators 1801 and/or other elements (e.g., haptic feedback elements) to indicate to the wearer a motion or action to perform and/or motions or actions that should not be performed or that should be terminated. Similarly, other programs of physical training (e.g., dancing, skating, other athletic activities, vocational training) could be enabled by operation of the flexible exosuit 1800 to detect motions, torques, or forces generated by a wearer and/or to apply forces, torques, or other haptic feedback to the wearer. Other applications of the flexible exosuit 1800 and/or user interface 1810 are anticipated.

The flexible exosuit 1800 could be operated to perform any of the described functions (e.g., training, injury prevention, fatigue reduction) while the wearer performs a variety of tasks. In some examples, the flexible exosuit 1800 could be worn by a wearer engaged in athletic activities. The flexible exosuit 1800 could be worn by a wearer engaging in cycling; the flexible exosuit 1800 could be operated to train the wearer to use a more effective stroke, to help the wearer to engage in more effective pacing, or some other application. The flexible exosuit 1800 could be worn by a wearer who was walking, running, or otherwise locomoting and the flexible exosuit 1800 could be operated to increase the efficiency of the wearer's locomotion. In some examples, the wearer could be walking in an environment that was unfamiliar to the wearer and/or that includes some hazards, and the flexible exosuit 1800 could be operated to train the wearer to walk in a manner that minimized a chance of injury, maximized an efficient, speed, or other constraint, to protect the wearer from injury, or according to some other application. For example, the wearer could be using snow shoes to walk across snowy terrain, and the flexible exosuit 1800 could be operated to train the wearer in an efficient gait for locomoting across the snowy terrain and/or could apply forces and/or torques to the wearer to assist the wearer in locomoting. In some examples, the flexible exosuit 1800 could act as a 'golf coach,' by guiding the movements of a wearer (using e.g., haptic feedback elements, exotendons, TSAs) to teach the wearer to perform a golf stroke having an optimal trajectory, timing, or other properties. The wearer could perform the movements to perform the golf stroke repeatedly, and could learn proper technique from the guidance of the flexible exosuit 1800.

The flexible exosuit 1800 could be operated to make it more difficult for the wearer to perform a task (e.g., a task that may be harmful to the wearer). That is, the flexible exosuit 1800 could be operated to apply forces and/or torques to the body of the wearer such that the wearer had to exert more effort to perform a task (e.g., walking, running, climbing) than the wearer would have to exert if the flexible exosuit 1800 was not being operated in that way. This operation of the flexible exosuit 1800 could enable more effective strength and/or cardiovascular training. In some examples, the flexible exosuit 1800 could be operated to act as a 'virtual gym', allowing the wearer to perform exercises against forces and/or torques generated by the flexible exosuit 1800 as though the wearer was interacting with exercise equipment (e.g., a treadmill, an elliptical machine). For example, the flexible exosuit 1800 could be operated to apply forces to the arms of the wearer, to simulate the presence of free weights being used by the wearer. Further, the flexible exosuit 1800 could be operated to enable exercise regimens that would be expensive or impossible to implement using standalone gym equipment. In some examples, the flexible exosuit 1800 could be operated to apply forces and/or torques to the body of the wearer to simulate other environments. For example, the forces and/or torques could simulate for the wearer the experience of performing underwater (or in some other fluid, by simulated the increased drag the wearer would experience underwater), in a heavy wind (e.g., assisting motions of the wearer in the direction of the simulated wind, and hindering motions in the opposite direction), performing in a different gravity field (e.g., on the moon, on a world with higher gravity than the earth), or other environments.

The user interface 1810 can additionally communicate with communications network(s) 1820. For example, the user interface 1810 could include a WiFi radio, an LTE transceiver or other cellular communications equipment, a wired modem, or some other elements to enable the user interface 1810 and flexible exosuit 1800 to communicate with the Internet. The user interface 1810 could communicate through the communications network 1820 with a server 1830. Communication with the server 1830 could enable functions of the user interface 1810 and wearable exosuit 1800. In some examples, the user interface 1810 could upload telemetry data (e.g., location, configuration of elements 1801, 1803 of the flexible exosuit 1800, physiological data about a wearer of the flexible exosuit 1800) to the server 1830.

In some examples, the server 1830 could be configured to control and/or access information from elements of the flexible exosuit 1800 (e.g., 1801, 1803) to enable some application of the flexible exosuit 1800. For example, the server 1830 could operate elements of the flexible exosuit 1800 to move a wearer out of a dangerous situation if the wearer was injured, unconscious, or otherwise unable to move themselves and/or operate the exosuit 1800 and user interface 1810 to move themselves out of the dangerous situation. Other applications of a server in communications with a flexible exosuit are anticipated.

The user interface 1810 could be configured to communicate with a second user interface 1845 in communication with and configured to operate a second flexible exosuit 1840. Such communication could be direct (e.g., using radio transceivers or other elements to transmit and receive information over a direct wireless or wired link between the user interface 1810 and the second user interface 1845). Additionally or alternatively, communication between the user interface 1810 and the second user interface 1845 could be facilitated by communications network(s) 1820 and/or a server 1830 configured to communicate with the user interface 1810 and the second user interface 1845 through the communications network(s) 1820.

Communication between the user interface 1810 and the second user interface 1845 could enable applications of the flexible exosuit 1800 and second flexible exosuit 1840. In some examples, actions of the flexible exosuit 1800 and second flexible exosuit 1840 and/or of wearers of the flexible exosuit 1800 and second flexible exosuit 1840 could be coordinated. For example, the flexible exosuit 1800 and second flexible exosuit 1840 could be operated to coordinate the lifting of a heavy object by the wearers. The timing of the lift, and the degree of support provided by each of the wearers and/or the flexible exosuit 1800 and second flexible exosuit 1840 could be controlled to increase the stability with which the heavy object was carried, to reduce the risk of injury of the wearers, or according to some other consideration. Coordination of actions of the flexible exosuit 1800 and second flexible exosuit 1840 and/or of wearers thereof could include applying coordinated (in time, amplitude, or other properties) forces and/or torques to the wearers and/or elements of the environment of the wearers and/or applying haptic feedback (though actuators of the exosuits 1800, 1840, through dedicated haptic feedback elements, or through other methods) to the wearers to guide the wearers toward acting in a coordinated manner.

Coordinated operation of the flexible exosuit 1800 and second flexible exosuit 1840 could be implemented in a variety of ways. In some examples, one flexible exosuit (and the wearer thereof) could act as a master, providing commands or other information to the other flexible exosuit such that operations of the exosuits 1800, 1840 are coordinated. For example, the exosuits 1800, 1840 could be operated to enable the wearers to dance (or to engage in some other athletic activity) in a coordinated manner. One of the flexible exosuits could act as the 'lead', transmitting timing or other information about the actions performed by the 'lead' wearer to the other flexible exosuit, enabling coordinated dancing motions to be executed by the other wearer. In some examples, a first wearer of a first exosuit could act as a trainer, modeling motions or other physical activities that a second wearer of a second exosuit could learn to perform. The first exosuit could detect motions, torques, forces, or other physical activities executed by the first wearer and could send information related to the detected activities to the second exosuit. The second exosuit could then apply forces, torques, haptic feedback, or other information to the body of the second wearer to enable the second wearer to learn the motions or other physical activities modeled by the first wearer. In some examples, the server 1830 could send commands or other information to the exosuits 1800, 1840 to enable coordinated operation of the exosuits 1800, 1840.

Note that more than the two illustrated flexible exosuits 1800, 1840 can be operated in a coordinated manner. In some examples, many flexible exosuits or other mechatronic or other systems could be operated in a coordinated manner to enable some application. For example, a troupe of ballet dancers, a team of football players, a team of synchronized skaters, a marching band, a mime troupe, or some other groups of athletes or performers could be wearing flexible exosuits configured to coordinate their motions in time. In some examples, a first wearer of a first exosuit could act as a trainer or coach, modeling motions or other physical activities that many wearers of respective flexible exosuits could learn to perform. The first exosuit could detect motions, torques, forces, or other physical activities executed by the first wearer and could send information related to the detected activities to the many other flexible exosuits. The many other exosuits could then apply forces, torques, haptic feedback, or other information to the bodies of respective wearers to enable the wearers to learn the motions or other physical activities modeled by the first wearer. In some examples, a server could send commands or other information to a plurality of exosuits to enable coordinated operation of the plurality of exosuits. Other applications including the coordinated operation of a plurality of flexible exosuits are anticipated.

The flexible exosuit 1800 could be operated to transmit and/or record information about the actions of a wearer, the environment of the wearer, or other information about a wearer of the flexible exosuit 1800. In some examples, kinematics related to motions and actions of the wearer could be recorded and/or sent to the server 1830. These data could be collected for medical, scientific, entertainment, social media, or other applications. The data could be used to operate a system. For example, the flexible exosuit 1800 could be configured to transmit motions, forces, and/or torques generated by a user to a robotic system (e.g., a robotic arm, leg, torso, humanoid body, or some other robotic system) and the robotic system could be configured to mimic the activity of the wearer and/or to map the activity of the wearer into motions, forces, or torques of elements of the robotic system. In another example, the data could be used to operate a virtual avatar of the wearer, such that the motions of the avatar mirrored or were somehow related to the motions of the wearer. The virtual avatar could be instantiated in a virtual environment, presented to an individual or system with which the wearer is communicating, or configured and operated according to some other application.

Conversely, the flexible exosuit 1800 could be operated to present haptic or other data to the wearer. In some examples, the actuators 1801 (e.g., twisted string actuators, exotendons) and/or haptic feedback elements (e.g., EPAM haptic elements) could be operated to apply and/or modulate forces applied to the body of the wearer to indicate mechanical or other information to the wearer. For example, the activation in a certain pattern of a haptic element of the flexible exosuit 1800 disposed in a certain location of the flexible exosuit 1800 could indicate that the wearer had received a call, email, or other communications. In another example, a robotic system could be operated using motions, forces, and/or torques generated by the wearer and transmitted to the robotic system by the flexible exosuit 1800. Forces, moments, and other aspects of the environment and operation of the robotic system could be transmitted to the flexible exosuit 1800 and presented (using actuators 1801 or other haptic feedback elements) to the wearer to enable the wearer to experience force-feedback or other haptic sensations related to the wearer's operation of the robotic system. In another example, haptic data presented to a wearer could be generated by a virtual environment, e.g., an environment containing an avatar of the wearer that is being operated based on motions or other data related to the wearer that is being detected by the flexible exosuit 1800.

Note that multiple functions, applications, or other operations of the flexible exosuit 1800 as described herein or according to other applications may be executed simultaneously. For example, a flexible exosuit could be operated to reduce fatigue of a wearer by supplementing the forces and/or torques generated by muscles of the wearer. Sensors in the exosuit or other systems (e.g., remote servers, drones) could provide an indication to the flexible exosuit, while the flexible exosuit is being operated to reduce wearer fatigue, that the ground in front of the wearer is unstable. The flexible exosuit could be responsively operated to increase the effective impedance of the ankles of the wearer to reduce the probability of the wearer experiencing an ankle sprain or strain due to locomoting on the unstable ground. Simultaneous operation could include linearly or nonlinearly summing actuator commands generated according to multiple applications (e.g., fatigue reduction and injury prevention), a first application blocking operation by a second application of certain actuators required by the first application during a period of time the first application is required to operate the certain actuators, or other schemes of operation of an exosuit according to multiple applications simultaneously.

Note that the flexible exosuit 1800 illustrated in FIG. 18 is only one example of a flexible exosuit that could be operated by control electronics, software, or algorithms described herein. Control electronics, software, or algorithms as described herein could be configured to control flexible exosuits or other mechatronic and/or robotic system having more, fewer, or different actuators, sensors or other elements. Further, control electronics, software, or algorithms as described herein could be configured to control flexible exosuits configured similarly to or differently from the illustrated flexible exosuit 1800. Further, control electronics, software, or algorithms as described herein could be configured to control flexible exosuits having reconfigurable hardware (i.e., exosuits that are able to have actuators, sensors, or other elements added or removed) and/or to detect a current hardware configuration of the flexible exosuits using a variety of methods.

Software Hierarchy for Control of a Flexible Exosuit

A controller of a flexible exosuit and/or computer-readable programs executed by the controller could be configured to provide encapsulation of functions and/or components of the flexible exosuit. That is, some elements of the controller (e.g., subroutines, drivers, services, daemons, functions) could be configured to operate specific elements of the flexible exosuit (e.g., a twisted string actuator, a haptic feedback element) and to allow other elements of the controller (e.g., other programs) to operate the specific elements and/or to provide abstracted access to the specific elements (e.g., to translate a command to orient an actuator in a commanded direction into a set of commands sufficient to orient the actuator in the commanded direction). This encapsulation could allow a variety of services, drivers, daemons, or other computer-readable programs to be developed for a variety of applications of a flexible exosuits. Further, by providing encapsulation of functions of a flexible exosuit in a generic, accessible manner (e.g., by specifying and implementing an application programming interface (API) or other interface standard), computer-readable programs can be created to interface with the generic, encapsulated functions such that the computer-readable programs could enable operating modes or functions for a variety of differently-configured flexible exosuits, rather than for a single type or model of flexible exosuit. For example, a virtual avatar communications program could access information about the posture of a wearer of a flexible exosuit by accessing a standard exosuit API. Differently-configured exosuits could include different sensors, actuators, and other elements, but could provide posture information in the same format according to the API. Other functions and features of a flexible exosuit, or other robotic, exoskeletal, assistive, haptic, or other mechatronic system, could be encapsulated by APIs or according to some other standardized computer access and control interface scheme.

Figure 19:
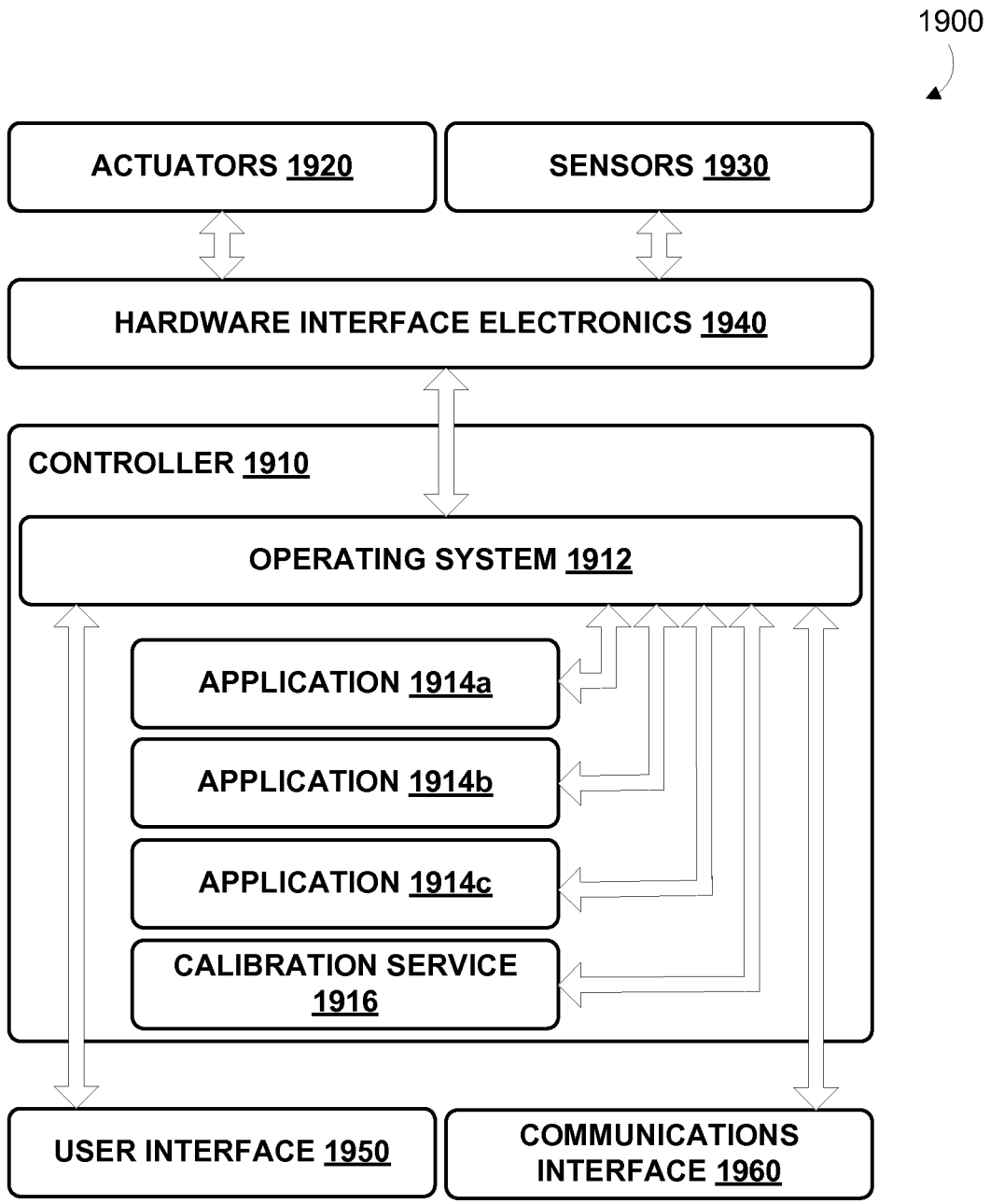
FIG. 19 illustrates a schematic of a control scheme for a flexible exosuit.

FIG. 19 is a schematic illustrating elements of a flexible exosuit 1900 and a hierarchy of control or operating the flexible exosuit 1900. The flexible exosuit includes actuators 1920 and sensors 1930 configured to apply forces and/or torques to and detect one or more properties of, respectively, the flexible exosuit 1900, a wearer of the flexible exosuit 1900, and/or the environment of the wearer. The flexible exosuit 1900 additionally includes a controller 1910 configured to operate the actuators 1920 and sensors 1930 by using hardware interface electronics 1940. The hardware electronics interface 1940 includes electronics configured to interface signals from and to the controller 1910 with signals used to operate the actuators 1920 and sensors 1930. For example, the actuators 1920 could include exotendons, and the hardware interface electronics 1940 could include high-voltage generators, high-voltage switches, and high-voltage capacitance meters to clutch and un-clutch the exotendons and to report the length of the exotendons. The hardware interface electronics 1940 could include voltage regulators, high voltage generators, amplifiers, current detectors, encoders, magnetometers, switches, controlled-current sources, DACs, ADCs, feedback controllers, brushless motor controllers, or other electronic and mechatronic elements.

The controller 1910 additionally operates a user interface 1950 that is configured to present information to a user and/or wearer of the flexible exosuit 1900 and a communications interface 1960 that is configured to facilitate the transfer of information between the controller 1910 and some other system (e.g., by transmitting a wireless signal). Additionally or alternatively, the user interface 1950 could be part of a separate system that is configured to transmit and receive user interface information to/from the controller 1910 using the communications interface 1960 (e.g., the user interface 1950 could be part of a cellphone).

The controller 1910 is configured to execute computer-readable programs describing functions of the flexible exosuit 1912. Among the computer-readable programs executed by the controller 1910 are an operating system 1912, applications 1914a, 1914b, 1914c, and a calibration service 1916. The operating system 1912 manages hardware resources of the controller 1910 (e.g., I/O ports, registers, timers, interrupts, peripherals, memory management units, serial and/or parallel communications units) and, by extension, manages the hardware resources of the flexible exosuit 1900. The operating system 1912 is the only computer-readable program executed by the controller 1910 that has direct access to the hardware interface electronics 1940 and, by extension, the actuators 1920 and sensors 1930 of the flexible exosuit 1900.

The applications 1914a, 1914b, 1914 are computer-readable programs that describe some function, functions, operating mode, or operating modes of the flexible exosuit 1900. For example, application 1914a could describe a process for transmitting information about the wearer's posture to update a virtual avatar of the wearer that includes accessing information on a wearer's posture from the operating system 1912, maintaining communications with a remote system using the communications interface 1960, formatting the posture information, and sending the posture information to the remote system. The calibration service 1916 is a computer-readable program describing processes to store parameters describing properties of wearers, actuators 1920, and/or sensors 1930 of the flexible exosuit 1900, to update those parameters based on operation of the actuators 1920, and/or sensors 1930 when a wearer is using the flexible exosuit 1900, to make the parameters available to the operating system 1912 and/or applications 1914a, 1914b, 1914c, and other functions relating to the parameters. Note that applications 1914a, 1914b, 1914 and calibration service 1916 are intended as examples of computer-readable programs that could be run by the operating system 1912 of the controller 1910 to enable functions or operating modes of a flexible exosuit 1900.

The operating system 1912 could provide for low-level control and maintenance of the hardware (e.g., 1920, 1930, 1940). In some examples, the operating system 1912 and/or hardware interface electronics 1940 could detect information about the flexible exosuit 1900, the wearer, and/or the wearer's environment from one or more sensors 1930 at a constant specified rate. The operating system 1912 could generate an estimate of one or more states or properties of the flexible exosuit 1900 or components thereof using the detected information. The operating system 1912 could update the generated estimate at the same rate as the constant specified rate or at a lower rate. The generated estimate could be generated from the detected information using a filter to remove noise, generate an estimate of an indirectly-detected property, or according to some other application. For example, the operating system 1912 could generate the estimate from the detected information using a Kalman filter to remove noise and to generate an estimate of a single directly or indirectly measured property of the flexible exosuit 1900, the wearer, and/or the wearer's environment using more than one sensor. In some examples, the operating system could determine information about the wearer and/or flexible exosuit 1900 based on detected information from multiple points in time. For example, the operating system 1900 could determine a gait phase (e.g., stance, swing, heel strike, toe-off) and/or gait phase percent while the wearer is locomoting based on detected joint angles, body segment locations, actuator loads, or other detected information from multiple past points in time.

In some examples, the operating system 1912 and/or hardware interface electronics 1940 could operate and/or provide services related to operation of the actuators 1920. That is, in case where operation of the actuators 1920 requires the generation of control signals over a period of time, knowledge about a state or states of the actuators 1920, or other considerations, the operating system 1912 and/or hardware interface electronics 1940 could translate simple commands to operate the actuators 1920 (e.g., a command to generate a specified level of force using a twisted string actuator (TSA) of the actuators 1920) into the complex and/or state-based commands to the hardware interface electronics 1940 and/or actuators 1920 necessary to effect the simple command (e.g., a sequence of currents applied to windings of a motor of a TSA, based on a starting position of a rotor determined and stored by the operating system 1910, a relative position of the motor detected using an encoder, and a force generated by the TSA detected using a load cell).

In some examples, the operating system 1912 could further encapsulate the operation of the flexible exosuit 1900 by translating a system-level simple command (e.g., a commanded level of torque applied to the knee of a wearer) into commands for multiple actuators, according to the configuration of the flexible exosuit 1900 (e.g., command signals sufficient to cause a TSA and exotendons that cross the knee of the wearer to apply forces to the body of the wearer such that the commanded level of torque is applied to the knee of the wearer). This encapsulation could enable the creation of general-purpose applications that can effect a function of an exosuit (e.g., allowing a wearer of the exosuit to jump higher) without being configured to operate a specific model or type of exosuit (e.g., by being configured to generate a simple ankle torque profile that the operating system 1912 and hardware interface electronics 1940 could translate into actuator commands sufficient to cause the actuators 1920 to apply the commanded torque profile to the ankle).

The operating system 1912 could act as a standard, multi-purpose platform to enable the use of a variety of flexible exosuits having a variety of different hardware configurations to enable a variety of mechatronic, biomedical, human interface, training, rehabilitative, communications, and other applications. The operating system 1912 could make sensors 1930, actuators 1920, or other elements or functions of the flexible exosuit 1900 available to remote systems in communication with the flexible exosuit 1900 (e.g., using the communications interface 1960) and/or a variety of applications, daemons, services, or other computer-readable programs being executed by operating system 1912. The operating system 1912 could make the actuators, sensors, or other elements or functions available in a standard way (e.g., through an API, communications protocol, or other programmatic interface) such that applications, daemons, services, or other computer-readable programs could be created to be installed on, executed by, and operated to enable functions or operating modes of a variety of flexible exosuits having a variety of different configurations. The API, communications protocol, or other programmatic interface made available by the operating system 1912 could encapsulate, translate, or otherwise abstract the operation of the flexible exosuit 1900 to enable the creation of such computer-readable programs that are able to operate to enable functions of a wide variety of differently-configured flexible exosuits.

Additionally or alternatively, the operating system 1912 could be configured to operate a modular flexible exosuit system (i.e., a flexible exosuit system wherein actuators, sensors, or other elements could be added or subtracted from a flexible exosuit to enable operating modes or functions of the flexible exosuit). In some examples, the operating system 1912 could determine the hardware configuration of the flexible exosuit 1900 dynamically and could adjust the operation of the flexible exosuit 1900 relative to the determined current hardware configuration of the flexible exosuit 1900. This operation could be performed in a way that was 'invisible' to computer-readable programs (e.g., 1914a, 1914b, 1914c) accessing the functionality of the flexible exosuit 1900 through a standardized programmatic interface presented by the operating system 1912. For example, the computer-readable program could indicate to the operating system 1912, through the standardized programmatic interface, that a specified level of torque was to be applied to an ankle of a wearer of the flexible exosuit 1900. The operating system 1912 could responsively determine a pattern of operation of the actuators 1920, based on the determined hardware configuration of the flexible exosuit 1900, sufficient to apply the specified level of torque to the ankle of the wearer.

In some examples, the operating system 1912 and/or hardware interface electronics 1940 could operate the actuators 1920 to ensure that the flexible exosuit 1900 does not operate to directly cause the wearer to be injured and/or elements of the flexible exosuit 1900 to be damaged. In some examples, this could include not operating the actuators 1920 to apply forces and/or torques to the body of the wearer that exceeded some maximum threshold. This could be implemented as a watchdog process or some other computer-readable program that could be configured (when executed by the controller 1910) to monitor the forces being applied by the actuators 1920 (e.g., by monitoring commands sent to the actuators 1920 and/or monitoring measurements of forces or other properties detected using the sensors 1930) and to disable and/or change the operation of the actuators 1920 to prevent injury of the wearer. Additionally or alternatively, the hardware interface electronics 1940 could be configured to include circuitry to prevent excessive forces and/or torques from being applied to the wearer (e.g., by channeling to a comparator the output of a load cell that is configured to measure the force generated by a TSA, and configuring the comparator to cut the power to the motor of the TSA when the force exceeded a specified level).

In some examples, operating the actuators 1920 to ensure that the flexible exosuit 1900 does not damage itself could include a watchdog process or circuitry configured to prevent over-current, over-load, over-rotation, or other conditions from occurring that could result in damage to elements of the flexible exosuit 1900. For example, the hardware interface electronics 1940 could include a metal oxide varistor, breaker, shunt diode, or other element configured to limit the voltage and/or current applied to a winding of a motor.

Note that the above functions described as being enabled by the operating system 1912 could additionally or alternatively be implemented by applications 1914a, 1914b, 1914c, services, drivers, daemons, or other computer-readable programs executed by the controller 1900. The applications, drivers, services, daemons, or other computer-readable programs could have special security privileges or other properties to facilitate their use to enable the above functions.

The operating system 1912 could encapsulate the functions of the hardware interface electronics 1940, actuators 1920, and sensors 1930 for use by other computer-readable programs (e.g., applications 1914a, 1914b, 1914c, calibration service 1916), by the user (through the user interface 1950), and/or by some other system (i.e., a system configured to communicate with the controller 1910 through the communications interface 1960). The encapsulation of functions of the flexible exosuit 1900 could take the form of application programming interfaces (APIs), i.e., sets of function calls and procedures that an application running on the controller 1910 could use to access the functionality of elements of the flexible exosuit 1900. In some examples, the operating system 1912 could make available a standard 'exosuit API' to applications being executed by the controller 1910. The 'exosuit API' could enable applications 1914a, 1914b, 1914c to access functions of the exosuit 1900 without requiring those applications 1914a, 1914b, 1914c to be configured to generate whatever complex, time-dependent signals are necessary to operate elements of the flexible exosuit 1900 (e.g., actuators 1920, sensors 1930).

The 'exosuit API' could allow applications 1914a, 1914b, 1914c to send simple commands to the operating system 1912 (e.g., 'begin storing mechanical energy from the ankle of the wearer when the foot of the wearer contacts the ground') in such that the operating system 1912 can interpret those commands and generate the command signals to the hardware interface electronics 1940 or other elements of the flexible exosuit 1900 that are sufficient to effect the simple commands generated by the applications 1914a, 1914b, 1914c (e.g., determining whether the foot of the wearer has contacted the ground based on information detected by the sensors 1930, responsively applying high voltage to an exotendon that crosses the user's ankle).

The 'exosuit API' could be an industry standard (e.g., an ISO standard), a proprietary standard, an open-source standard, or otherwise made available to individuals that could then produce applications for exosuits. The 'exosuit API' could allow applications, drivers, services, daemons, or other computer-readable programs to be created that are able to operate a variety of different types and configurations of exosuits by being configured to interface with the standard 'exosuit API' that is implemented by the variety of different types and configurations of exosuits. Additionally or alternatively, the 'exosuit API' could provide a standard encapsulation of individual exosuit-specific actuators (i.e., actuators that apply forces to specific body segments, where differently-configured exosuits may not include an actuator that applies forces to the same specific body segments) and could provide a standard interface for accessing information on the configuration of whatever flexible exosuit is providing the 'exosuit API'. An application or other program that accesses the 'exosuit API' could access data about the configuration of the flexible exosuit (e.g., locations and forces between body segments generated by actuators, specifications of actuators, locations and specifications of sensors) and could generate simple commands for individual actuators (e.g., generate a force of 30 newtons for 50 milliseconds) based on a model of the flexible exosuit generated by the application and based on the information on the accessed data about the configuration of the flexible exosuit. Additional or alternate functionality could be encapsulated by an 'exosuit API' according to an application.

Applications 1914a, 1914b, 1914c could individually enable all or parts of the functions and operating modes of a flexible exosuit described herein. For example, an application could enable haptic control of a robotic system by transmitting postures, forces, torques, and other information about the activity of a wearer of the flexible exosuit 1900 and by translating received forces and torques from the robotic system into haptic feedback applied to the wearer (i.e., forces and torques applied to the body of the wearer by actuators 1920 and/or haptic feedback elements). In another example, an application could enable a wearer to locomote more efficiently by submitting commands to and receiving data from the operating system 1912 (e.g., through an API) such that actuators 1920 of the flexible exosuit 1900 assist the movement of the user, extract negative work from phases of the wearer's locomotion and inject the stored work to other phases of the wearer's locomotion, or other methods of operating the flexible exosuit 1900. Applications could be installed on the controller 1910 and/or on a computer-readable storage medium included in the flexible exosuit 1900 by a variety of methods. Applications could be installed from a removable computer-readable storage medium or from a system in communication with the controller 1910 through the communications interface 1960. In some examples, the applications could be installed from a web site, a repository of compiled or un-compiled programs on the Internet, an online store (e.g., Google Play, iTunes App Store), or some other source. Further, functions of the applications could be contingent upon the controller 1910 being in continuous or periodic communication with a remote system (e.g., to receive updates, authenticate the application, to provide information about current environmental conditions).

The flexible exosuit 1900 illustrated in FIG. 19 is intended as an illustrative example. Other configurations of flexible exosuits and of operating systems, kernels, applications, drivers, services, daemons, or other computer-readable programs are anticipated. For example, an operating system configured to operate a flexible exosuit could include a real-time operating system component configured to generate low-level commands to operate elements of the flexible exosuit and a non-real-time component to enable less time-sensitive functions, like a clock on a user interface, updating computer-readable programs stored in the flexible exosuit, or other functions. A flexible exosuit could include more than one controller; further, some of those controllers could be configured to execute real-time applications, operating systems, drivers, or other computer-readable programs (e.g., those controllers were configured to have very short interrupt servicing routines, very fast thread switching, or other properties and functions relating to latency-sensitive computations) while other controllers are configured to enable less time-sensitive functions of a flexible exosuit. Additional configurations and operating modes of a flexible exosuit are anticipated. Further, control systems configured as described herein could additionally or alternatively be configured to enable the operation of devices and systems other than flexible exosuits; for example, control systems as described herein could be configured to operate robots, rigid exosuits or exoskeletons, assistive devices, prosthetics, or other mechatronic devices.

Controllers of Mechanical Operation of a Flexible Exosuit

Control of actuators of a flexible exosuit could be implemented in a variety of ways according to a variety of control schemes. Generally, one or more hardware and/or software controllers could receive information about the state of the flexible exosuit, a wearer of the flexible exosuit, and/or the environment of the flexible exosuit from sensors disposed on or within the flexible exosuit and/or a remote system in communication with the flexible exosuit. The one or more hardware and/or software controllers could then generate a control output that could be executed by actuators of the flexible exosuit to effect a commanded state of the flexible exosuits and/or to enable some other application. One or more software controllers could be implemented as part of an operating system, kernel, driver, application, service, daemon, or other computer-readable program executed by a processor included in the flexible exosuit.

Figures 20A, 20B:
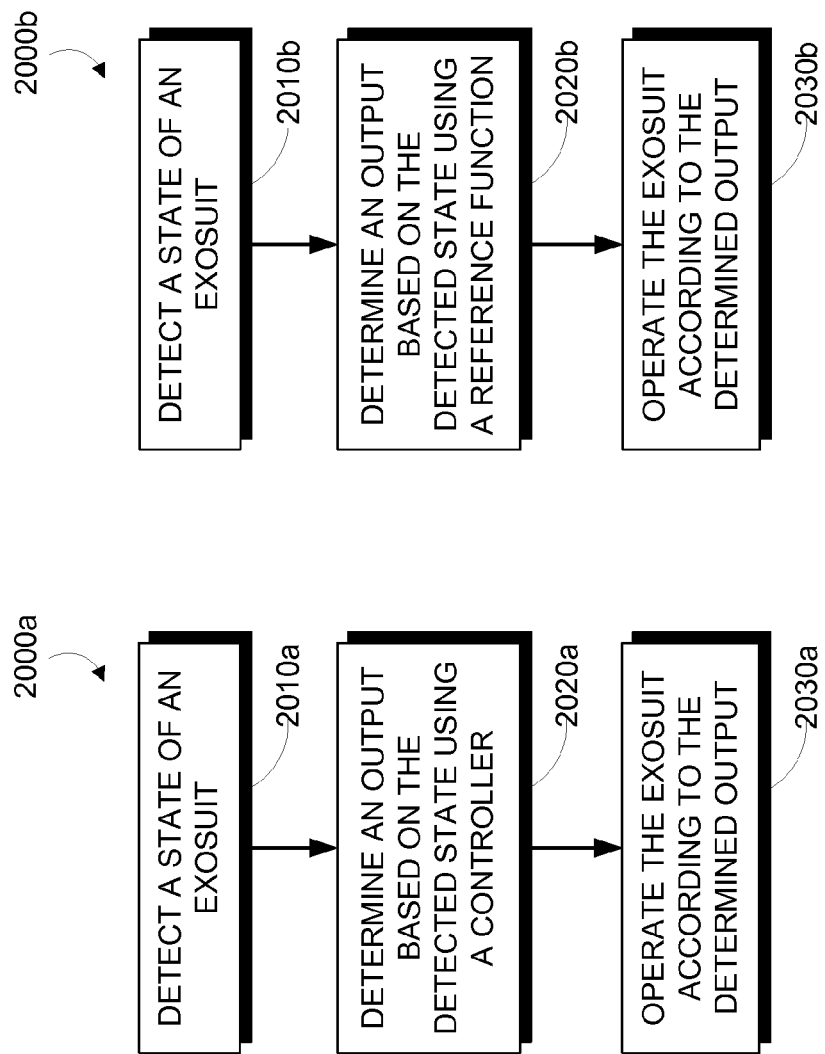
FIG. 20A illustrates an example process for operating a flexible exosuit.
FIG. 20B illustrates an example process for operating a flexible exosuit.

FIG. 20A illustrates an example process 2000a for operating a flexible exosuit that includes detecting a state of the flexible exosuit 2010a, determining an output based on the detected state using a controller 2020a, and operating the flexible exosuit according to the determined output 2030a. Detecting a state of the flexible exosuit 2010a could include measuring one or more properties of the flexible exosuit and/or a wearer thereof using sensors disposed in the flexible exosuit, accessing a stored state of the flexible exosuit, applying a filter (e.g., a Kalman filter) or otherwise processing the measured one or more properties and/or accessed stored state, or other processes such that the state (i.e., the location, orientation, configuration, and/or other information about elements of the flexible exosuit) of the flexible exosuit is wholly or partially determined. For example, detecting the state of the flexible exosuit 2010a could include determining the relative location and orientation of one or more rigid or semi-rigid segments of the flexible exosuit and/or one or more segment of the body of a wearer of the flexible exosuit.

Determining an output based on the detected state using a controller 2020a could include performing calculations on the detected state, calibration information, information about past detected states, controller parameters, or other information to determine one or more output commands. The calculations could implement one of a variety of different controllers, according to an application. The controllers could include state machines, feedback loops, feed-forward controllers, look-up tables (LUTs), proportional-integral-derivative (PID) controllers, parametric controllers, model-based controllers, inverse kinematic model-based controllers, state-space controllers, bang-bang controllers, linear-quadratic-Gaussian (LQG) controllers, other controllers and/or combinations of controllers. Parameters, topologies, or other aspects of configuration of a controller could be optimized, trained, or otherwise validated in simulation before being used to control a flexible exosuit. Parameters of the controller and/or of simulations used to validate the controller could be related to calibration parameters or other data related to a model or type of flexible exosuit, an individual flexible exosuit, an individual wearer of a flexible exosuit, or an environment in which a flexible exosuit could be operated. The controllers could be configured to improve, adapt, or otherwise reconfigure to improve performance according to some metric. Such improvement, adaptations, or reconfiguration could be related to detected or specified changes in properties of the flexible exosuit and/or the wearer, patterns of usage of the flexible exosuit by the wearer, gait patterns or other patterns of physical activity or motion engaged in by the wearer, or other information.

Operating the flexible exosuit according to the determined output 2030a could include operating twisted string actuators (TSAs), exotendons, electropolymer artificial muscle (EPAM) actuators, or other mechatronic elements to apply forces and/or torques to elements of the flexible exosuit, the body of the wearer, and/or the environment of the flexible exosuit. For example, the determined output could specify that a TSA shorten at a specified rate, and operating the flexible exosuit according to the determined output 2030a could include applying voltages and/or currents to windings of a motor of the TSA, detecting a rate and/or angle of rotation of the motor, or other processes such that the TSA shortened at the specified rate. In another example, the determined output could specify that a level of torque be applied to a joint of the wearer, and operating the flexible exosuit according to the determined output 2030a could include operating one or more actuators of the flexible exosuit to apply the specified level of torque to the joint of the wearer. Further, the translation between the determined outputs and signals to actuate elements of the flexible exosuit could be based on calibration data about the actuated elements and/or other aspects or elements of the flexible exosuit. For example, operating a TSA to shorten at a specified rate could include determining a rate of rotation to rotate a motor of the TSA based on calibration data that includes a transmission ratio of the TSA. Other scenarios and processes as described elsewhere herein are anticipated.

A model-based controller is a controller having a structure, organization, or other features based on or inspired by a mechanical or other model of a system to be controlled by the controller. For example, a model-based controller of an inverted pendulum could be created based on inverting or otherwise manipulating a model of the response of the inverted pendulum (i.e., the evolution of the states of the inverted pendulum) to control inputs, such that the inverted or otherwise transformed model generated outputs to control the inverted pendulum (e.g., base forces) to follow a commanded state of the inverted pendulum based on detected states of the inverted pendulum. In some examples, a model-based controller includes a model of a system to be controlled and applies potential and/or current control outputs to the model of the system to predict the output of the system in response to the control outputs, to generate an error signal, or to enable some other application. In some examples, a model-based controller can be a more generic type of controller (e.g., PID controller, state-space controller, bang-bang controller, linear-quadratic-Gaussian (LQG) controller) that has parameters trained or otherwise optimized according to some cost function or constraint using a simulation of the system represented by the model.

The use of a model-based controller could allow control of the flexible exosuit to be adapted to different wearers, environments, and conditions without a training period. That is, model parameters could be updated based on detected changes in properties of the flexible exosuit, the wearer, and/ or the environment that correspond to the model parameter. For example, a single model and/or model-based controller could be created to control flexible exosuits having a specific configuration (e.g., that were configured to include actuators (i.e., TSAs, exotendons) corresponding to the simulated actuators of the Endo-Herr model (i.e., force transducers, clutched compliance elements)). Specific parameters of the model-based controller could correspond to properties of the wearer and/or elements of the flexible exosuit. For example, the weight of body segments of the wearer, the compliance of an exotendon in the clutched state, the force-length characteristics of an individual TSA, or other properties could correspond to parameters of a model-based controller. Additionally or alternatively, different operating modes of the flexible exosuit (and corresponding applications, services, or other computer-readable programs) could correspond to different wearers, environments, and conditions. For example, a first wearer could operate a flexible exosuit using a first configuration service (i.e., a service that updates controllers, applications, drivers, configuration parameters, operating modes, applications, or other information relative to information about the first wearer) and a second wearer could operate the flexible exosuit using a second configuration service. In some examples, updates to change model parameters could indicate a qualitative change in a state of the flexible exosuit and/or of the wearer. In some examples, the indicated qualitative change could be an indication that an element of the flexible exosuit was in need of replacement and/or likely to fail. For example, updating model parameters corresponding to a TSA could indicate that the twisted string of the TSA was significantly fatigued and was likely to break and/or was likely to cause the TSA to operate in a sub-optimal manner. This indication could be conveyed to the wearer through a user interface of the flexible exosuit. Additionally or alternatively, the indication could be conveyed to a remote system or person (e.g., a repair technician, a health technician, a parts manager). In some examples, the indicated qualitative change could be an indication that the wearer has become significantly physically and/or mentally fatigued. This indication could be conveyed to the wearer through a user interface of the flexible exosuit. Additionally or alternatively, the indication could cause the flexible exosuit to change its operation by increasing a degree or percent to which the flexible exosuit augments the activity of the wearer and/or inhibits potentially injurious actions or motions of the wearer.

In some examples, the use of a model-based controller could enable control of a flexible exosuit based on continuously changing properties of the flexible exosuit. That is, the control of the exosuit could continuously adapt to changes in properties of elements of the flexible exosuit (e.g., force/length/torque properties of TSAs, the compliance of exotendons as the humidity of the environment of the flexible exosuit changes). Sensors in the flexible exosuit could generate measurements sufficient to update calibration parameters of elements of the flexible exosuits (e.g., force/length/torque properties of TSAs, the compliance of exotendons) over time. This calibration process could be performed periodically by a computer-readable program being executed by a controller of the flexible exosuit (e.g., calibration service 1916) during operation of the flexible exosuit to effect operating modes and/or during operations of the flexible exosuit directed specifically toward determining calibration parameters. Additionally or alternatively, individual elements of a flexible exosuit could be replaceable, and calibration parameters corresponding to a replacement element could replace calibration parameters stored for an element that is replaced by the replacement element, such that the flexible exosuit has stored updated calibration parameters about the properties of the elements of the flexible exosuit. The calibration parameters could correspond to parameters of a model-based controller, and calibration parameters corresponding to the current state of the flexible exosuit (generated, e.g., by a calibration process and/or by replacing calibration parameters corresponding to a replaced element with parameters corresponding to a replacement element).

Calibration parameters could additionally describe properties of the wearer of the flexible exosuit and/or of loads or other objects carried by the wearer and/or by the flexible exosuit. For example, a parameter of a model-based controller could correspond to the mass of the wearer above the wearer's hips (i.e., the mass of the wearer's torso, head, and arms and of any loads carried by or attached to those segments of the wearer's body). Sensors and/or actuators of the flexible exosuit could be operated to continuously or periodically estimate the mass of the wearer above the wearer's hips. The parameter of the model-based controller corresponding to that mass could be updated based on the estimated mass of the wearer above the wearer's hips such that, after updating the mass parameter of the model based controller, control outputs determined by the controller take into account the current mass of the wearer above the wearer's hips corresponding to the updated mass parameter. For example, determined output forces applied by actuators to the body of the wearer could be increased to compensate for an increase in mass of the wearer above the wearer's hips.

Calibration parameters could be uploaded to a remote system in communication with the flexible exosuit. Additionally or alternatively, calibration parameters could be downloaded from a remote system in communication with the flexible exosuit. Sets of calibration parameters could be associated with specific flexible exosuits, wearers, elements of flexible exosuits, or combinations thereof. Calibration parameters associated with a specific wearer and/or a flexible exosuit used by a specific wearer could be associated with a username, password, or other credentials to allow the specific wearer to access the stored calibration parameters over a communications network (e.g., the Internet). Accessing calibration parameters of the specific wearer in this way could enable the specific wearer to use multiple flexible exosuits while maintaining easy access to calibration parameters describing physical properties of the specific wearer, controllers and/or controller parameters used by the specific wearer, applications and/or application data used by the specific wearer, and/or usage, gait, or other patterns related to the specific wearer and/or the specific wearer's operation of flexible exosuits. The username, password, and/or other credentials could secure calibration parameters or other information about a wearer from being accessed by people or systems that are not the wearer. Additionally or alternatively, a flexible exosuit worn by the wearer could transmit some information about the wearer (e.g., a gait pattern, a gesture made by the wearer) and the information could be used as a credential (e.g., as a biometric identifier).

FIG. 20B illustrates an example process 2000b for operating a flexible exosuit that includes detecting a state of the flexible exosuit 2010b, determining an output based on the detected state using a reference function 2020b, and operating the flexible exosuit according to the determined output 2030b. Detecting a state of the flexible exosuit 2010b could include measuring one or more properties of the flexible exosuit and/or a wearer thereof using sensors disposed in the flexible exosuit, accessing a stored state of the flexible exosuit, applying a filter (e.g., a Kalman filter) or otherwise processing the measured one or more properties and/or accessed stored state, or other processes such that the state (i.e., the location, orientation, configuration, and/or other information about elements of the flexible exosuit) of the flexible exosuit is wholly or partially determined. For example, detecting the state of the flexible exosuit 2010b could include determining the relative location and orientation of one or more rigid or semi-rigid segments of the flexible exosuit and/or one or more segment of the body of a wearer of the flexible exosuit.

Determining an output based on the detected state using a reference function 2020b includes performing some calculation on the detected state, where the calculation results in the generation of a determined output. In some examples, determining an output based on the detected state using a reference function 2020b could include transforming the detected state. In some examples, transforming the detected state could include selecting certain elements of the detected state and discarding other elements. For example, the reference function could be a function of a detected ankle angle of a wearer, and information in the detected state (e.g., angles of other joints, body segment velocities, joint torques) that are not ankle angles could be discarded. In some examples, transforming the detected state could include scaling, shifting, inverting, or quantizing one or more variables of the detected state. In some examples, transforming the detected state could include reducing the dimensionality of the detected state; this is, translating a first number of variables of the detected state into a second number of variables that is less than the first number. For example, variables of the detected state could be subjected to principal component analysis, independent component analysis, factor analysis, varimax rotation, non-negative matrix factorization, isomap, or some other dimensionality reduction process. In some examples, transforming the detected state could include filtering the detected state (e.g., by using a Kalman filter, a Wiener filter, or some other linear or nonlinear filter). In some examples, transforming the detected state could include applying the detected state to a classifier. For example, one or more variables of the detected state could be applied to a support vector machine, a k-nearest-neighbors classifier, or some other classifier of pattern matching algorithm to transform the one or more variables of the detected state into one of a finite number of output classes.

In some examples, transforming the detected state could include using the detected state to determine gait information. For example, the detected state could be used to determine a gait cycle percent (i.e., how far, as a percent, ratio, or fraction, through a locomotor cycle a wearer of the flexible exosuit is at a current point in time) or a gait phase (e.g., stance, swing, heel strike, toe off). The gait cycle percent and/or phase could be determined based on detected joint angles and/or joint torques of the wearer. For example, measured joint angles of the detected state could be compared to patterns of recorded joint angles 1561a, 1563a, 1565a, simulated joint angles 1561b, 1563b, 1565b, recorded joint torques 1571a, 1573a, 1575a, and/or simulated joint torques 1571b, 1573b, 1575b. Recorded and/or simulation patterns against which the detected state is compared to determine the gait cycle percent and/or phase could be related a specific wearer of the flexible exosuit or could be related to a population of wearers or other humans (e.g., the patterns could be mean patterns generated from data recorded from a population of humans).

In some examples, determining an output based on the detected state using a reference function 2020b could include applying the determined state and/or a transformed version of the determined state to a smooth reference function and calculating the output of the smooth reference function to determine the output. The smooth reference function could be univariate, bivariate, or multivariate and could have one or more outputs corresponding to one or more determined outputs based on the detected state. The smooth reference function could be a polynomial, a rational function, an exponential function, a sinusoid, some other smooth function, or a combination of the above. The shape and/or parameters could be based on a model of some element or function of a flexible exosuit. For example, the smooth reference function could be selected to approximate a force profile produced by a force transducer that is simulated as part of the Endo-Herr model 1300 to produce stable simulated locomotion. The shape and/or parameters could be based on recorded data from a wearer of the flexible exosuit and/or a population of wearers of flexible exosuits and/or other humans.

In some examples, determining an output based on the detected state using a reference function 2020b could include applying a transformation to the detected state to generate a one or more discrete input variables and generating the output based on the contents of a cell of a look-up table corresponding to the one or more discrete input variables. For example, the detected state could be transformed to one of four possible gait phases (e.g., heel-strike, stance, toe-off, or swing), and each of four possible gait phases could have a corresponding set of outputs (e.g., each gait phase could have a respective set of exotendons to clutch). The look-up table could have one, two, or more discrete input variables and could specify the state of one or more outputs for each combination of values of the one or more discrete input variables. One or more of the discrete input variables could be discretized and/or quantized continuous variables of the detected state; for example, one of the input variables could be a joint ankle discretized into 50 bins, such that the input variable has fifty different discrete states and the discrete states can be ordered according to the relative magnitude of the angles corresponding to the discrete states. The output values corresponding to the cells of the look-up table could be based on a model of some element or function of a flexible exosuit. The contents and organization of the cells of the look-up table and the transformation used to determine which cell of the look-up table to access for a given detected state could be based on recorded data from a wearer of the flexible exosuit and/or a population of wearers of flexible exosuits and/or other humans.

One or more properties of the reference function could be based on a model of the flexible exosuit, elements of the flexible exosuit, and/or a wearer of the flexible exosuit. In some examples, the reference function could be a pattern of activation of some element of the flexible exosuit that has been generated using a model to increase the efficiency of locomotion of the wearer, to decrease a probability of injury of the wearer, or to maximize, minimize, and/or satisfy some constraint. For example, the reference function could be a pattern of exotendon clutching as a function of gait cycle percent (e.g., 1400). In some examples, generating the reference function from the model could be computationally expensive. For example, generating the reference function could require gradient descent, a genetic algorithm, and/or the computation of one or more simulations of the model. In such examples, the reference function could be generated using the model at a low rate related to the computational cost of generating the reference function. Additionally or alternatively, the reference function could be re-calculated only when determined, manually input, or otherwise specified parameters of the model change.

In an example, determining an output based on the detected state using a reference function 2020b includes determining a gait cycle percent based on detected joint angles of the wearer and actuating exotendons of a flexible exosuit according to a pattern of activation of clutched-compliance elements generated using the Endo-Herr model 1300 (e.g., 1400). In another example, determining an output based on the detected state using a reference function 2020b includes operating joint-related state machine controllers that have state transitions related to gait phases (e.g., toe-off, heel-strike, foot-flat) and that actuate exotendons and operate TSA controllers and that are configured similarly to 1210, 1220, 1230.

Operating the flexible exosuit according to the determined output 2030b could include operating twisted string actuators (TSAs), exotendons, electropolymer artificial muscle (EPAM) actuators, or other mechatronic elements to apply forces and/or torques to elements of the flexible exosuit, the body of the wearer, and/or the environment of the flexible exosuit. For example, the determined output could specify that a TSA shorten at a specified rate, and operating the flexible exosuit according to the determined output 2030a could include applying voltages and/or currents to windings of a motor of the TSA, detecting a rate and/or angle of rotation of the motor, or other processes such that the TSA shortened at the specified rate. In another example, the determined output could specify that a level of torque be applied to a joint of the wearer, and operating the flexible exosuit according to the determined output 2030b could include operating one or more actuators of the flexible exosuit to apply the specified level of torque to the joint of the wearer. Further, the translation between the determined outputs and signals to actuate elements of the flexible exosuit could be based on calibration data about the actuated elements and/or other aspects or elements of the flexible exosuit. For example, operating a TSA to shorten at a specified rate could include determining a rate of rotation to rotate a motor of the TSA based on calibration data that includes a transmission ratio of the TSA. Other scenarios and processes as described elsewhere herein are anticipated.

Multiple controllers and/or reference functions could be used to determine output(s) based on detected states of an exosuit. For example, a first controller could be used to determine outputs during a first period of time and a second controller could be used to determine outputs during a second period of time. Additionally or alternatively, a first controller could be used to determine outputs corresponding to a first set of actuators, joints, or other elements of a flexible exosuit and/or a wearer thereof, and a second controller could be used to determine outputs corresponding to a second set of actuators, joints, or other elements of a flexible exosuit and/or a wearer thereof that is disjoint from the first set. Further, one or more controllers, classifiers, or other algorithms could be used to determine which controllers of a set of controllers should be used to generate output(s) and/or how to combine the generated output(s) from the set of controllers to generate a final combined output(s) that could be used to operate elements of the flexible exosuit.

In some examples, generating a final combined output(s) could include generating a linear combination of outputs generated by a set of controllers. For example, a first controller could be configured to generate output(s) to reduce fatigue of a wearer by supplementing the forces and/or torques generated by muscles of the wearer. A second controller could be configured to generate outputs(s) to increase the effective impedance of the ankles in response to a determination, based on the detected state, that the ground in front of the wearer is unstable. Combining the generated output(s) of the two controllers could include linearly or nonlinearly summing actuator commands of the generated output(s). Additionally or alternatively, the generated output(s) from the second controller could supersede the generated output(s) from the first controller due to the second controller having a higher priority than the first controller. Priority could be assigned to controllers according to an application (e.g., controllers that generate outputs(s) relating to injury prevention could have higher priority than other controllers) and/or priority could be context dependent (i.e., dependent on a detected state of the flexible exosuit, the wearer, and/or the environment of the flexible exosuit).

In some examples, generated output(s) could be modulated by one or more state variables of the flexible exosuit. For example, when a power source of the flexible exosuit is nearly depleted, forces and/or torques generated by the flexible exosuit could be reduced by some fraction related to the battery discharge level. In some examples, a fatigue level of the wearer could be detected, and forces and/or torques generated by the flexible exosuit could be related to the detected fatigue level. For example, the forces and/or torques could be increased when the wearer is fatigued, to assist the wearer, to allow the wearer to recover from the fatigue while still engaging in physical activity, and/or to reduce the probability of the wearer experiencing fatigue-related injuries. Additionally or alternatively, the modulation of the forces and/or torques relative to the detected fatigue of the wearer could be implemented according to some other scheme, for example, a pattern configured to maximize the distance a wearer could march by 'dosing' the fatigue that the wearer accrued over time. In some examples, the forces and/or torques applied to the wearer by the flexible exosuit could be modulated according to a setting specified by the wearer. For example, a user interface could allow the wearer to select a level of assistance and/or augmentation that the flexible exosuit could apply to the wearer's body according to the comfort of the wearer.

Controllers, models, transformations, filters, reference functions, and other elements and processes described above could be implemented as computer-readable programs. The computer-readable programs could be part of an operating system of a flexible exosuit (e.g., 1912) or could be implemented as applications (e.g., 1914a-c) being executed by a flexible exosuit and operating in conjunction with an operating system. Applications, services, daemons, or other computer-readable programs could access functions of the flexible exosuit through APIs provided by an operating system. Additionally or alternatively, applications, services, daemons, or other computer-readable programs could provide functionality to other computer-readable programs by providing additional APIs or other mechanisms configured to enable access to functions of the applications, services, daemons, or other computer-readable programs by other computer-readable programs.

The operation of a flexible exosuit could be related to information input by a user and/or wearer of the flexible exosuit by interacting with a user interface. The user interface could be incorporated into the flexible exosuit (e.g., a touchscreen removably or non-removably disposed in a sleeve of the flexible exosuit) or could be part of a separate device (e.g., a tablet). Additionally or alternatively, some or all of the user interface of a flexible exosuit could be implemented on some other device, e.g., a laptop computer or a cellphone. Interactions of a wearer with a user interface could alter settings or parameters of the flexible exosuit, cause the flexible exosuit to change operational modes, result in the addition, subtraction, or reconfiguration of applications installed on the flexible exosuit, or enable other functions or operating modes of the flexible exosuit.

Figure 21A:
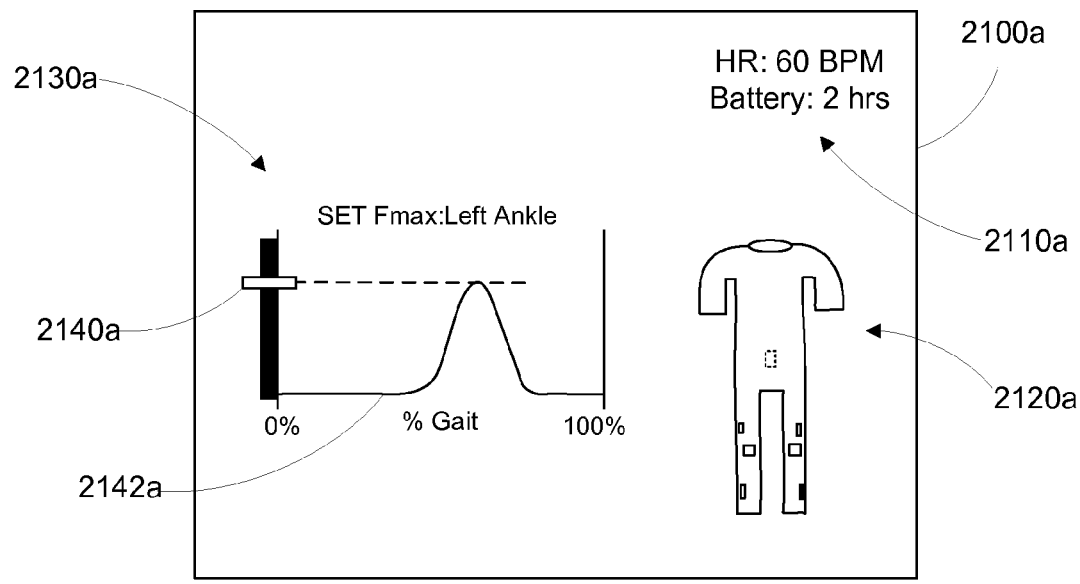
FIG. 21A is an example of a user interface for a flexible exosuit.

FIG. 21A illustrates an example of a user interface 2100a for a flexible exosuit. The user interface 2100a includes a status variable display 2110a, an informational schematic 2120a, and a parameter setting interface 2130a. The user interface 2100a could be presented by a touchscreen disposed in the flexible exosuit (e.g., in a sleeve of the flexible exosuit) or could be presented by some other system in communication with the flexible exosuit (e.g., a cellphone). The status variable display 2110a indicates user-selectable values to the wearer (e.g., the battery life of the flexible exosuit, the wearer's heart rate as detected by sensors of the flexible exosuit). The informational schematic 2120a displays a simplified schematic of the flexible exosuit. The informational schematic 2120a can additionally indicate information about the suit. For example, whether an element of the flexible exosuit is currently being actuated by the flexible exosuit could be indicated by a change in color of the element of the informational schematic 2120a corresponding to the actuated element.

The parameter setting interface 2130a provides a mechanism for the wearer to manually set one or more parameters related to the operation of the flexible exosuit. In the example of FIG. 21A, the parameter setting interface 2130a is displaying a pattern of actuator force 2142a versus gait cycle percent. The parameter setting interface 2130a is additionally displaying a slider 2140a configured to be operated by the wearer to change the magnitude of the actuator force 2142a. The wearer could drag the slider 2140a to a level corresponding to a level of actuator force that is comfortable to the wearer. Additionally or alternatively, the wearer could use the slider 2140a to select a level of force according to some other consideration or combination of considerations; for example, the wearer could reduce the level of actuator force to conserve energy in the battery of the flexible exosuit.

Figure 21B:
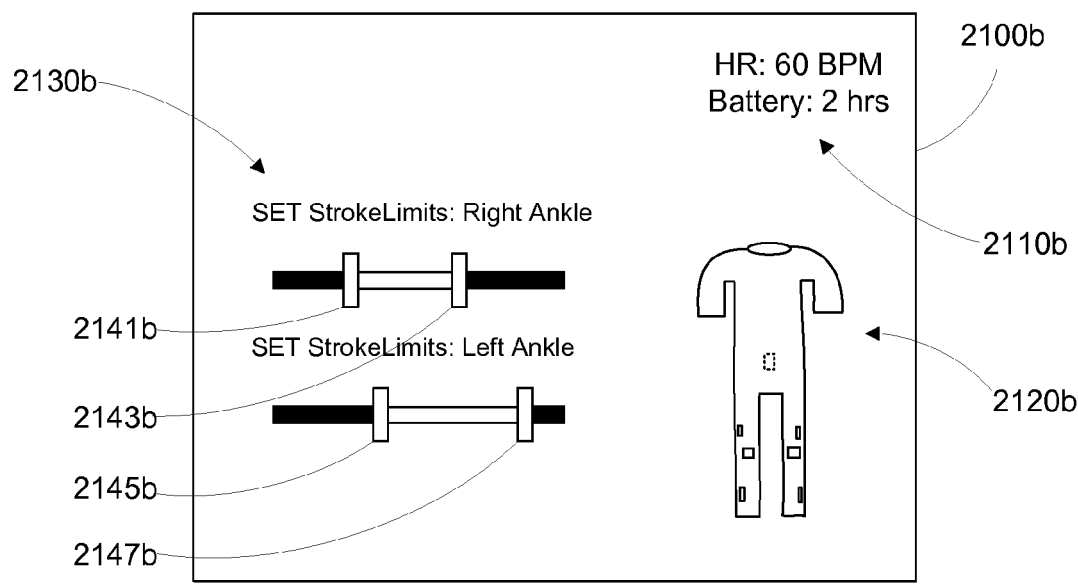
FIG. 21B is an example of a user interface for a flexible exosuit.

FIG. 21B illustrates another example of a user interface 2100b for a flexible exosuit. The user interface 2100b includes a status variable display 2110b, an informational schematic 2120b, and a parameter setting interface 2130b. The user interface 2100b could be presented by a touchscreen disposed in the flexible exosuit (e.g., in a sleeve of the flexible exosuit) or could be presented by some other system in communication with the flexible exosuit (e.g., a cellphone). The status variable display 2110b indicates user-selectable values to the wearer (e.g., the battery life of the flexible exosuit, the wearer's heart rate as detected by sensors of the flexible exosuit). The informational schematic 2120b displays a simplified schematic of the flexible exosuit. The informational schematic 2120b can additionally indicate information about the suit. For example, whether an element of the flexible exosuit is currently being actuated by the flexible exosuit could be indicated by a change in color of the element of the informational schematic 2120b corresponding to the actuated element.

The parameter setting interface 2130b provides a mechanism for the wearer to manually set one or more parameters related to the operation of the flexible exosuit. In the example of FIG. 21B, the parameter setting interface 2130b is presenting the wearer with interface elements that the wearer could operate to set the extent of operation of actuators of the flexible exosuit operating across the right and left ankles of the wearer. A first slider 2141b could be operated by the wearer to set a maximum stroke length of the right ankle actuator (i.e., to set a maximum amount of dorsiflexion of the right ankle that the right ankle actuator will allow to occur). A second slider 2143b could be operated by the wearer to set a minimum stroke length of the right ankle actuator (i.e., to set a maximum amount of plantarflexion of the right ankle that the right ankle actuator can impose on the right ankle) A third slider 2145b could be operated by the wearer to set a maximum stroke length of the left ankle actuator (i.e., to set a maximum amount of dorsiflexion of the left ankle that the left ankle actuator will allow to occur). A fourth slider 2147b could be operated by the wearer to set a minimum stroke length of the left ankle actuator (i.e., to set a maximum amount of plantarflexion of the left ankle that the left ankle actuator can impose on the right ankle) The wearer could drag one or more of the sliders 2141b, 643b, 645b, 647b to levels that corresponded to ankle actuator operation that is comfortable to the wearer. For example, the wearer could be recovering from an injury to their right ankle. The wearer could set the second slider 2143b to a level lower than the fourth slider 1047b to reflect the fact that the wearer's right ankle is more sensitive and/or has a smaller range of motion than the wearer's left ankle due to the injury.

A parameter setting interface 2130a, 2130b could be configured to present additional or alternate settings, parameters, controls, or other user interface elements to the wearer. For example, the parameter setting interface 2130a, 2130b could present the user with a variety of controllers and/or applications that could be executed to operate the flexible exosuit to enable operating modes of the suit, e.g., increasing the efficiency of locomotion of the wearer, enhancing the strength of the wearer, allowing the wearer to jump higher, or other functions. Further, the parameter setting interface 2130a, 2130b could provide user-settable parameters respective to controllers and/or applications executed by the flexible exosuit. For example, the parameter setting interface 2130a, 2130b could allow the wearer to set a magnitude of a force applied to the wearer's ankles to assist the wearer to jump. The wearer could set such a setting according to the distance the wearer intended to jump, the mass of a load carried by the wearer, or some other consideration. Other parameters and configurations of parameter setting interfaces 2130a, 2130b are anticipated.

A status variable display 2110a, 2110b of a user interface 2100a, 2100b could indicate additional or alternate information to the heart rate and battery status illustrated in the examples of FIGS. 21A and 21B. For example, the metabolic rate of the wearer, the distance a wearer has traveled since some waypoint, the distance a wearer has yet to travel to a destination, an operating mode of the flexible exosuits, or some other information could be presented to the wearer by the status variable display 2110a, 2110b. In some examples, the information displayed by the status variable display 2110a, 2110b and other properties of the status variable display 2110a, 2110b could be controlled by the wearer. For example, the wearer could choose through some element of the user interface (not shown) what information is displayed by the status variable display 2110a, 2110b. Additionally or alternatively, the information indicated by the status variable display 2110a, 2110b could be related to the current operation and/or status of the flexible exosuit, the wearer, and/or the environment of the wearer. For example, if the user has operated the flexible exosuit to assist the user to jump, the status variable display 2110a, 2110b could display a countdown to the time when the flexible exosuit will apply the forces and/or torques necessary to assist the wearer to jump. In some examples, pressing information indicated by the status variable display 2110a, 2110b could cause a window or application to be opened related to the indicated information that was pressed. For example, if a wearer pressed an indication of the wearer's heart rate, a window illustrating the wearer's ECG and other health and/or physiological information about the wearer could be displayed. Other information displayed by the status variable display 2110a, 2110b and methods of wearer interaction with the status variable display 2110a, 2110b are anticipated.

An informational schematic 2120a, 2120b of a user interface 2100a, 2100b could indicate a variety of information to a wearer about a flexible exosuit and could be configured to operate according to a variety of applications. In some examples, a shape, color, size animation, or other information about elements of the informational schematic 2120a, 2120b could indicate a variety of information about corresponding elements of the flexible exosuit. In some examples, the informational schematic 2120a, 2120b could be operated to indicate that elements of the flexible exosuit are being used, are in need of calibration, are damaged, are in need of replacement, or other information. In some examples, the schematic representing the flexible exosuit in the informational schematic 2120a, 2120b could be animated, and the animation could indicate an operational mode of the flexible exosuit. Additionally or alternatively, the schematic representing the flexible exosuit could be animated to mirror the motions and/or configuration of the flexible exosuit and/or the wearer. In some examples, the wearer could press elements of the informational schematic 2120a, 2120b to access more information and/or parameter settings, controls, or applications related to the elements of the informational schematic 2120a, 2120b pressed by the wearer. For example, pressing an element on the informational schematic 2120a, 2120b corresponding to ankle actuators could cause the parameter setting interface 2130b shown in FIG. 21B to be displayed. For example, pressing an element on the informational schematic 2120a, 2120b corresponding to a sensor could cause an indication of current and/or past measurements made using the sensor to be displayed. Other information displayed by the informational schematic 2120a, 2120b and methods of wearer interaction with the informational schematic 2120a, 2120b are anticipated.

A user interface 2100a, 2100b of a flexible exosuit could be configured to provide additional information and/or functionality. In some examples, the user interface 2100a, 2100b could enable a wearer or some other person or system to log or record one or more measurements related to the flexible exosuit, the wearer, the environment of the flexible exosuit, the interaction between the wearer and the flexible exosuit, or some other information related to the flexible exosuit. The user interface 2100a, 2100b could allow the wearer to view the recorded information and/or to perform analyses on the recorded information. For example, the wearer could operate the user interface 2100a, 2100b to record information about the wearer's gait while running, and could use the user interface 2100a, 2100b to perform analyses on the wearer's gait to improve the wearer's running technique. The wearer could also use the user interface 2100a, 2100b to make recorded information available to other persons or systems. For example, the wearer could make recorded information available to a teacher, coach, physician, or other individual.

In some examples, a wearer could operate the user interface 2100a, 2100b to access previously recorded information about the flexible exosuit, the wearer, the environment of the flexible exosuit, and/or the interaction between the wearer and the flexible exosuit and to use to previously recorded information to affect the operation of the flexible exosuit. For example, the accessed data could be used as a baseline of comparison to enable the wearer to compare the wearer's current performance of a task to the wearer's past performance of the task represented by the accessed data. That is, the wearer could perform analyses to compare the wearer's progress at learning a task and/or to determine a change in the wearer's physical abilities. In another example, the flexible exosuit could be operated to guide the wearer in re-enacting the activity or motions represented by the accessed data.

In some examples, previously recorded data could be used to update parameters or other configuration data of applications, controllers, other services, drivers, daemons, or other computer-readable programs used to operate the flexible exosuit. For example, the parameters or other configuration data could be updated to reflect a specific wearer's pattern of walking, and the updated the parameters or other configuration data could be used by the computer-readable programs to change a timing of actuation of elements of the flexible exosuit to more accurately reflect the timing of a user's motion during walking. In some examples, previously recorded data could be associated with the wearer becoming fatigued, and the flexible exosuit could be operated to detect that the wearer is becoming fatigued by detecting that a current property of the actions of the wearer is similar to actions of the wearer represented in the previously recorded data that are associated with the wearer becoming fatigued. The operation of the flexible exosuit could be changed in response to such a determination; for example, the magnitude to which the flexible exosuit operated actuators of the flexible exosuit to assists actions of the wearer could be increased and/or the flexible exosuit could indicate that the wearer was becoming fatigued to the wearer or to a remote person or system in communication with the flexible exosuit. Other applications of previously recorded information about the flexible exosuit, the wearer, the environment of the flexible exosuit, and/or the interaction between the wearer and the flexible exosuit to operate a flexible exosuit and/or to effect other operating modes of the flexible exosuit are anticipated.

In some examples, a wearer could operate the user interface 2100a, 2100b to provide recorded information about the flexible exosuit, the wearer, the environment of the flexible exosuit, and/or the interaction between the wearer and the flexible exosuit and to use to previously recorded information to a remote system (e.g., a server). The remote system could receive such recorded information from a plurality of wearers of flexible exosuit and could generate a reference data set from the received recorded information. The remote system could perform analyses or other computations on the reference data set. Results of the performed analyses or other computations on the reference data set could be provided to individual flexible exosuits to improve the operation of the individual flexible exosuits (e.g., to update parameters or other configuration data of applications, controllers, other services, drivers, daemons, or other computer-readable programs used to operate the individual flexible exosuits). For example, the remote server could determine that an individual wearer was performing a task better than the performance of the task represented by the current reference data set, and the remote server could responsively update the reference data set to reflect the data received from the flexible exosuit worn by the individual wearer. Other applications and operations of remote systems in communication with a plurality of flexible exosuits are anticipated. A user interface 2100a, 2100b of a flexible exosuit could be configured to provide additional information and/or functionality. In some examples, the user interface 2100a, 2100b could present the wearer with a home screen. The home screen could display a variety of applications, operating modes, functions, and settings of the flexible exosuit as icons that the wearer could press. Pressing an icon could cause an application, program, or other function to be executed. For example, pressing a button for a jump application could cause the jump application to begin execution, and the jump application could operate elements of the flexible exosuit to assist the wearer in jumping. The jump application could additionally present an interface to the wearer that could include methods for controlling aspects of the jump application, for example, jump timing, jump height, jump power, jump symmetry, or other methods of controlling the jump application. The home screen could additionally provide methods for the wearer to stop applications that are running, determine whether and which applications are running, or other functions. Other applications, methods of interacting with and/or presenting a home screen to a wearer, menus accessible from a home screen or by some other method, methods of interaction between an application of a flexible exosuit and a wearer, and other configurations and applications of a user interface 2100a, 2100b of a flexible exosuit are anticipated.

A user interface 2100a, 2100b of a flexible exosuit could additionally provide methods for a wearer to browse applications for the flexible exosuit, purchase exosuit applications, download exosuit applications, install exosuit applications, configure exosuit applications, uninstall exosuit applications, or other functions related to applications configured to be executed by a flexible exosuit. The user interface 2100a, 2100b could allow a wearer to access a profile or account related to the wearer and to the purchasing, installing, updating, and personalization of exosuit applications. Other applications, methods of interacting with and/or presenting a user interface 2100a, 2100b to a wearer, methods of interaction between a user interface 2100a, 2100b of a flexible exosuit and a wearer, and other configurations and applications of a user interface 2100a, 2100b of a flexible exosuit are anticipated.

CONCLUSION

Embodiments described herein are intended as illustrative, non-limited examples of flexible exosuits. Further, elements, actuators, sensors, garments, or other systems and devices described herein in the context of their use as elements of a flexible exosuit could additionally or alternatively be used to enable other applications. For example, actuators, sensors, and other devices and system described herein could be configured for use as part of robots, assistive devices, vehicles, toys, appliances, prosthetics, or other mechatronic systems or devices.

Flexible exosuits as described herein may be configured in a variety of ways according to a variety of applications. A flexible exosuit may be configured to apply forces to the lower body, upper body, torso, or combinations of some or all of these parts of a wearer. A flexible exosuit could be symmetric (able to apply the same types of forces and torques to one side of a wearer's body as to the opposite side) or could be asymmetric (e.g., to enable strength assists and/or rehabilitation to a wearer that has experienced an injury to one limb and not to the opposite limb). Different overall topologies of configuration of flexible exosuits may correspond to and/or be specified by respective applications of flexible exosuits.

Dimensions, configurations, sets of actuators, or other properties of a flexible exosuits as described herein could be configured to be used by a variety of users (e.g., a one-size-fits-all device, a device including straps, buttons, fasteners, or other means to adjust a dimension or other property to a wearer) or could be custom-tailored or otherwise manufactured specifically for an individual user. Some elements of a flexible exosuit (e.g., TSAs, user interfaces) could have a single size and/or configuration for a variety of users, while other elements (e.g., undersuits, rigid force-transmitting elements, flexible force-transmitting elements) could be chosen from sets of elements having a range of sizes such that the chosen elements had a size matched to the wearer. 3D printing, rapid prototyping, or other methods of customized fabrication could be used to produce elements of a flexible exosuit specifically configured to be worn and/or used by a specific wearer.

Flexible exosuits as described herein could be operated according to a variety of applications. Applications of a flexible exosuit as described herein are not limited to the functions or operating modes enumerated herein, and could include other applications enabled by the use of a reconfigurable system configured to apply forces and/or torques to a body of a wearer. Applications could include but are not limited to rehabilitation, augmentation, training, entertainment, immersive virtual reality, exercise, and communications.

Flexible exosuits as described herein could be configured for use by anatomically typical human wearers or by atypical human wearers. Flexible exosuits could be configured to be worn and operated by human wearers that have lost parts of their body (e.g., arms, legs), that have experienced some alteration of anatomy due to surgical intervention (e.g., tendon transfer) or that are anatomically atypical. Configuration of flexible exosuits for use and/or operation by human wearers as described above could include hardware configuration (e.g., omitting elements of a standard exosuit that correspond to a missing limb of a wearer) and/or software configuration (e.g., altering a controller or other computer-readable program of the flexible exosuit to take into account that a wearer is unable to activate his/her triceps muscles due to tetraplegia).

Flexible exosuits as described herein could be configured for use by non-human animals. For example, a flexible exosuit could be configured to be worn by a non-human primate, a dog, a horse, or some other animal according to an application, e.g., animal training.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A programmable body augmentation system, comprising:
   a flexible suit configured to be worn over at least a portion of a human body;
   one or more flexible linear actuators coupled to the flexible suit, wherein the one or more flexible linear actuators are operable to apply forces between segments of the human body such that the forces applied by the one or more flexible linear actuators augment forces applied by musculature in the human body;
   one or more clutched-compliance elements coupled to the flexible suit, wherein the one or more clutched-compliance elements are operable to provide controllable levels of compliance between segments of the human body; and
   a controller disposed in the flexible suit, wherein the controller is configured to execute computer-readable programs to operate the one or more flexible linear actuators to apply forces between segments of the human body and to operate the clutched-compliance elements to provide controlled levels of compliance between segments of the human body in a plurality of different ways to provide a plurality of different modes of operation.

2. The programmable body augmentation system of claim 1, wherein the plurality of different modes of operation relate to one or more of walking, running, jumping, lifting, load carrying, climbing, cycling, exercising, training, controlling a virtual avatar, and controlling a tele-robotic system.

3. The programmable body augmentation system of claim 1, wherein the plurality of different modes of operation relate to different potential wearers of the programmable body augmentation system.

4. The programmable body augmentation system of claim 1, wherein the controller can execute any of a plurality of stored computer-readable programs, wherein execution of a stored computer-readable program by the controller comprises operating the one or more flexible linear actuators and the one or more clutched-compliance elements in accordance with the stored computer-readable program, and wherein each of the stored computer-readable programs defines at least one of the plurality of different modes of operation.

5. The programmable body augmentation system of claim 4, wherein operating the one or more flexible linear actuators in accordance with the stored computer-readable program comprises controlling the timing and magnitude of forces applied by each of the flexible linear actuators.

6. The programmable body augmentation system of claim 4, wherein operating the one or more clutched-compliance elements in accordance with the stored computer-readable program comprises controlling a level of compliance provided by each of the one or more clutched-compliance elements.

7. The programmable body augmentation system of claim 4, further comprising one or more kinematic sensors configured to provide data to the controller, wherein operating the one or more flexible linear actuators and the one or more clutched-compliance elements in accordance with the stored computer-readable program comprises operating the one or more flexible linear actuators and the one or more clutched-compliance elements in response to the data provided by the one or more kinematic sensors.

8. The programmable body augmentation system of claim 4, further comprising a user interface, wherein the user interface is operable to select any of the plurality of stored computer-readable programs for execution by the controller.

9. The programmable body augmentation system of claim 8, wherein the user interface is operable to select additional computer-readable programs that define additional modes of operation of the programmable body augmentation system.

10. The programmable body augmentation system of claim 1, wherein the one or more flexible linear actuators are configured to apply forces across one or more joints, wherein the one or more joints include at least one of an ankle joint, a knee joint, or a hip joint.

11. The programmable body augmentation system of claim 1, wherein the one or more clutched-compliance elements are configured to provide a controllable compliance across one or more joints, wherein the one or more joints include at least one of an ankle joint, a knee joint, or a hip joint.

12. The programmable body augmentation system of claim 1, wherein at least one of the one or more flexible linear actuators comprises a twisted string actuator.

13. The programmable body augmentation system of claim 12, wherein the twisted string actuator comprises an electric motor coupled to a string element comprising a plurality of flexible strands.

14. The programmable body augmentation system of claim 1, wherein each of the clutched-compliance elements includes a respective electrostatic clutch.

15. The programmable body augmentation system of claim 14, wherein at least one of the respective electrostatic clutches comprises an electrolaminate clutch.

16. The programmable body augmentation system of claim 1, wherein the one or more clutched-compliance elements include at least one clutched-compliance element connected in series with a flexible linear actuator.

\* \* \* \* \*